US012577121B2

(12) United States Patent
Nagaoka et al.

(10) Patent No.: US 12,577,121 B2
(45) Date of Patent: Mar. 17, 2026

(54) METAL-SUPPORTED MATERIAL AND AMMONIA SYNTHESIS CATALYST

(71) Applicant: Japan Science and Technology Agency, Kawaguchi (JP)

(72) Inventors: Katsutoshi Nagaoka, Nagoya (JP); Yuta Ogura, Nagoya (JP); Katsutoshi Sato, Nagoya (JP)

(73) Assignee: Japan Science and Technology Agency, Kawaguchi (JP)

( * ) Notice: Subject to any disclaimer, the term of this patent is extended or adjusted under 35 U.S.C. 154(b) by 0 days.

(21) Appl. No.: 18/526,881

(22) Filed: Dec. 1, 2023

(65) Prior Publication Data

US 2024/0116770 A1     Apr. 11, 2024

Related U.S. Application Data

(63) Continuation of application No. 16/648,951, filed as application No. PCT/JP2018/034515 on Sep. 18, 2018, now Pat. No. 11,866,342.

(30) Foreign Application Priority Data

| Sep. 25, 2017 | (JP) | ................................. | 2017-183215 |
| May 7, 2018 | (JP) | ................................. | 2018-089516 |

(51) Int. Cl.
*C01F 17/241*     (2020.01)
*B01J 23/10*     (2006.01)
(Continued)

(52) U.S. Cl.
CPC ............. *C01F 17/241* (2020.01); *B01J 23/10* (2013.01); *B01J 23/462* (2013.01); *B01J 23/75* (2013.01);
(Continued)

(58) Field of Classification Search
None
See application file for complete search history.

(56) References Cited

U.S. PATENT DOCUMENTS

| 6,044,644 A | 4/2000 | Hu et al. |
| 6,350,421 B1 | 2/2002 | Strehlau et al. |

(Continued)

FOREIGN PATENT DOCUMENTS

| CA | 2280631 A1 | 2/2000 |
| CN | 1263789 A | 8/2000 |

(Continued)

OTHER PUBLICATIONS

Machine translation of Ni et al., CN103706360A (Ni) (Year: 2014).*

(Continued)

*Primary Examiner* — Keling Zhang
(74) *Attorney, Agent, or Firm* — The Webb Law Firm

(57) ABSTRACT

A metal-supported material including a transition metal excluding Group 4 elements supported on a binary composite oxide. The composite oxide includes a metal element expressed by $A_n X_y$, where A represents a lanthanoid that is in a partially or entirely trivalent state, X represents an element that is a Group-2 element in a periodic table selected from the group consisting of Ca, Sr, and Ba, or a lanthanoid, and that is different from A, n satisfies $0 < n < 1$, y satisfies $0 < y < 1$, m satisfies $0 \leq m < 1$, and $n + y = 1$. The composite oxide includes a solid solution that is a tetragonal crystal or a cubic crystal, and a ratio of a value ($D_{ads}$) of a dispersion degree of the transition metal obtained by an $H_2$ pulse chemical adsorption method to a value ($D_{TEM}$) of the dispersion degree predicted from an average particle diameter of particles of the transition metal obtained from a TEM image satisfies $0 < D_{ads}/D_{TEM} < 1$.

9 Claims, 7 Drawing Sheets

(51) Int. Cl.

| | |
|---|---|
| *B01J 23/46* | (2006.01) |
| *B01J 23/75* | (2006.01) |
| *B01J 37/04* | (2006.01) |
| *B01J 37/08* | (2006.01) |
| *B01J 37/16* | (2006.01) |
| *C01C 1/04* | (2006.01) |
| *C01F 17/229* | (2020.01) |
| *C01F 17/32* | (2020.01) |
| *C01G 25/00* | (2006.01) |

(52) U.S. Cl.
CPC ............. *B01J 37/04* (2013.01); *B01J 37/088* (2013.01); *B01J 37/16* (2013.01); *C01C 1/0411* (2013.01); *C01F 17/229* (2020.01); *C01F 17/32* (2020.01); *C01G 25/006* (2013.01); *C01P 2002/01* (2013.01); *C01P 2002/90* (2013.01)

(56) References Cited

U.S. PATENT DOCUMENTS

| | | | |
|---|---|---|---|
| 8,133,463 | B1 | 3/2012 | Berry et al. |
| 10,792,645 | B2 | 10/2020 | Hosono et al. |
| 2004/0204315 | A1 | 10/2004 | Krumpelt et al. |
| 2009/0283419 | A1 | 11/2009 | Del-Gallo et al. |
| 2010/0227759 | A1 | 9/2010 | Tanaka et al. |
| 2014/0315711 | A1 | 10/2014 | Kumar et al. |
| 2015/0353369 | A1 | 12/2015 | Sekine et al. |

FOREIGN PATENT DOCUMENTS

| | | | | |
|---|---|---|---|---|
| CN | 103357406 | A | | 10/2013 |
| CN | 103706360 | A | * | 4/2014 |
| CN | 104289217 | A | | 1/2015 |
| CN | 108472632 | A | | 8/2018 |
| EP | 2949625 | A1 | | 12/2015 |
| JP | H679177 | A | | 3/1994 |
| JP | H8141399 | A | | 6/1996 |
| JP | H10509641 | A | | 9/1998 |
| JP | 200084405 | A | | 3/2000 |
| JP | 2001179092 | A | | 7/2001 |
| JP | 2005171269 | A | | 6/2005 |
| JP | 20078799 | A | | 1/2007 |
| JP | 2012185994 | A | | 9/2012 |
| JP | 2013111562 | A | | 6/2013 |
| JP | 2014171916 | A | | 9/2014 |
| JP | 2016112538 | A | | 6/2016 |
| JP | 201718907 | A | | 1/2017 |
| WO | 9617671 | A1 | | 6/1996 |
| WO | 2007113981 | A1 | | 10/2007 |
| WO | 2016133213 | A1 | | 8/2016 |
| WO | 2019059190 | A1 | | 3/2019 |
| WO | 2019216304 | A1 | | 11/2019 |

OTHER PUBLICATIONS

Naggar et al., Novel nano-structured for the improvement of photo-catalyzed hydrogen production via water splitting with in-situ nano-carbon formation, Renewable and sustainable Energy Reviews, 2015 (Year: 2015).*

Fernandez et al., Effect of the size of distribution of supported Ru nanoparticles on their activity in ammonia synthesis under mild reaction conditions, Applied Catalysis A: General, 2014 (Fernandez) (Year: 2014).*

Belliere et al., "Phase Segregation in Cerium-Lanthanum Solid Solutions", J. Phys. Chem. B., 2006, pp. 9984-9990, vol. 110, No. 20.

Itoh et al., "Magnetic Properties of Ba1-xLaxPrO3 and PrLu1-yMgyO3 with x and y less than or equal to 0.075", Journal of Solid State Chemistry, 1999, pp. 104-109, vol. 145.

Ivanova et al., "New Y(La)-M-O Binary Systems (M=Ca, Sr, or Ba): Synthesis, Physicochemical Characterization, and Application As the Supports of Ruthenium Catalysts for Ammonia Synthesis", Kinetics and Catalysis, 2004, pp. 541-546, vol. 45, No. 4.

Luo et al., "Effect of La2O3 on Ru/CeO2—La2O3 Catalyst for Ammonia Synthesis", Catal Lett, 2009, pp. 382-387, vol. 133.

Niwa et al., "Ruthenium Catalyst Supported on CeO2 for Ammonia Synthesis", Chemistry Letters, 1996, pp. 3-4.

Zhang et al., "Hightly Efficient Ru/Sm2O3—CeO2 Catalyst for Ammonia Synthesis", Catalysis Communications, 2011, pp. 23-26, Vo. 15.

Venkatasubramanian et al., "Synthesis and Characterization of Electrolytes Based on BaO—CeO2—GdO1.5 System for Interme-diate Temperature Solid Oxide Fuel Cells", International Journal of Hydrogen Energy, 2010, pp. 4597-4605, vol. 35.

Kondawar et al., "Tandem Synthesis of Glycidol via Transesterifica-tion of Glycerol with DMC over Ba-Mixed Metal Oxide Catalysts", ACS Sustainable Chemistry & Engineering, 2016, pp. 1763-1774, vol. 5, India.

Marques et al., "Thermal and Crystalographic Studies of the Mix-ture La2O3—SrO Prepared via Reaction in the Solid State", Journal of Thermal Analysis and Calorimetry, 1999, pp. 143-149, vol. 56, Budapest.

Xie et al., "Preparation of La1.9Ca0.1Zr2O6.95 with pyrochlore structure and its application in synthesis of ammonia at atmospheric pressure", Solid State Ionics, 2004, vol. 168, pp. 117-121.

Xiaodong, "Rare Earth Catalytic Materials", 3.4.2 Ruthenium-based catalysts, 2017, 1st edition, pp. 86.

Gao et al. "Barium Hydride-Mediated Nitrogen Transfer and Hydro-genation for Ammonia Synthesis: A Case Study of Cobalt", ACS Catalysis, Apr. 17, 2017, pp. 3654-3661, vol. 7, ACS Publications, DOI: 10.1021/acscatal.7b00284.

Kitano et al. "Self-organized Ruthenium-Barium Core-Shell Nanoparticles on a Mesoporous Calcium Amide Matrix for Efficient Low-Temperature Ammonia Synthesis", Angewandte Chemie Inter-national Edition, 2018, 2648-2652, vol. 57, Wiley-VCH Verlag Gmbh & Co. KGaA, Weinheim, https://doi.org/10.1002/anie.201712398.

Ogura et al. "Efficient ammonia synthesis over a Ru/La0.5Ce0.5O1.75 catalyst pre-reduced at high temperature", Chemical Science, Jan. 13, 2018, pp. 2230-2237, vol. 9, The Royal Society of Chem-istry, DOI: 10.1039/c7sc05343frsc.li/chemical-science.

Bilal et al., "Effect of Heating Atmosphere and Alkali Metal Doping on the Acidic and Basic Sites of Magnesium Oxide," International Journal of Materials Science and Applications, 2016, pp. 36-42, vol. 5:2, Science Publishing Group.

Fishel et al., "Ammonia Synthesis Catalyzed by Ruthenium Sup-ported on Basic Zeolites," Journal of Catalysis, 1996, pp. 148-157, vol. 163, Academic Press, Inc.

Kodama, T., "High-temperature solar chemistry for converting solar heat to chemical fuels," Progress in Energy and Combustion Sci-ence, 2003, pp. 567-597, vol. 29, Elsevier.

Muller et al., "Calcium Doping Facilitates Water Dissociation in Magnesium Oxide," Advanced Sustainable Systems, Dec. 11, 2017, vol. 2, Issue 1.

Wu et al., "Domino Reactions for Biofuel Production from Zymotic Biomass Wastes over Bifunctional Mg-Containing Catalysts," ACS Sustainable Chemistry & Engineering, 2019, pp. 18943-18954, vol. 7, American Chemical Society.

Doe, MaterialsDataonBaCe03byMaterialsProject,https://www.osti.gov/dataexplorer/biblio/dataset/1272884 (Year:2020).

Hagen et al., "New efficient catalyst for ammonia synthesis: barium-promoted cobalt on carbon," Chemical Communications, 2002, pp. 1206-1207, vol. 11.

Inoue et al., "Direct Activation of Cobalt Catalyst by 12CaO·7Al2O3 Electride for Ammonia Synthesis", ACS Catalysis, 2019, pp. 1670-1679, vol. 9.

* cited by examiner

FIG. 2A          FIG. 2D          FIG. 2G
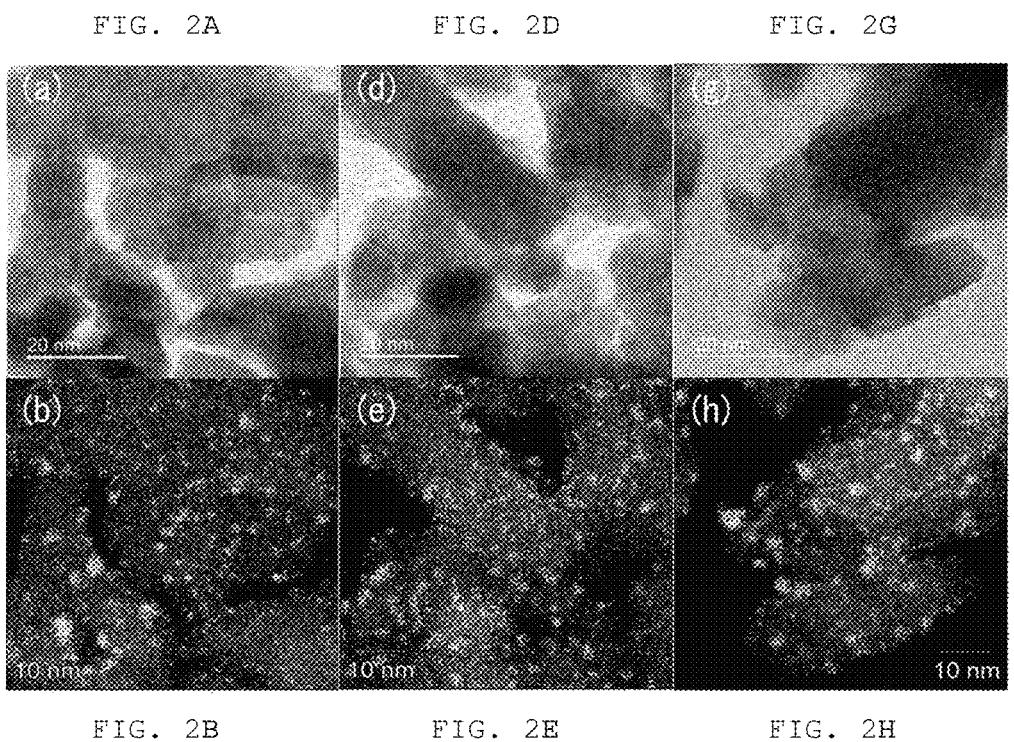
FIG. 2B          FIG. 2E          FIG. 2H
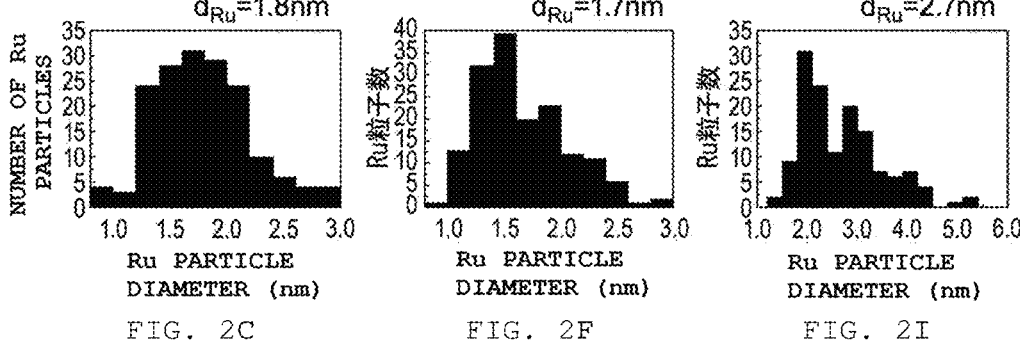
FIG. 2C          FIG. 2F          FIG. 2I

FIG. 5

| $Ru/La_{0.5}Ce_{0.5}O_{1.75}$ | | | Reduction temp. (°C) | | |
|---|---|---|---|---|---|
| | | | 500 | 650 | 800 |
| NH$_3$ synthesis rate @350°C (mmol g$^{-1}$ h$^{-1}$) | Calcine temp. (°C) | 600 | 24.8 | 24.4 | 17.1 |
| | | 700 | 22.1 | 31.3 | 20.6 |
| | | 800 | | | |
| H/Ru (%) | | 600 | 40 | 24 | 4 |
| | | 700 | 46 | 35 | 11 |
| | | 800 | | | |
| SSA (m$^2$ g$^{-1}$) | | 600 | 64 | 40 | 22 |
| | | 700 | 47 | 42 | 21 |
| | | 800 | | | |
| SSA (@ the temp/@500red) | | 600 | 1 | 0.63 | 0.34 |
| | | 700 | 1 | 0.89 | 0.44 |
| | | 800 | | | |
| Ru particle size by TEM (nm) | | 600 | 1.3 | 2.0 | 3.3 |
| | | 700 | 1.8 | 1.7 | 2.7 |
| | | 800 | | | |

METAL-SUPPORTED MATERIAL AND AMMONIA SYNTHESIS CATALYST

CROSS-REFERENCE TO RELATED APPLICATIONS

This application is a continuation of U.S. Ser. No. 16/648,951, filed Sep. 18, 2018, which is the United States national phase of International Application No. PCT/JP2018/034515 filed Sep. 18, 2018, and claims priority to Japanese Patent Application Nos. 2017-183215 and 2018-089516, filed Sep. 25, 2017 and May 7, 2018, respectively, the disclosures of which are hereby incorporated by reference in their entirety.

BACKGROUND OF THE INVENTION

Field of the Invention

The present invention relates to a composite oxide useful in synthesis of ammonia under a mild condition, a metal-supported material and an ammonia synthesis catalyst including the composite oxide, a manufacturing method for the composite oxide, a manufacturing method for the metal-supported material, and a manufacturing method for ammonia.

Description of Related Art

Ammonia is an important raw material in the current chemical industry. Of the produced ammonia, 80% or more is consumed to manufacture chemical fertilizers for farming. Moreover, ammonia has attracted attention as a carrier for energy and hydrogen. This is because (1) the hydrogen content is high (17.6 wt %), (2) the energy density is high (12.8 GJ/m$^3$), and (3) carbon dioxide is not generated when ammonia is decomposed to manufacture hydrogen. When ammonia can be efficiently manufactured from renewable energy such as solar energy or wind power, problems on the global scale regarding energy and a food crisis can be reduced.

In the Haber-Bosch process that has been used to manufacture ammonia, a large amount of energy is consumed and this consumption constitutes about 1 to 2% of the energy consumption in the world. In this process, about 60% of the consumption energy is recovered and secured as the enthalpy of ammonia. However, a large part of the remaining energy is lost when hydrogen is manufactured from natural gas, ammonia is synthesized, or gas is separated. In the Haber-Bosch process, ammonia is synthesized at very high temperature (>450° C.) and high pressure (>20 MPa); thus, reduction of energy that is used in large quantity in this process has been highly required. In order to suppress the energy consumption on the global level, it has been necessary to obtain a catalyst that can synthesize ammonia under a milder condition (lower temperature and lower pressure) than that for an iron-based catalyst that is used in the Haber-Bosch process.

In recent years, a method of manufacturing ammonia at pressure as low as 1 MPa (10 atm) has been known. A ruthenium catalyst that is used in the manufacture of ammonia is usually supported by a carrier. For example, Patent Literature 1 has disclosed that when rare earth oxide is used as a carrier that supports ruthenium, the usage of ruthenium can be reduced and the reaction temperature can be reduced. In the manufacturing method for ammonia according to Patent Literature 1, however, the ammonia yield in the case where ammonia is manufactured at lower pressure has been insufficient.

Other than Patent Literature 1 (JP H6-079177 A), various patent literatures have disclosed ammonia synthesis catalysts having ruthenium supported by various rare earth oxide carriers. Typical examples thereof are disclosed in Patent Literatures 2 to 4 and Non-Patent Literature 1 (JP 2013-111562 A, WO 2016/133213 A, JP 2017-018907 A, and Y. Niwa and K. Aika, Chemistry Letters, (1996) 3-4, respectively). Patent Literature 2 and Patent Literature 4 have disclosed lanthanoid oxide as the carrier, Patent Literature 3 has disclosed praseodymium oxide as the carrier, and Non-Patent Literature 1 has disclosed Ce oxide as the carrier. Non-Patent Literature 2 (X. Luo et al., Catalysis Letters, 133, 382 (2009)) has disclosed a catalyst of Ru/CeO$_2$—La$_2$O$_3$ that is manufactured by co-precipitating a hydroxide of Ru, Ce, and La and drying and activating the co-precipitated product.

The literatures disclosing the conventional techniques including Patent Literatures 1, 2, and 4 and Non-Patent Literature 1 describe that the ruthenium catalyst used in the ammonia synthesis includes Ru as particles on a carrier surface thereof. There is a report that, in the case where Ru exists as the particles, the average diameter thereof is more than 5 nm (see Non-Patent Literature 2). In addition, Patent Literature 3 describes that Ru has an egg shell structure.

A synthesis catalyst is generally required to have high synthesis activity. Regarding the ruthenium catalyst for the ammonia synthesis, which is currently in the development, the ruthenium catalyst with high activity that can achieve higher yield has continuously been required.

Moreover, since it is necessary that a synthesis reactor is filled with the catalyst and the catalyst is regularly exchanged, the handling needs to be easy. Regarding the ruthenium catalyst for the ammonia synthesis, the easier handling has also been required.

CITATION LIST

Patent Literatures

Patent Literature 1: JP H6-079177 A
Patent Literature 2: JP 2013-111562 A
Patent Literature 3: WO 2016/133213 A
Patent Literature 4: JP 2017-018907 A

Non Patent Literatures

Non-Patent Literature 1: Y. Niwa and K. Aika, Chemistry Letters, (1996) 3-4 Non-Patent Literature 2: X. Luo et al., Catalysis Letters, 133, 382 (2009)

SUMMARY OF THE INVENTION

Technical Problem

The present invention has been made in view of the above problem, and an object is to provide a composite oxide in which a metal catalyst such as ruthenium is supported and ammonia synthesis activity is further improved. Another object of the present invention is to provide a metal-supported material and an ammonia synthesis catalyst in which the metal catalyst such as ruthenium is supported and the ammonia synthesis activity is further improved. Still another object of the present invention is to provide a manufacturing method for a composite oxide for improving the ammonia synthesis activity, and a manufacturing method for a metal-supported material and a manufacturing method for ammonia for further improving the ammonia synthesis activity.

Solution to Problem

In order to solve the problem described above, the present inventors have discovered that, in the metal-supported material including the composite oxide as the carrier, the metal oxide in the composite oxide having a particular valence exhibits the excellent catalyst activity and the partial negative charge of oxygen in the composite oxide has an influence on the catalyst activity, and thus have made the invention as follows.

In the present invention, the term "composite oxide" refers to, in a narrow sense, what is called a solid solution in which oxides of a plurality of elements have a uniform phase and in a broad sense, a composite oxide in which oxides of a plurality of elements have a non-uniform phase or a composition of oxides of a plurality of elements.

[1] A composite oxide including a metal element expressed by a composition of General Formula (1):

$$A_nX_yM_m \qquad (1)$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$ y satisfies $0<y<1$, m satisfies $0\leq m<1$, and $n+y+m=1$).

[1A] A composite oxide including a metal element expressed by a composition of General Formula (1A) and a partial negative charge of oxygen defined in Formula (A) is 0.52 or more:

$$A_nX_yM_m \qquad (1A)$$

$$((\Pi\chi_i^{ni})^{1/\Sigma ni}-5.21)/-4.75 \qquad \text{Formula (A)}$$

(in General Formula (1A), A represents a lanthanoid element that is in a trivalent state at least partially or entirely, X represents an element that is a Group-2 element in a periodic table selected from the group consisting of Ca, Sr, and Ba, M represents an element that is a Group-1 element in a periodic table, a Group-2 element selected from the group consisting of Ca, Sr, and Ba, or a lanthanoid element, and that is different from the A and the X, n satisfies $0<n<1$, y satisfies $0<y<1$, m satisfies $0\leq m<1$, $n+y+m=1$, and when each element in the composite oxide in Formula (A) is expressed by a subscript i (i includes at least one of A, X, M, and O), the composition ratio of each element is expressed by ni and the Sanderson electronegativity of each element is expressed by $\chi i$).

[1B] A composite oxide expressed by General Formula (1B):

$$A_nX_yM_mO_x \qquad (1B)$$

(in General Formula (1B), A represents a rare earth element that is in a trivalent state at least partially, X represents an element that is a Group-2 element in a periodic table, a Group-4 element, or a rare earth element and that is different from the A, M represents an element that is a Group-2 element in a periodic table, a Group-4 element, or a rare earth element and that is different from the A and the X, n satisfies $0<n<1$, y is $1-n$, m satisfies $0\leq m\leq 0.5$, and x represents the number of oxygen atoms necessary for the composite oxide to keep neutral electrically).

[1C] A composite oxide expressed by General Formula (1C):

$$A_nX_yM_m \qquad (1C)$$

(in General Formula (1C), A represents a rare earth element that is in a trivalent state at least partially, X represents an element that is a Group-2 element in a periodic table, a Group-4 element, or a rare earth element and that is different from the A, M represents an element that is a Group-1 element in a periodic table, a Group-2 element, a Group-4 element, or a rare earth element and that is different from the A and the X, n satisfies $0<n<1$, y satisfies $0<y<1$, m satisfies $0\leq m<1$, and $n+y+m=1$).

[1D] The composite oxide according to any of the aforementioned [1], [1A], [1B], and [1C], that is selected from $Ce_nLa_yO_x$, $Pr_nLa_yO_x$, and $Ce_nPr_yO_x$ ($n=0.1$ to 0.9, $y=0.1$ to 0.9, and $n+y=1$).

[1E] The composite oxide according to any of the aforementioned [1], [1A], [1B], and [1C], that is selected from $Ce_nBa_yLa_mO_x$, $La_nBa_yPr_mO_x$, and $Pr_nBa_yCe_mO_x$ ($n=0.1$ to 0.99, $y=0.01$ to 0.3, $m=0$ to 0.9, and $n+y+m=1$).

[1F] The composite oxide according to the aforementioned [1] that is selected from $Ce_{0.5}La_{0.5}O_x$, $Pr_{0.5}La_{0.5}O_x$, $Ce_{0.5}Pr_{0.5}O_x$, $Ce_{0.85}La_{0.15}O_x$, $Ce_{0.67}La_{0.33}O_x$, $Ce_{0.33}La_{0.67}O_x$, and $Ce_{0.15}La_{0.85}O_x$.

[1G] The composite oxide according to the aforementioned [1] that is selected from $Ba_{0.1}La_{0.45}Ce_{0.45}O_x$, $Ba_{0.3}Pr_{0.35}Ce_{0.35}O_x$, $Ba_{0.3}Ce_{0.35}Pr_{0.35}O_x$, $Ba_{0.3}La_{0.35}Ce_{0.35}O_x$, $Ba_{0.1}La_{0.3}Ce_{0.6}O_x$, $Ba_{0.1}La_{0.6}Ce_{0.3}O_x$, $Ba_{0.1}La_{0.8}Ce_{0.1}O_x$, $Ba_{0.05}La_{0.475}Ce_{0.475}O_x$, $Ba_{0.15}La_{0.425}Ce_{0.425}O_x$, $Ba_{0.1}Pr_{0.24}Ce_{0.45}O_x$, and $Ba_{0.3}La_{0.35}Pr_{0.35}O_x$.

[1H] A binary composite oxide including a metal element expressed by a composition of General Formula (1-1):

$$A_nX_y \qquad (1\text{-}1)$$

(in General Formula (1-1),

A represents lanthanoid that is in a trivalent state at least partially or entirely, X represents an element that is a Group-2 element in a periodic table selected from the group consisting of Ca, Sr, and Ba, or lanthanoid, and that is different from the A, n satisfies $0<n<1$, y satisfies $0<y<1$, and $n+y=1$).

[1K] A ternary composite oxide including a metal element expressed by a composition of General Formula (1-2):

$$A_nX_yM_m \qquad (1\text{-}2)$$

(in General Formula (1-2),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0<m<1$, and $n+y+m=1$).

[2] The composite oxide according to any one of the aforementioned [1] to [1K], in which a ratio ($A^{3+}/A_{total}$) of the number of moles of the element in the trivalent state ($A^{3+}$) to the total number of moles of the A ($A_{total}$) satisfies $0.1 \leq A^{3+}/A_{total} \leq 1.0$.

[3] The composite oxide according to any one of the aforementioned [1] to [1K] and [2], in which the composite oxide includes a solid solution that is a tetragonal crystal or a cubic crystal.

[4-1] The composite oxide according to any one of the aforementioned [1] to [1K], [2], and [3], in which at least one of the elements A, X, and M in the composite oxide is an element with strong basicity in which the value of the partial negative charge ($-\delta_o$) of oxygen in the oxide state is 0.50 or more.

[4-2] The composite oxide according to any one of the aforementioned [1] to [1K], [2], and [3], in which the composition ratio of each element in the composite oxide is ni (i represents all the elements in the composite oxide including A, X, M, and O) and the Sanderson electronegativity of each element is $\chi$i (i represents all the elements in the composite oxide including A, X, M, and O), the value of the partial negative charge ($-\delta_o$) of oxygen expressed by the following Formula (A) is 0.52 or more.

$$((\Pi(\chi i^{ni}))\hat{}(1/\Sigma ni)-5.21)/-4.75 \qquad \text{Formula (A)}$$

[5] The composite oxide according to any one of the aforementioned [2], [3], [4-1], and [4-2], in which General Formula (1) is a binary composite oxide expressed by the following General Formula (1-1):

$$A_nX_y \qquad (1\text{-}1)$$

(A, X, n, and y are defined in the above [1H]), and the composite oxide is a solid solution of the A and the X.

[6] The composite oxide according to any one of the aforementioned [2], [3], [4-1], and [4-2], in which General Formula (1) is a ternary composite oxide expressed by the following General Formula (1-2):

$$A_nX_yM_m \qquad (1\text{-}2)$$

(A, X, M, n, y, and m are defined in the above [1K]), and the composite oxide is in a mixed state in which a solid solution of the A and an oxide of one of the X and the M, and an oxide of the other of the X and the M are mixed.

[7] The composite oxide according to any one of the aforementioned [1] to [1K], [2], [3], [4-1], [4-2], [5], and [6], in which the X in General Formulae (1), (1A), (1B), (1C), (1-1), and (1-2) is Ba and the quantity of carbonate ions included in the composite oxide is 10 mol % or less of Ba.

[7A] The composite oxide according to any one of the aforementioned [1] to [1K], [2], [3], [4-1], [4-2], [5], and [6], in which the X in General Formulae (1), (1A), (1B), (1C), (1-1), and (1-2) is Ba and the quantity of carbonate ions included in the composite oxide is 1 mol % or less of Ba.

[7B] The composite oxide according to any one of the aforementioned [1] to [1K], [2], [3], [4-1], [4-2], [5], and [6], in which the X in General Formulae (1), (1A), (1B), (1C), (1-1), and (1-2) is Ba and the quantity of carbonate ions included in the composite oxide is 0.1 mol % or less of Ba.

[7C] The composite oxide according to any one of the aforementioned [1] to [1K], [2], [3], [4-1], [4-2], [5], and [6], in which the X in General Formulae (1), (1A), (1B), (1C), (1-1), and (1-2) is Ba and the quantity of carbonate ions included in the composite oxide is 0.01 mol % or less of Ba.

[8] A composite oxide including a metal element expressed by General Formula (1A):

$$A_nX_yM_m \qquad (1\text{A})$$

(in General Formula (1A),

A represents a rare earth element that is in a trivalent state at least partially or entirely, X represents an element that is a Group-2 element in a periodic table, a Group-4 element, or a rare earth element, and that is different from the A, M represents an element that is a Group-1 element in a periodic table, a Group-2 element, a Group-4 element, or a rare earth element, and that is different from the A and the X, n satisfies $0<n<1$, y satisfies $0<y<1$, m satisfies $0 \leq m<1$, and $n+y+m=1$).

[8A] The composite oxide according to the aforementioned [8], in which a ratio ($A^{3+}/A_{total}$) of the number of moles of the element in the trivalent state ($A^{3+}$) to the total number of moles of the A ($A_{total}$) satisfies $0.1 \leq A^{3+}/A_{total} \leq 1.0$.

[8B] The composite oxide according to the aforementioned [8], in which $m=0$.

[8C] The composite oxide according to the aforementioned [8] that is selected from $Ce_{0.5}La_{0.5}O_x$, $Ce_{0.5}Zr_{0.5}O_x$, $Pr_{0.5}La_{0.5}O_x$, $Pr_{0.5}Zr_{0.5}O_x$, and $Ce_{0.5}Pr_{0.5}O_x$.

[8D] The composite oxide according to the aforementioned [8] that is selected from $Ba_{0.1}La_{0.45}Ce_{0.45}O_x$, $Ba_{0.3}Pr_{0.35}Ce_{0.35}O_x$, $Ba_{0.3}Ce_{0.35}Pr_{0.35}O_x$, and $Ba_{0.3}La_{0.35}Ce_{0.35}O_x$.

[9] A composite oxide expressed by General Formula (2):

$$A_nX_{1-n}M_mO_x \qquad (2)$$

(In General Formula (2),

A represents a rare earth element that is in a trivalent state at least partially, X represents an element that is a Group-2 element in a periodic table, a Group-4 element, or a rare earth element, and that is different from the A, M represents an element that is a Group-2 element in a periodic table, a Group-4 element, or a rare earth element, and that is different from the A and the X, n satisfies $0<n<1$, m satisfies $0 \leq m \leq 0.5$, and x represents the number of oxygen atoms necessary for the composite oxide to keep neutral electrically).

[9A] The composite oxide according to the aforementioned [9], in which $m=0$.

[9B] The composite oxide according to the aforementioned [9] that is selected from $Ce_{0.5}La_{0.5}O_x$.

[9C] The composite oxide according to the aforementioned [9], in which $0.5<x \leq 2$ is satisfied.

[11] A metal-supported material in which transition metal excluding Group-4 elements is supported by the composite oxide according to any one of the aforementioned [1] to [9C].

[11A] The metal-supported material according to the aforementioned [11], in which the transition metal is Ru.

[11B] The metal-supported material according to the aforementioned [11], in which the transition metal is Co.

[11C] The metal-supported material according to the aforementioned [11], in which the transition metal is one or more kinds selected from the group consisting of Ru, Fe, Co, Ni, Rh, Pd, Os, Ir, and Pt.

[11D] The metal-supported material according to the aforementioned [11], in which the transition metal is Ru and/or Co.

[11E] A metal-supported material in which a transition metal excluding Group-4 elements is supported by a composite oxide including a metal element expressed by a composition of General Formula (1):

$$A_nX_yM_m \tag{1}$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0 < n < 1$, y satisfies $0 < y < 1$, m satisfies $0 \leq m < 1$, and $n + y + m = 1$).

[12] The metal-supported material according to any one of the aforementioned [11 ] to [11E], in which a ratio of a value ($D_{ads}$) of a dispersion degree of the transition metal excluding Group-4 elements obtained by an $H_2$ pulse chemical adsorption method to a value ($D_{TEM}$) of the dispersion degree of the transition metal predicted from the average particle diameter of particles of the transition metal obtained from a TEM image satisfies $0 < D_{ads}/D_{TEM} < 1$.

[12A] The metal-supported material according to the aforementioned [11A], in which the ratio of the value ($D_{ads}$) of a Ru dispersion degree obtained by the $H_2$ pulse chemical adsorption method to the value ($D_{TEM}$) of the Ru dispersion degree expected from the average particle diameter of the Ru particles obtained from the TEM image satisfies $0 < D_{ads}/D_{TEM} < 1$.

[12B] The metal-supported material according to the aforementioned [11B], in which the ratio of the value ($D_{ads}$) of a Co dispersion degree obtained by the $H_2$ pulse chemical adsorption method to the value ($D_{TEM}$) of the Co dispersion degree expected from the average particle diameter of the Co particles obtained from the TEM image satisfies $0 < D_{ads}/D_{TEM} < 1$.

[13] The metal-supported material according to any one of the aforementioned [11] to [12B], in which when nitrogen is adsorbed on the supported transition metal, N≡N stretching vibration υ1 of nitrogen molecules that mutually act in a major-axis direction is observed in 2300 to 2000 cm$^{-1}$ by an infrared absorption spectroscopy, and/or weakened N≡N stretching vibration υ2 of the nitrogen molecules that mutually act in the major-axis direction for the transition metal is observed in 1900 to 1500 cm$^{-1}$.

[13A] The metal-supported material according to any one of the aforementioned [11] to [12B], in which the υ1 is 2100 to 2000 cm$^{-1}$ and the υ2 is 1700 to 1900 cm$^{-1}$.

[13B] The metal-supported material according to any one of the aforementioned [11] to [12B], in which the transition metal is Ru.

[13C] The metal-supported material according to any one of the aforementioned [11] to [12B], in which when nitrogen is adsorbed and measurement is performed with an infrared spectrometer, an absorption peak derived from the adsorbed nitrogen molecule appears at 2200 cm$^{-1}$ or less.

[13D] The metal-supported material according to any one of the aforementioned [11] to [12B], in which the absorption peak appears in 1900 to 1700 cm$^{-1}$.

[14] The metal-supported material according to any one of the aforementioned [11] to [13D], in which the average particle diameter of the transition metal supported on the composite oxide is 100 nm or less.

[14A] The metal-supported material according to any one of the aforementioned [11] to [14], in which the transition metal is Ru and the average particle diameter of Ru supported on the composite oxide is 5 nm or less.

[14B] The metal-supported material according to any one of the aforementioned [11] to [14], in which the transition metal is Co and the average particle diameter of Co supported on the composite oxide is 100 nm or less.

[15] The metal-supported material according to any one of the aforementioned [11] to [14B], in which the amount of carbonate included in the metal-supported material is 10 mol % or less of the Group-2 element X in the periodic table selected from the group consisting of Ca, Sr, and Ba.

[15A] The metal-supported material according to any one of the aforementioned [11] to [15], in which the quantity of carbonate is 1 mol % or less.

[15B] The metal-supported material according to any one of the aforementioned [11] to [15], in which the quantity of carbonate is 0.1 mol % or less.

[15C] The metal-supported material according to any one of the aforementioned [11] to [15], in which the quantity of carbonate is 0.01 mol % or less.

[16] An ammonia synthesis catalyst including the metal-supported material according to any one of the aforementioned [11] to [15C].

[16A] The ammonia synthesis catalyst according to the aforementioned [16], in which an ammonia yield measured by an ammonia activity measuring method below is 0.55% or more and ammonia generation rate is 10.0 mmol g$^{-1}$ h$^{-1}$.

<Ammonia Activity Measuring Method>

In the ammonia activity measuring method, Ar is supplied while the temperature of the ammonia synthesis catalyst layer is maintained at 300° C. and the pressure is increased up to 1.0 MPa or 3.0 MPa by a back pressure regulating valve at an outlet of a reaction tube, the injection of Ar is stopped, while the pressure is maintained, H2 and N2 are fed at 90 mL/min and 30 mL/min (space velocity 72 L h−1 g−1), respectively so that the atmosphere shifts to a reaction atmosphere, in accordance with the level of the NH3 synthesis activity, 200 mL of sulfuric acid aqueous solution for 1 to 100 mM (1, 5, 10, 25, 100 mM) is added to a three-necked flask with a conductivity meter connected thereto, a mixed gas including hydrogen, nitrogen, and NH3 flowing out of the outlet of the reaction tube is bubbled in the sulfuric acid aqueous solution, and the change in electric conductivity because of the reaction between NH3 and sulfuric acid is measured, so that the quantity of generated ammonia in the outlet gas is measured.

[16B] An ammonia synthesis catalyst including a metal-supported material in which a transition metal excluding Group-4 elements is supported by a composite oxide including a metal element expressed by a composition of General Formula (1):

$$A_nX_yM_m \tag{1}$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0\leq m<1$, and $n+y+m=1$).

[17] A manufacturing method for the composite oxide according to any one of the aforementioned [1] to [9C], the manufacturing method including:

a mixing step of mixing an A precursor including the A, an X precursor including the X, and an M precursor including the M to obtain a mixture; and a calcinating step of calcinating the mixture at 600° C. or more.

[17A] The manufacturing method for the composite oxide according to the aforementioned [17], in which the mixture is calcinated at 700° C. or more in the calcinating step.

[17B] The manufacturing method for the composite oxide according to the aforementioned [17] or [17A], in which the mixture is calcinated at 800° C. or less in the calcinating step.

[17C] A manufacturing method for a composite oxide including a metal element expressed by a composition of General Formula (1):

$$A_nX_yM_m \tag{1}$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0\leq m<1$, and $n+y+m=1$), the manufacturing method including:

a mixing step of mixing an A precursor including the A, an X precursor including the X, and an M precursor including the M to obtain a mixture; and a calcinating step of calcinating the mixture at 600° C. or more.

[18] The manufacturing method for the metal-supported material according to any one of the aforementioned [11] to [15C], the manufacturing method including:

a mixing step of mixing an A precursor including the A, an X precursor including the X, and an M precursor including the M to obtain a mixture;

a calcinating step of calcinating the mixture at 600° C. or more to obtain a carrier including the composite oxide;

a supporting step of supporting a compound including the transition metal on the composite oxide to prepare a before-reducing process supporting material; and a reducing step of performing a reducing process on the before-reducing process supporting material at 400° C. or more.

[18A] The manufacturing method for the metal-supported material according to the aforementioned [18], in which the mixture is calcinated at 700° C. or more in the calcinating step.

[18B] The manufacturing method for the metal-supported material according to the aforementioned [18] or [18A], in which the mixture is calcinated at 800° C. or less in the calcinating step.

[18C] The manufacturing method for the metal-supported material according to any one of the aforementioned [18] to [18B], in which the mixture is reduced at 350° C. or more for 2 hours or more in an atmosphere including hydrogen in the reducing step.

[18D] The manufacturing method for the metal-supported material according to any one of the aforementioned [18] to [18C], in which the reducing process supporting material is calcinated at 500° C. or more for 2 hours or more in an atmosphere including hydrogen in the reducing step.

[18E] A manufacturing method for a metal-supported material in which a transition metal excluding Group-4 elements is supported by a composite oxide including a metal element expressed by a composition of General Formula (1):

$$A_nX_yM_m \tag{1}$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0\leq m<1$, and $n+y+m=1$), the manufacturing method including:

a mixing step of mixing an A precursor including the A, an X precursor including the X, and an M precursor including the M to obtain a mixture;

a calcinating step of calcinating the mixture at 600° C. or more to obtain a carrier including the composite oxide;

a supporting step of supporting a compound including the transition metal on the composite oxide to prepare a before-reducing process supporting material; and a reducing step of performing a reducing process on the before-reducing process supporting material at 400° C. or more.

[19] A manufacturing method for ammonia by bringing hydrogen, nitrogen, and a catalyst in contact with each other, the catalyst being the ammonia synthesis catalyst according to any one of the aforementioned [16] to [16B].

[19A] The manufacturing method for ammonia according to the aforementioned [19], in which the reaction temperature is 300 to 550° C. and the reaction pressure is 0.1 to 20 MPa.

[19B] The manufacturing method for ammonia according to any one of the aforementioned [19] to [19A], in which the reaction temperature is 300 to 450° C. and the reaction pressure is 0.1 to 10 MPa.

[19C] A manufacturing method for ammonia by bringing hydrogen, nitrogen, and a catalyst in contact with each other, the catalyst being the ammonia synthesis catalyst including a metal-supported material in which a transition metal excluding Group-4 elements is supported by a composite oxide including a metal element expressed by a composition of General Formula (1):

$$A_nX_yM_m \qquad (1)$$

(in General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0 \leq m<1$, and $n+y+m=1$).

Advantageous Effects of Invention

According to the present invention, the composite oxide in which the catalyst metal such as metal ruthenium is supported and the ammonia synthesis activity is further improved can be provided, and by using the composite oxide as the carrier of the ammonia synthesis catalyst, ammonia can be manufactured with higher yield under a milder condition than in the Haber-Bosch process. Moreover, according to the present invention, the metal-supported material and the ammonia synthesis catalyst in which the catalyst metal such as metal ruthenium is supported and the ammonia synthesis activity is further improved can be provided. Furthermore, according to the present invention, the manufacturing method for the composite oxide, and the manufacturing method for the metal-supported material and the manufacturing method for ammonia for improving the ammonia synthesis activity can be provided.

BRIEF DESCRIPTION OF THE DRAWINGS

FIGS. 2A-2I illustrate HR-TEM and EDX mapping images of a Ru supporting composite oxide that is obtained by reducing $Ru/La_{0.5}Ce_{0.5}O_{1.75}$ at different temperatures and exposing the reduced element to the air, and histograms of Ru particle diameters.

FIG. 2A is a STEM image of $LaCeO_x\_500°$ Cred.

FIG. 2B is an EDX mapping of $LaCeO_x\_500°$ Cred.

FIG. 2C is a histogram of $LaCeO_x\_500°$ Cred.

FIG. 2D is a STEM image of $LaCeO_x\_650°$ Cred.

FIG. 2E is an EDX mapping of $LaCeO_x\_650°$ Cred.

FIG. 2F is a histogram of $LaCeO_x\_650°$ Cred.

12

FIG. 2G is a STEM image of $LaCeO_x\_800°$ Cred.

FIG. 2H is an EDX mapping of $LaCeO_x\_800°$ Cred.

FIG. 2I is a histogram of $LaCeO_x\_800°$ Cred.

Figure 3:
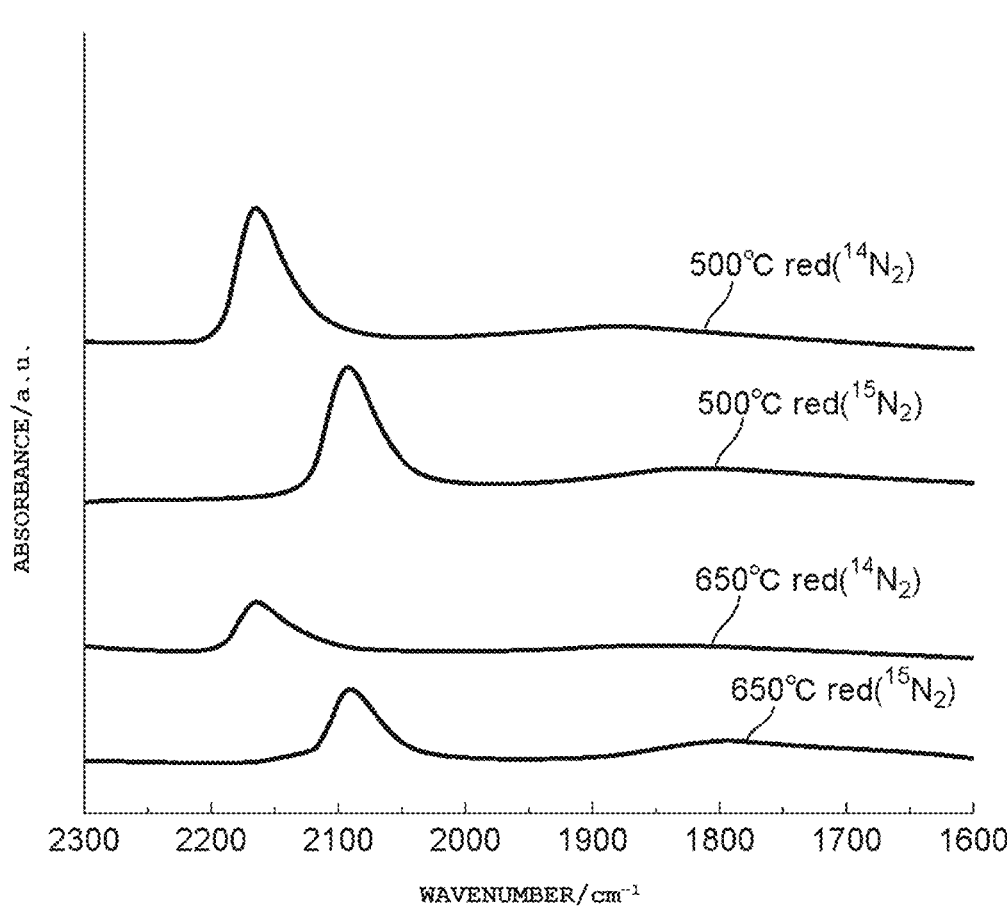

FIG. 3 illustrates IR spectra after $N_2$ is added to the reduced metal-supported materials at room temperature.

Figure 4:
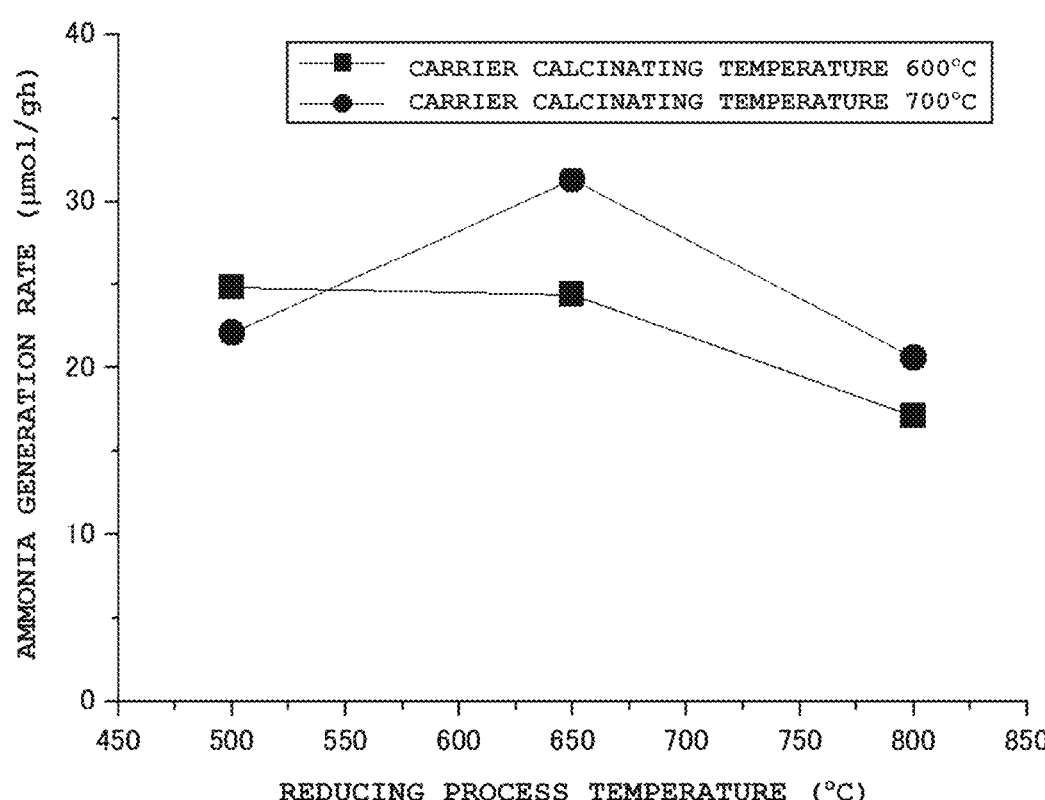

FIG. 4 is a graph expressing a relation between ammonia generation rate and reducing process temperature.

FIG. 5 is a chart expressing a relation among ammonia generation rate H/Ru, a decrease in specific surface area, and a change in Ru particle diameter because of a difference between calcinating temperature of a composite oxide and reducing process temperature of a metal-supported material.

Figure 6:
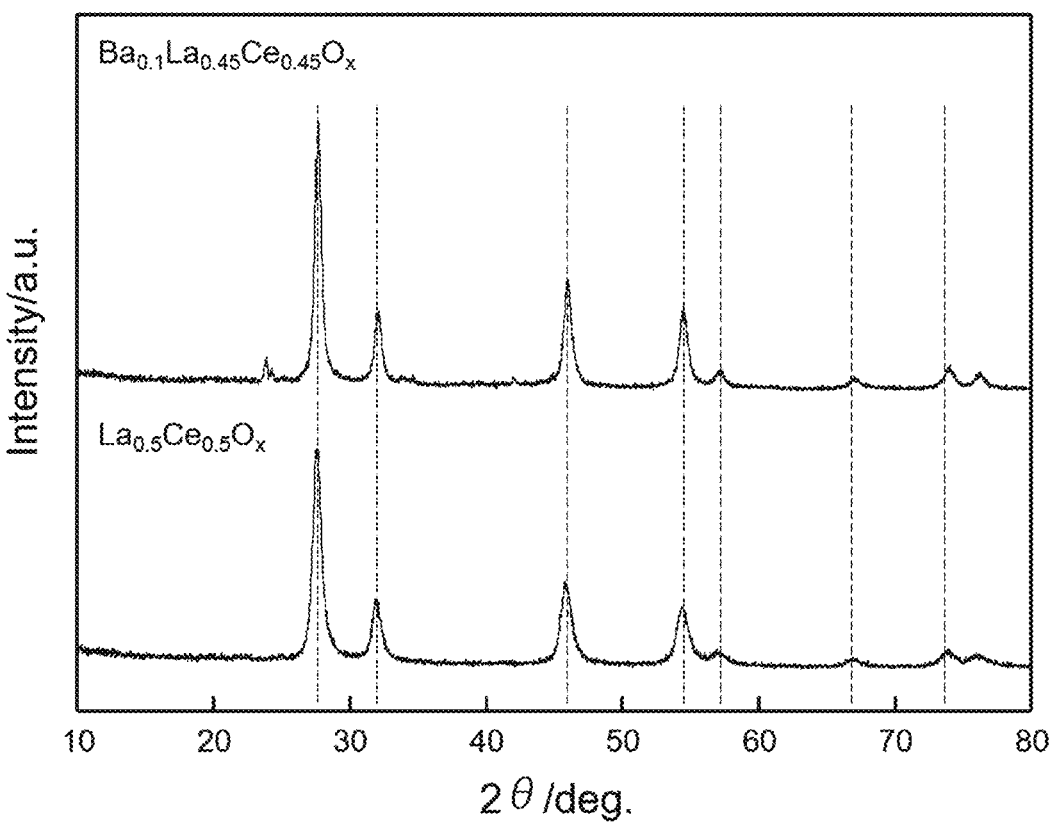

FIG. 6 illustrates XRD patterns of $Ru/Ba_{0.1}La_{0.45}Ce_{0.45}O_x$ and $Ru/La_{0.5}Ce_{0.5}O_x$.

Figure 7:
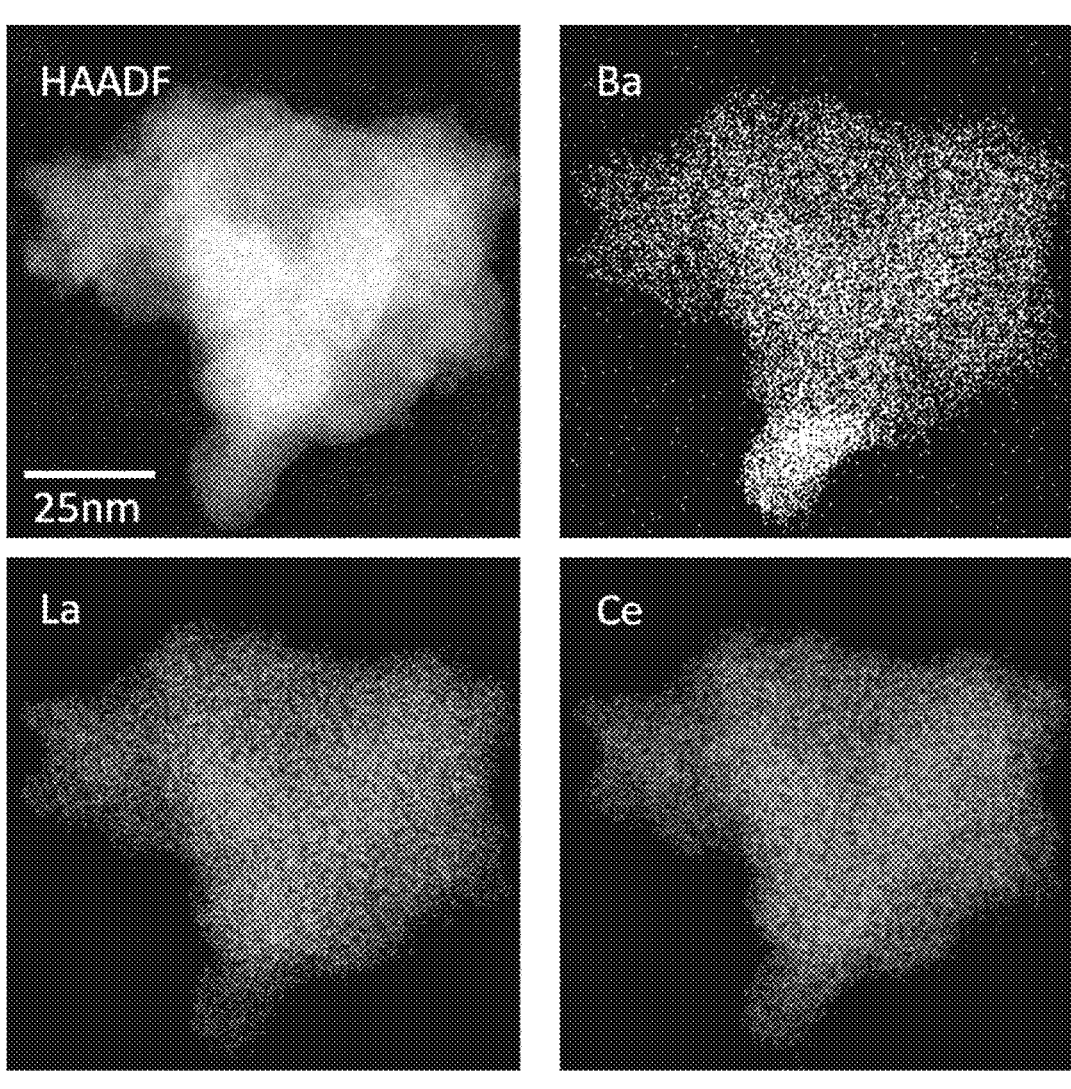

FIG. 7 illustrates an image of a surface of $Ru/Ba_{0.1}La_{0.45}Ce_{0.45}O_x$ that is analyzed using an aberration corrected transmission electron microscope in accordance with an X-ray fluorescence analysis.

DESCRIPTION OF THE INVENTION

A composite oxide according to the present invention is a composite oxide including a metal element expressed by a composition of the following General Formula (1):

$$A_nX_yM_m \qquad (1)$$

In this composite oxide, (1) it is preferable that A is a rare earth element that is in a trivalent state at least partially or entirely, and particularly, lanthanoid that is in a trivalent state at least partially or entirely;

(2) it is preferable that X represents an element that is selected from a Group-2 element, a Group-4 element, and a rare earth element in the periodic table and that is different from A, and particularly, one of a Group-2 element in the periodic table selected from the group consisting of Ca, Sr, and Ba and lanthanoid and different from A;

(3) it is preferable that M represents an element that is selected from a Group-1 element, a Group-2 element, a Group-4 element, and a rare earth element in the periodic table and that is different from the A and the X, and particularly, one of a Group-1 element in the periodic table, a Group-2 element selected from the group consisting of Ca, Sr, and Ba, and lanthanoid and different from the A and the X; and (4) n satisfies $0<n<1$, y satisfies $0<y<1$, m satisfies $0 \leq m<1$, and $n+y+m=1$ is satisfied.

The composite oxide according to the present invention is particularly preferably a composite oxide including a metal element expressed by the composition of General Formula (1):

$$A_nX_yM_m \qquad (1)$$

(In General Formula (1),

A represents lanthanoid that is in a trivalent state at least partially or entirely, X represents an element that is a Group-2 element in a periodic table selected from the group consisting of Ca, Sr, and Ba, or lanthanoid, and that is different from the A, M represents an element that is a Group-1 element in a periodic table, a Group-2 element selected from the group consisting of Ca, Sr, and Ba, or lanthanoid, and that is different from the A and the X, n satisfies $0<n<1$, y satisfies $0<y<1$, m satisfies $0 \leq m < 1$, and $n+y+m=1$).

Alternatively, the composite oxide according to the present invention may be a composite oxide including a metal element expressed by General Formula (1A):

$$A_n X_y M_m \quad (1A)$$

(In General Formula (1A),

A represents a rare earth element that is in a trivalent state at least partially or entirely, X represents an element that is a Group-2 element in a periodic table, a Group-4 element, or a rare earth element, and that is different from the A, M represents an element that is a Group-1 element in a periodic table, a Group-2 element, a Group-4 element, or a rare earth element, and that is different from the A and the X, n satisfies $0 < n < 1$, y satisfies $0 < y < 1$, m satisfies $0 \leq m < 1$, and $n+y+m=1$).

Further alternatively, the composite oxide according to the present invention may be a composite oxide expressed by General Formula (2):

$$A_n X_y M_m O_x \quad (2)$$

(In General Formula (2),

A represents a rare earth element that is in a trivalent state at least partially or entirely, X represents an element that is a Group-2 element in a periodic table, a Group-4 element, or a rare earth element, and that is different from the A, M represents an element that is a Group-2 element in a periodic table, a Group-4 element, or a rare earth element, and that is different from the A and the X, n satisfies $0 < n < 1$, y is $1-n$, m satisfies $0 \leq m \leq 0.5$, and x represents the number of oxygen atoms necessary for the composite oxide to keep neutral electrically).

In the composite oxide including the metal element expressed by the composition of General Formula (1), at least one of the elements A, X, and M is preferably a strong basic element in which a value of a partial negative charge ($-\delta_o$) of oxygen in an oxide state is 0.50 or more.

The element A is a rare earth that is in a trivalent state at least partially or entirely. Here, the expression "that is in a trivalent state at least partially or entirely" means, if the element can have only the trivalent state, that trivalent state and if the element can have the trivalent and other states (for example, tetravalent state), the state that is trivalent at least partially or entirely. That is to say, as the element A, the element that can have only the trivalent state or the element that can have both the trivalent and tetravalent states and that is trivalent at least partially or entirely is included. In order to make the element, which can have both the trivalent and tetravalent states, have the trivalent state at least partially, a part of the tetravalent element is made trivalent by a reducing process that is described below.

In the present invention, at least one of the elements A, X, and M in the catalyst is the strong basic element exhibiting strong basicity in the oxide state; thus, the activity of the ammonia synthesis catalyst can be improved. The summary of the mechanism is described below.

The basicity of the metal oxide (Lewis basicity) is related with the electron donating capability. That is to say, it is considered that as the electron donating capability is higher, the basicity is higher. Since oxygen acts as the electron donator in the oxide basically, the amount of charges in oxygen in the oxide, that is, the partial negative charge in oxygen is useful as an index of the basicity. In fact, Non-Patent Literature ("Inorganic chemistry (vol. 1)" Sanderson, Hirokawa Publishing Co., Tokyo, (1975) Table 12.7 on page 276) describes that the value of the partial negative charge in oxygen is in correlation with the acid basicity of the oxide.

For a method of calculating the partial negative charge in oxygen, Non-Patent Literature ("Inorganic chemistry (vol. 1)" Sanderson, Hirokawa Publishing Co., Tokyo, (1975) Table 6.7 on page 122, and pages 126-128) is referred to. First, the composition ratio of the elements in the composite oxide is obtained. For example, in "$Ce_{0.5}La_{0.5}O_{1.75}$", the composition ratio of La is 0.5. This value is ni (i is the corresponding element). In addition, the electronegativity of each element is $\chi i$. Then, the geometric average of the electronegativity of the entire atoms in the composite oxide is obtained from $((\Pi(\chi i^{ni}))^{(1/\Sigma ni)}$. Next, in order to obtain from the electronegativity of oxygen, the difference between the geometric average and the electronegativity (5.21) of oxygen is obtained. Finally, this is divided by the change (−4.75) of the electronegativity in the case where one oxygen atom acquires one electron from the change of electronegativity of oxygen. Through this calculation, the partial negative charge of oxygen expressed by the composite oxide can be calculated. For the details, refer to Examples below.

In short, regarding the value of the partial negative charge in oxygen of the composite oxide, when the composition ratio of each element in the composite oxide is ni (i=all the elements in the composite oxide including at least A, X, M, and O) and the electronegativity of each element is $\chi i$ (i=all the elements in the composite oxide including at least A, X, M, and O), the value of the partial negative charge in oxygen expressed by the following Formula (A) is preferably 0.52 or more.

$$((\Pi(\chi i^{ni}))^{(1/\Sigma ni)}-5.21)/-4.75 \quad \text{Formula (A)}$$

The value of the partial negative charge in oxygen of the composite oxide is preferably 0.52 or more, more preferably 0.55 or more, and particularly preferably 0.57 or more. When the value of the partial negative charge in oxygen of the composite oxide is 0.52 or more, the ammonia synthesis activity tends to be higher. The upper limit of the value of the partial negative charge in oxygen of the composite oxide is not limited to a particular value, and theoretically, about 0.70 at maximum.

In a case where A is the element that is trivalent like La, these are the metal elements with strong basicity. Therefore, an electron is generated from a basic point of the composite oxide (carrier) and this is reversely donated to a nitrogen molecule through a transition metal (such as Ru) supported by the composite oxide, and weakens the nitrogen triple bond. Thus, the energy of cutting the triple bond of the nitrogen molecule in the rate-limiting step of the ammonia synthetic reaction is decreased and the ammonia synthesis activity of a metal-supported material (catalyst) is improved.

In a case where A is the element that can be both trivalent and tetravalent like Ce, the trivalent element becomes the metal element with strong basicity and the tetravalent element is less basic than the trivalent element. At the time when the raw materials are mixed and calcinated into the composite oxide, Ce is tetravalent but can be made trivalent at least partially or entirely by a reducing process that is described below, and this can be made the strong basic element. Thus, the ammonia synthesis activity of the metal-supported material is improved by the mechanism similar to that in the case where the A is La. In addition, as the tetravalent element is reduced to the trivalent element, the element is oxidized again into the tetravalent element and the electron that can be donated is generated. As this electron is reversely donated to the nitrogen molecule through a transition metal (such as Ru), the ammonia synthesis activity of the metal-supported material is improved.

Although the element A is the strong basic element in the above description, the element X and the element M, which are described below, can also be the strong basic element similarly. In particular, in the case of the binary composite oxide including the elements A and X, it is preferable that both the elements A and X have the strong basicity. In the case of the ternary composite oxide including the elements A, X, and M, the element M may have the stronger basicity than the elements A and X. In particular, in the case where the element X and/or M is the Group-2 element in the periodic table selected from Ca, Sr, and Ba, the element X and/or M tends to have higher basicity than the element A (rare earth).

Note that, in the case where the strong basic element, particularly the element M, is the Group-2 element in the periodic table, this element tends to react with carbon dioxide in the atmosphere to become metal carbonate or hydroxide. The metal carbonate and the hydroxide decrease the basicity of the composite oxide and decrease the ammonia synthesis activity of the catalyst. For example, Ba becomes $BaCO_3$ or $Ba(OH)_2$ in the atmosphere and this decreases ammonia synthesis activity. Thus, it is preferable that the ammonia synthesis catalyst includes as little metal carbonate or hydroxide as possible. In order to decrease the carbonate, a reducing process is preferably performed as described below, and this process can decompose the carbonate or hydroxide in the catalyst and prevent the decrease in basicity. The quantity of carbonate in the metal-supported material is not limited in particular and may be any amount within the range not interrupting the ammonia synthesis activity. The amount of the carbonate included in the metal-supported material is not limited to a particular amount when the amount is in the range that does not block the ammonia synthesis activity. For example, the carbonate is included by 10 mol % or less, preferably 1 mol % or less, more preferably 0.1 mol % or less, and much more preferably 0.01 mol % or less of the Group-2 element X in the periodic table selected from the group consisting of Ca, Sr, and Ba.

As a method of quantitatively determining the amount of metal existing as the carbonate, hydrocarbon such as methane that is generated because a carbonate species is hydrogenated when a catalyst is heated in the flow of hydrogen is detected by a mass spectrometer, a flame ionization detector, or the like and by converting this detected value, the amount of metal existing as the carbonate can be quantitatively determined.

In addition, an infrared absorption spectroscopy that is highly sensitive to the metal carbonate can be used. An infrared ray is delivered to the catalyst and the absorption intensity of the peak of a fraction that the carbonate characteristically absorbs is measured; thus, the quantity of carbonate in the catalyst can be quantitatively determined. For example, the peak position that can be used to quantitatively determine Ba carbonate is around 3000 cm$^{-1}$, 2450 cm$^{-1}$, 1750 cm$^{-1}$, 1480 cm$^{-1}$, 1060 cm$^{-1}$, or the like.

In the case where the A is the rare earth element that can have the trivalent or more valent state (tetravalent or more), the ratio ($A^{3+}/A_{total}$) of the number of moles of the element in the trivalent state ($A^{3+}$) to the total number of moles of the A ($A_{total}$) preferably satisfies $0.1 \leq A^{3+}/A_{total} \leq 1.0$. The lower limit of the value of $A^{3+}/A_{total}$ is 0.1 or more, preferably 0.2 or more, and more preferably 0.3 or more. The upper limit of the value of $A^{3+}/A_{total}$ is limited not to a particular value and is preferably close to 1.0, and preferably 0.8 or more, more preferably 0.9 or more, and particularly preferably 0.95 or more. When the value of $A^{3+}/A_{total}$ is 0.1 or more and 0.95 or less, the performance per weight of the catalyst in the case where the catalyst is the ammonia synthesis catalyst is excellent. One example of such a rare earth element is Ce.

On the other hand, in the case where the A is the rare earth element that can have only the trivalent state, $A^{3+}/A_{total}$ is 1.00. One example of such a rare earth is La.

In the case where the A is the rare earth element that can have the trivalent state and more valent state (tetravalent or more), various chemical reducing methods can be used in order to obtain the intended value of $A^{3+}/A_{total}$. The simplest way is to heat the metal-supported material in the flow of hydrogen, and by changing the temperature and the heating time, $A^{3+}/A_{total}$ can be controlled to be a desired value. Moreover, by mixing with inert gas such as nitrogen or argon to change the concentration of hydrogen, $A^{3+}/A_{total}$ can be controlled to be a desired value.

The element A as described above may be lanthanoid, and is preferably Ce, Pr, Tb, or La, more preferably Ce or La, and the most preferably Ce.

In the composite oxide expressed by General Formula (1), the element X is selected from the Group-2 elements in the periodic table, that is, Mg, Ca, Sr, and Ba, the Group-4 elements in the periodic table, that is, Ti, Zr, and Hf, and the rare earth elements, that is, Sc, Y, La, Ce, Pr, Nd, Sm, Eu, Gd, Tb, Dy, Ho, Er, Tm, Yb, and Lu, and is not the same as the element A that is another constituent of the composite oxide, and the elements X and M are not the same either. When the element M is the Group-2 element in the periodic table, the element M is preferably selected from Ca, Sr, and Ba. In addition, when the element M is the rare earth, the element M is preferably lanthanoid.

In the composite oxide expressed by General Formula (1), the element M is selected from the Group-1 elements in the periodic table, that is, Na, K, Rb, Cs, and Fr, the Group-2 elements in the periodic table, that is, Mg, Ca, Sr, and Ba, the Group-4 elements in the periodic table, that is, Ti, Zr, and Hf, and the rare earth elements, that is, Sc, Y, La, Ce, Pr, Nd, Sm, Eu, Gd, Tb, Dy, Ho, Er, Tm, Yb, and Lu, and is not the same as the element A that is another constituent of the composite oxide, and the elements X and M are not the same either. When the element X is the Group-2 element in the periodic table, the element X is preferably selected from Ca, Sr, and Ba. In addition, when the element X is the rare earth, the element X is preferably lanthanoid. In particular, the element M is preferably Ba from the viewpoint of the ammonia synthesis activity.

It is preferable that X and M are selected from Zr and La. The composite oxide in the present invention may include two kinds of the Group-4 element in the periodic table or the rare earth element as X and M or may include only one kind of the Group-4 element in the periodic table or the rare earth element (in General Formula (1), m=0).

At least one of the elements A, X, and M is preferably the strong basic element in which the value of the partial negative charge ($-\delta_o$) of oxygen in the oxide state is 0.50 or more. One of the elements A, X, and M is the strong basic element in which the value of the partial negative charge ($-\delta_o$) of oxygen is 0.50 or more, and it is preferable that two or more, particularly all three of the elements A, X, and M are the strong basic elements in which the value of the partial negative $(-\delta_o)$ of oxygen is 0.50 or more.

Here, the value of the partial negative charge $(-\delta_o)$ of oxygen may be the value described in Table 12.7 in Non-Patent Literature ("Inorganic chemistry (vol. 1)" Sanderson, Hirokawa Publishing Co., Tokyo, (1975) page 276), or if the value is absent, the value can be calculated based on the partial negative charge of oxygen described above. Table below shows the typical oxides of the elements in the composite oxide used in Examples, valences, and partial negative charge $(-\delta_o)$ of oxygen.

TABLE 1

| Oxide | Valence | Partial negative charge $(-\delta_O)$ of oxygen |
|---|---|---|
| BaO | Bivalent | 0.67 |
| $La_2O_3$ | Trivalent | 0.56 |
| $Pr_2O_3$ | Trivalent | 0.55 |
| $Ce_2O_3$ | Trivalent | 0.55 |
| $Tb_2O_3$ | Trivalent | 0.54 |
| $Tb_4O7$ | Trivalent + Tetravalent | 0.50 |
| $CeO_2$ | Tetravalent | 0.49 |
| $PrO_2$ | Tetravalent | 0.48 |
| $ZrO_2$ | Tetravalent | 0.44 |

In the case where the elements A, X, and M is the element such as Ba or La in which the valence of the oxide is just one kind and the partial negative charge of oxygen in this oxide is 0.50 or more, these elements are strong basic elements. In the case of the element in which the valence of the oxide is two or more kinds, such as Ce, Pr, or Tb, it is preferable that the value of the partial negative charge $(-\delta_o)$ of oxygen that is calculated based on the ratio of the valence of the element in the composite oxide is 0.50 or more. For example, in the case where Pr included in the composite oxide is entirely tetravalent, the value of the partial negative charge $(-\delta_o)$ of oxygen is 0.48. On the other hand, in the case where Pr is entirely trivalent, the value of the partial negative charge $(-\delta_o)$ of oxygen is 0.55; thus, this is preferable over the above Pr (tetravalent) case in point of the ammonia synthesis activity. The value of the partial negative charge $(-\delta_o)$ of oxygen in the case where the trivalent and tetravalent states coexist in the element can be calculated similarly to the case of the partial negative charge of oxygen in the composite oxide described above. That is to say, once the ratio (composition ratio) between the trivalent element and the tetravalent element is known, the content of oxygen that makes oxide electrically neutral is determined; thus, the value can be calculated as the geometric average by Formula (A). In addition, in the case where, for example, two or more kinds of elements in which the trivalent state and the tetravalent state coexist like the composite oxide including Ce and Pr, the content of oxygen that makes oxide electrically neutral can be determined by using the ratio between the trivalent element and the tetravalent element in each element. The ratio between the trivalent element and the tetravalent element in each element can be obtained by a method of diffraction ray shift by XRD, X-ray absorption spectroscopy, or the like. Regarding the element in which other valence than the trivalence and tetravalence exists, the value of the partial negative charge $(-\delta_o)$ of oxygen can be calculated by a similar method.

In the case where the composite oxide according to the present invention is expressed by General Formula (1), n, y, m, and x are each in the following range.

In General Formula (1), n that expresses the ratio of the element A in the composite oxide satisfies 0<n<1, preferably 0.05<n<0.95, more preferably 0.1<n<0.9, and particularly preferably 0.35≤n≤0.5

In General Formula (1), y that expresses the ratio of the element X in the composite oxide satisfies 0<y<1, preferably 0.05<y<0.95, more preferably 0.1<y<0.9, and particularly preferably 0.35≤y≤0.5

In General Formula (1), m that expresses the ratio of the element M in the composite oxide satisfies 0≤m<1, and m in General Formula (2) satisfies 0≤m≤0.5. In both (1) and (2), m satisfies preferably 0<m<0.5, more preferably 0.05≤m≤0.45, and particularly preferably 0.1≤m≤0.3. When m is 0, the composite oxide is formed by A, X, and O only.

In General Formula (2), x that expresses the ratio of oxygen 0 in the composite oxide is the number of oxygen atoms necessary for the composite oxide to keep neutral electrically. Although depending on the kind of the A, X, and M elements, x is in the range of generally 0.5<x≤2, and particularly 1<x≤2.

The composite oxide including the metal element expressed by the composition of General Formula (1) used in the present invention and the composite oxide expressed by General Formula (2) are preferably a solid solution that is a tetragonal crystal or a cubic crystal. These crystal structures are highly symmetric and the crystal lattice thereof is flexible; thus, the crystal structure can be maintained even if the ratio of the trivalence of the element A has changed and the number of oxygen atoms has changed.

For example, in the case of the binary carrier including the two metal elements, such as $La_{0.5}Ce_{0.5}O_{1.75}$, if these elements are the composite of lanthanoid elements, the solid solution in which the elements are uniformly dissolved is often obtained. Then, the Ru particle is in direct contact with the surface thereof. In the case where Ce is reduced, La and Ce in the oxide state are both strong basic elements; therefore, it is presumed that there are many active sites with Ru and the ammonia synthesis activity becomes high.

On the other hand, in the case of the ternary carrier including three metal elements, such as $Ba_{0.1}La_{0.45}Ce_{0.45}O_x$, Ba has larger atomic radius than La and Ce. In this case, if the calcinating temperature of the raw material mixture is high, for example if the calcinating temperature is more than 1000° C., all the elements are dissolved uniformly as solid and a perovskite crystal structure is formed. On the other hand, if the calcinating temperature of the raw material mixture is low, Ba does not easily dissolve in another element because Ba is a large element. Accordingly, in the obtained structure, Ba is mixed non-uniformly in the solid solution of La and Ce, and a part of Ba exists on a surface of the solid solution of La and Ce. Since Ba is the strong basic element in which the value of the partial negative charge of oxygen is higher than that of La and Ce, the contact area between Ba and Ru increases and the active sites increase in the carrier where Ba exists on the surface non-uniformly. Accordingly, it is presumed that the ammonia synthesis activity increases.

In the case of obtaining the partial negative charge of oxygen in the present invention, in the elements forming the composite body, (a) the partial negative charge of oxygen in the oxide state may be obtained; or (b) assuming the composition ratio of each element in the composite oxide is ni (i represents all the elements in the composite oxide including A, X, M, and O) and the electronegativity of each element is $\chi_i$ (i represents all the elements in the composite oxide including A, X, M, and O), the partial negative charge may be obtained from the following Formula (A).

$$((\Pi(\chi_i^{ni}))^{\wedge}(1/\Sigma ni)-5.21)/-4.75 \qquad \text{Formula (A)}$$

In the case where the composite oxide according to the present invention forms the uniform composite oxide, the method (b) is preferable, and in the case where the composite oxide according to the present invention forms the non-uniform composite oxide, the method (a) is preferable and in this case, the result of the element with the largest absolute value among the partial negative charges of oxygen in the respective elements is used. In this specification, the value of the partial negative charge of oxygen in the composite oxide is calculated by the method (b) described above.

In the metal-supported material according to the present invention, the transition metal excluding the Group-4 element is supported by the composite oxide according to the present invention. The transition metal is preferably one or more kinds selected from the group consisting of Ru, Fe, Co, Ni, Rh, Pd, Os, Ir, and Pt, and more preferably Ru and/or Co because the catalyst activity is high. The quantity ratio between the transition metal and the composite oxide can be determined in consideration of the catalyst activity and the cost of the transition metal, and for example, the ratio of the transition metal to the entire metal-supported material is preferably in the range of 0.1 to 50 wt %, more preferably in the range of 5.0 to 30 wt %.

In the metal-supported material having ruthenium supported by the composite oxide according to the present invention, the ratio of the value $(D_{ads})$ of a Ru dispersion degree obtained by the $H_2$ pulse chemical adsorption method to the value $(D_{TEM})$ of the Ru dispersion degree expected from the average particle diameter of the Ru particles obtained from the TEM image preferably satisfies $0<D_{ads}/D_{TEM}<1$.

The Ru dispersion degree represents the ratio between the number of Ru atoms exposed on the surface of the metal-supported material and the number of all the Ru atoms included in the metal-supported material. The Ru dispersion degree can be obtained from the hydrogen adsorption amount of the metal-supported material supporting Ru.

Specifically, assuming that one Ru atom adsorbs one H atom, the ratio of the number of hydrogen atoms H corresponding to the number of Ru atoms exposed on the surface of the metal-supported material to the total number of Ru atoms supported by the metal-supported material (H/Ru) is the Ru dispersion degree. In the present invention, the Ru dispersion degree based on this hydrogen adsorption amount is expressed as $D_{ads}$. By comparing the metal-supported materials supporting the same amount (the same number of atoms) of Ru, the metal-supported material with the higher Ru dispersion degree can be regarded as having more catalyst active sites.

Moreover, it has been known that, assuming that the shape of the Ru particle is a cube, the value of the Ru dispersion degree can be obtained geometrically using the average particle diameter (d, unit is nanometer) of Ru obtained by the TEM observation (see the literature "dictionary of catalyst"). This calculation method can be expressed by General Formula (4). The average particle diameter of Ru can be calculated by extracting 100 to 150 Ru particles from the TEM image at random, measuring the particle diameters, and averaging the particle diameters. In the present invention, the value of the Ru dispersion degree obtained based on General Formula (4) is expressed as $D_{TEM}$.

$$D_{TEM}=1.113/d \qquad (4)$$

Therefore, if $D_{ads}/D_{TEM}$ is less than 1, it means that a part of the Ru particle, mainly a part near the interface between the particle and the composite oxide (carrier) is covered with the carrier material and the adsorption of the H atom onto the surface of the Ru particle is interrupted. This kind of phenomenon is known as a strong metal support interaction (SMSI) phenomenon, and appears when the strong interaction exists between the supported metal and the carrier. It is reported that the propulsive power of SMSI is the generation of the reduced carrier such as $Ru/CeO_{2-x}$.

In the metal-supported material according to the present invention having the metal ruthenium supported by the composite oxide, the average particle diameter of Ru is preferably 5 nm or less, more preferably 3 nm or less, and much more preferably 2 nm or less. It is advantageous that the Ru particle diameter is smaller because using smaller Ru as the ammonia synthesis catalyst increases the active sites. The lower limit of the average particle diameter of Ru is not limited to a particular value, and is, for example, 0.1 nm or more and 0.5 nm or more.

In the case where the composite oxide supports the metal cobalt, the average particle diameter of Co is preferably 100 nm or less, more preferably 50 nm or less, and much more preferably 30 nm or less. It is advantageous that the Co particle diameter is smaller because using smaller Co as the ammonia synthesis catalyst increases the active sites. The lower limit of the average particle diameter of Co is not limited to a particular value, and is, for example, 0.5 nm or more and 1 nm or more. In the case of Co, similarly to the case of Ru, the ratio of the value $(D_{ads})$ of a Co dispersion degree obtained by the $H_2$ pulse chemical adsorption method to the value $(D_{TEM})$ of the Co dispersion degree expected from the average particle diameter of the Co particles obtained from the TEM image preferably satisfies $0<D_{ads}/D_{TEM}<1$.

In the composite oxide expressed by General Formula (1) in the present invention, A is trivalent partially or entirely, and the catalyst Ru that is supported is microparticles with an average particle diameter of 5 nm or less. Thus, under the mild ammonia synthesis condition (300 to 500° C., 0.1 to 20 MPa), the ammonia synthesis rate is very high (for example, at 350° C., 13.4 mmolg$^{-1}$h$^{-1}$ at 0.1 MPa or 31.3 mmolg$^{-1}$h$^{-1}$ at 1 MPa).

The composite oxide according to the present invention in which A is trivalent partially is obtained by reducing, at high temperature, the composite oxide that is thermally stable and supports the Ru catalyst. The technique of reducing the Ce oxide supporting Ru has conventionally been known, and so far, it has been understood that when the reducing process temperature is more than 500° C., the ammonia synthesis rate of the catalyst decreases (Non-Patent Literature 1).

On the other hand, the present inventors have found out that the ammonia synthesis rate of the supporting material having Ru supported on the composite oxide, typified by the metal-supported material in which $La_{0.5}Ce_{0.5}O_{1.75}$ supporting Ru is in the reduced state, is improved by the reducing process with a high temperature of more than 500° C. and reaches its peak by the reducing process with a temperature of about 650° C. That is to say, it has been discovered that when the composite oxide including Ce is used as the carrier, the catalyst exhibiting the high activity can be obtained as compared to when the oxide including only Ce is used as the carrier.

In this specification, in order to simplify the expression, the metal-supported material expressed by "$La_{0.5}Ce_{0.5}O_{1.75}$ supporting Ru" is expressed as "$Ru/La_{0.5}Ce_{0.5}O_{1.75}$" and this metal oxide that has been reduced is expressed as "Ru/La$_{0.5}$Ce$_{0.5}$O$_x$". This expression similarly applies to other supporting materials. Here, as a part of Ce is reduced from tetravalence to trivalence, the molar ratio of oxygen at the calcination decreases from 1.75 to x.

For example, the composite oxide La$_{0.5}$Ce$_{0.5}$O$_x$ according to the present invention, which is the composite oxide of CeO$_2$ and La$_2$O$_3$ reduced at as high as 650° C. that is over the conventional temperature, is a solid solution that is a tetragonal crystal or a cubic crystal. Then, the Ru catalyst that is supported by this composite oxide exhibits the ammonia synthesis activity as high as the activity of the catalyst that is the highest in the existing catalysts. The structure and the state of the catalyst by the action of the reducing process temperature have been clarified by the combination of various characteristic evaluation methods including the scanning transmission electron microscope (STEM) image processing and chemical adsorption measurements.

As shown in Table 2, the ammonia synthesis rate, at 1.0 MPa and 350° C., of the metal-supported material (Ru/ La$_{0.5}$Ce$_{0.5}$O$_x$) obtained by reducing Ru/La$_{0.5}$Ce$_{0.5}$O$_{1.75}$ at 500° C. was 1.7 times or more as high as that of the material (Ru/La$_2$O$_3$) obtained by reducing Ru/La$_2$O$_3$ at 500° C. and the material (Ru/CeO$_x$) obtained by reducing Ru/CeO$_2$ at 500° C. This indicates that the ammonia synthesis rate increases because the composite oxide of La$_2$O$_3$ and CeO$_2$ is used.

Figure 1:
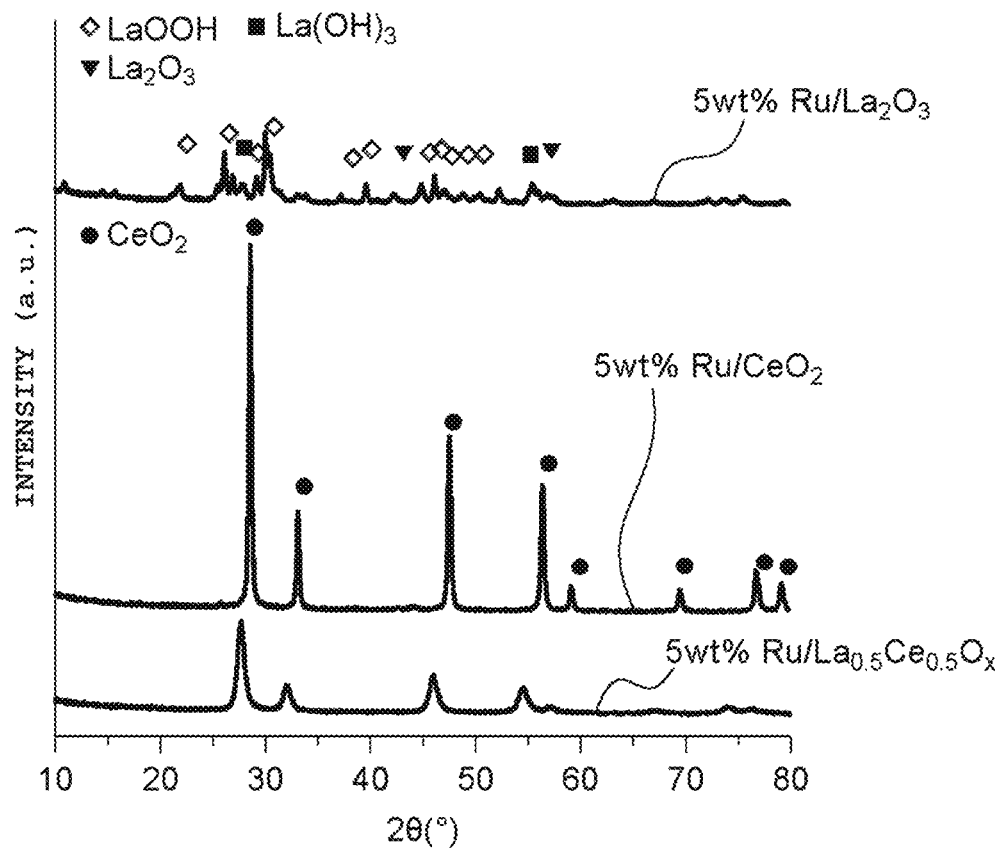
FIG. 1 illustrates XRD patterns of different Ru supporting composite oxides.

As illustrated in FIG. 1, in the XRD pattern about Ru/La$_2$O$_3$, many peaks derived from LaOOH and La(OH)$_3$ were observed in addition to small peaks derived from La$_2$O$_3$. On the other hand, in the XRD pattern of Ru/La$_{0.5}$Ce$_{0.5}$O$_x$, the peak derived from the cubic crystal structure including smaller crystal lattice than CeO$_2$ is observed and other peak derived from impurities such as LaOOH or La(OH)3 was not observed. These results indicate that the generation of the composite oxide La$_{0.5}$Ce$_{0.5}$O$_{1.75}$ before the reduction interrupts the adsorption of water on La$_2$O$_3$ and the crystal growth of the acid carrier. In fact, the composite oxide obtained by reducing La$_{0.5}$Ce$_{0.5}$O$_{1.75}$ at 500° C. had a specific surface area of 47 m$^2$g$^{-1}$, which was much larger than the specific surface areas of the composite oxides obtained by reducing Ru/CeO$_2$ at 500° C. and 650° C. (24 and 20 m$^2$g$^{-1}$, respectively). The specific surface area increased in this manner in La$_{0.5}$Ce$_{0.5}$O$_x$ because, supposedly, different cations coexisted on the surface of the composite oxide. These results indicate that, by using the composite oxide of CeO$_2$ and La$_2$O$_3$, the number of active parts in Ru increases and the high ammonia synthesis rate about the metal-supported material obtained by reducing Ru/La$_{0.5}$Ce$_{0.5}$O$_x$ at 500° C. is achieved.

In this manner, in the metal-supported material according to the present invention, La$_{0.5}$Ce$_{0.5}$O$_x$ that is thermally stable after the reduction fixes the Ru nanoparticles firmly and the number of Ru active parts that strongly interacts with the reduced carrier increases; thus, it is considered that by the synergistic effect, the high ammonia synthesis activity is achieved.

FIGS. 2A-2I illustrate the HR-TEM and the EDX mapping images of Ru/La$_{0.5}$Ce$_{0.5}$O$_x$ after the reduction at different temperatures, and the histograms of the Ru particle diameters of the carrier exposed to the air after the reduction that are observed with the TEM. In addition, Table 2 shows the summary of the results of some characteristics and activity tests.

As illustrated in Table 3, the average diameter of the Ru particles remained the same substantially (1.8 nm or 1.7 nm)

even if the reducing process temperature was increased from 500° C. to 650° C. However, if the reducing process temperature was increased from 650° C. to 800° C., the Ru particle diameter increased from 1.7 nm to 2.7 nm, and the specific surface area decreased from 42 m$^2$g$^{-1}$ to 21 m$^2$g$^{-1}$.

The Ru dispersion degree represents the ratio between the number of Ru atoms exposed on the surface of the metal-supported material and the number of all the Ru atoms included in the metal-supported material. The Ru dispersion degree of the metal-supported material shown in Table 3 can be obtained from the hydrogen adsorption amount of the metal-supported material supporting Ru. Specifically, assuming that one Ru atom adsorbs one H atom, the ratio of the number of hydrogen atoms H corresponding to the number of Ru atoms exposed on the surface of the metal-supported material to the total number of Ru atoms supported by the metal-supported material (H/Ru) is the Ru dispersion degree. The hydrogen adsorption amount of the metal-supported material can be obtained by the H$_2$ pulse chemical adsorption method. In the present invention, the Ru dispersion degree based on this hydrogen adsorption amount is expressed as D$_{ads}$. By comparing the metal-supported materials supporting the same amount (the same number of moles) of Ru, the metal-supported material with the higher Ru dispersion degree can be regarded as having more catalyst active sites.

As shown in Table 3, D$_{ads}$ (H/Ru) decreased from 0.46 to 0.11 as the reducing process temperature increased from 500° C. to 800° C. In the case where the reducing process temperature increased from 500° C. to 650° C., D$_{ads}$ (H/Ru) decreased from 0.46 to 0.35.

Moreover, assuming that the shape of the Ru particle is a cube, the value of the Ru dispersion degree can be obtained geometrically using the average particle diameter (d, unit is nanometer) of Ru obtained by the TEM observation. This calculation method is expressed by General Formula (4). The average particle diameter can be calculated by extracting 100 to 150 Ru particles from the TEM image at random, measuring the particle diameters, and averaging the particle diameters. In the present invention, the value of the Ru dispersion degree obtained based on General Formula (4) is expressed as D$_{TEM}$.

The obtained value of D$_{TEM}$ was 0.62 in the case of the reduction at 500° C. and 0.65 in the case of the reduction at 650° C., which were larger than the value of D$_{ads}$obtained from the hydrogen adsorption method. For example, in the case of the reduction at 650° C., D$_{ads}$/D$_{TEM}$ was 0.54.

These results indicate that, at least after the reduction at 650° C., about 50% of the Ru atoms on the surface of the Ru particle was covered with the carrier material, that is, the SMSI phenomenon occurred. It is reported that the propulsive power of SMSI is the generation of the reduced carrier such as Ru/CeO$_{2-x}$.

Table 3 shows the relation between the dispersion degree and the specific surface area of the metal-supported material Ru/La$_{0.5}$Ce$_{0.5}$O$_x$ (abbreviated as Ru/La$_{0.5}$Ce$_{0.5}$O$_x$_500° C.) obtained by reducing Ru/La$_{0.5}$Ce$_{0.5}$O$_{1.75}$ at 500° C. and the metal-supported material Ru/La$_{0.5}$Ce$_{0.5}$O$_x$ (abbreviated as Ru/La$_{0.5}$Ce$_{0.5}$O$_x$_650° C.) obtained by reducing Ru/La$_{0.5}$Ce$_{0.5}$O$_{1.75}$ at 650° C.

Regarding the metal-supported material after Ru/La$_{0.5}$Ce$_{0.5}$O$_{1.75}$ is reduced, the degree of the reduction of Ce$^{4+}$ (Ce$^{4+}$→Ce$^{3+}$) is estimated in accordance with the absorption capacity of oxygen (O$_2$) to the reduced Ru/La$_{0.5}$Ce$_{0.5}$O$_x$. The results indicate that the degree was 23% and 43% after the reduction at 500° C. and 650° C., respectively. That is to say, the results have clarified that the occurrence of the SMSI is involved more at higher temperature. Furthermore, after the reduction at 800° C., SMSI became more visible in addition to the calcination of the Ru particles, and this is explained by the drastic decrease of the H/Ru ratio to 0.11 and the increase of the reduction degree of $Ce^{4+}$ to 63%. When the SMSI occurred, TOF (turnover frequency) of Ru increased, that is, the TOF increased from $0.027$ $s^{-1}$ at the reduction at 500° C. to $0.051$ $s^{-1}$ at the reduction at 650° C. and $0.108$ $s^{-1}$ at the reduction at 800° C. This is because a part of the Ru particles is covered with the reduced carrier including $Ce^{3+}$ whose electron is richer than $Ce^{4+}$. The oxygen absorption capacity of the metal-supported material after the reduction was obtained by the following method. The temperature of the metal-supported material was increased to 500 to 800° C. in the flow of $H_2$ at 60 mL $min^{-1}$ and the material was heated at 500° C. for one hour. After the $H_2$ flow was stopped, Ar was fed for 0.5 hours at 30 mL $min^{-1}$. After that, the $O_2$ pulse absorption measurement was performed at room temperature, 450° C., and 800° C.

In the Ru metal-supported material used in the present invention, when the material is measured using the infrared spectrometer, the infrared absorption peak derived from the nitrogen molecule ($^{14}N_2$) adsorbed on the Ru particle appears at 2200 $cm^{-1}$ or less. This absorption peak is based on the stretching vibration mode of the $N_2$ resulting from the adsorption of one N atom on the Ru particle, and the metal-supported material exhibiting the absorption in the region less than or equal to this wavenumber weakens the N≡N bond in the nitrogen molecule, that is, a function of promoting the activation of the nitrogen atom is provided.

In addition, a part of the Ru metal-supported material in the present invention in which the infrared absorption peak derived from the nitrogen atom ($^{14}N_2$) adsorbed on the Ru particle appears at 1900 to 1700 $cm^{-1}$ has an effect of weakening the N≡N bond in the nitrogen molecule. Therefore, the particularly high activity is exhibited in the case where the Ru metal-supported material is used as the catalyst for the ammonia synthetic reaction in which the activation of the N≡N bond is in the rate-limiting step.

The infrared absorption peak is hereinafter described in detail. In the metal-supported material according to the present invention, the strength of the nitrogen molecule in the rate-limiting step in the case of synthesizing ammonia from nitrogen and hydrogen can be examined in accordance with the infrared absorption spectrum. Nitrogen interacts with the carrier according to the present invention, and interacts with the supported metal. The interaction refers to the adsorption of nitrogen on the metal or the coordinate bonding. In the state where nitrogen is close to the supported metal in the major-axis direction and interacts therewith, the υ1 is observed in a region of 2300 to 2000 $cm^{-1}$ by the infrared absorption spectroscopy. This region is the region where the triple bond such as C≡N or C≡C is observed, and by $^{15}N_2$, it can be confirmed that this is the vibration by the nitrogen molecule used as the raw material. Moreover, nitrogen can also interact with the carrier and the stretching vibration is observed further in the low wavenumber side of 1900 to 1500 $cm^{-1}$. This region is the region where the functional group of the double bond such as C=C, C=O, C=N, or N=O is observed, and by $^{15}N_2$, it can be confirmed that this vibration is the vibration by the nitrogen molecule used as the raw material. The inventors do not stick to the particular mechanism but consider that the unoccupied orbital of the nitrogen molecule receives the electron from the carrier and as a result, the triple bond is in a weakened state. In the present invention, both the stretching vibrations υ1 and υ2 may be observed; however, just one of them may be observed. The N≡N bond is observed when the interaction with the supported metal occurs, and is not observed when the interaction with the carrier occurs. Thus, because of the metal exposed area by the SMSI effect, the kinetic problem, the electron donating property of the carrier or the supported metal, and the like, the vibration number that is observed is shifted or just one of them is observed.

In order to understand the influence of the reducing process temperature on the activation of the $N_2$ molecule in the rate-limiting step of the ammonia synthesis about $Ru/La_{0.5}Ce_{0.5}O_{1.75}$, the present inventors have examined the state of $^{14}N_2$ that is adsorbed in accordance with the FT-IR technique. FIG. 3 shows the IR spectra after $N_2$ is added at room temperature to the metal-supported materials obtained by reducing $Ru/La_{0.5}Ce_{0.5}O_{1.75}$ at 500° C. and 650° C. The IR spectrum of both catalysts exhibited the peak at 2164 $cm^{-1}$ and exhibited a broad peak substantially in 1700 to 1900 $cm^{-1}$. Attention is paid to the fact that the broad peak shifted from 1883 $cm^{-1}$ to the lower wavenumber 1844 $cm^{-1}$ when the reducing process temperature increased from 500° C. to 650° C. In the spectrum in the case where $^{15}N_2$ was adsorbed, the absorption peak of $Ru/La_{0.5}Ce_{0.5}O_x$ reduced at 500° C. shifted to the lower wavenumber (2093 $cm^{-1}$ and 1818 $cm^{-1}$). This value coincided sufficiently with the wavenumber ($2164$ $cm^{-1} \times (14/15)^{1/2}=2091$ $cm^{-1}$and $1885$ $cm^{-1} \times (14/15)^{1/2}=1821$ $cm^{-1}$) that is predicted from the isotope effect. Similarly, in the spectrum in the case where $^{15}N_2$ was adsorbed, the peak of $Ru/La_{0.5}Ce_{0.5}O_x$ reduced at 650° C. shifted to the lower wavenumber because of the isotope effect. Therefore, all the peaks were due to the stretching vibration mode of $N_2$ in which one N atom was adsorbed on the Ru particle. Regardless of the reducing process temperature, the peak appearing at the higher wavenumber 2164 $cm^{-1}$ was due to $N_2$ that was adsorbed on the Ru atom that weakly interacted with the reduced carrier. On the other hand, the broad peak at around 1700 to 1900 $cm^{-1}$ was due to $N_2$ adsorbed on the Ru atom that directly interacted with the reduced carrier formed by the SMSI. That is to say, it has been clarified that the N≡N bond of $N_2$ was weakened because the SMSI contributed even after the reduction at 500° C.

From these results, it is supposed that, in the metal-supported material according to the present invention, if the wavenumber of the absorption peak in the infrared absorption spectrum after the nitrogen ($^{14}N_2$) is adsorbed on the metal-supported material is less than or equal to 2200 $cm^{-1}$, the activation of the $N_2$ molecule is promoted and the ammonia synthesis activity of the catalyst increases. Furthermore, the catalyst also exhibiting the absorption peak in 1900 to 1700 $cm^{-1}$ has the particularly high activity, and does not have a clear absorption peak at around 2200 $cm^{-1}$ and has the characteristic peak in 1900 to 1700 $cm^{-1}$.

When the reducing process temperature increases further to 650° C., the SMSI occurs intensively and more electrons move from the reduced carrier to the metal Ru and the electron moves to the anti-bonding π orbital of $N_2$ and the N≡N bond on the Ru atom that strongly interacts with the reduced carrier is further weakened. The ratio of the peak area on the high wavenumber side to the peak area on the low wavenumber side decreases as the reducing process temperature increases from 500° C. to 650° C., and this fact coincides with the increase of SMSI.

These results have proved that by reducing the metal-supported material at high temperature, SMSI was induced and TOF increased; however, since the Ru surface was partially covered with the reduced composite oxide (carrier), the number of active sites of Ru decreased. As a result, after the reduction at 650° C., the active parts of Ru increased (TOF=0.051 $s^{-1}$, H/Ru=0.35) and the metal-supported material obtained by reducing $Ru/La_{0.5}Ce_{0.5}O_{1.75}$ at 650° C. exhibited the ammonia synthesis rate as high as 31.3 $mmolg^{-1}h^{-1}$. On the other hand, after the reduction at 800° C., the Ru part is very active (TOF=0.108 $s^{-1}$); however, the number of active Ru parts is small (H/Ru=0.11). Thus, the ammonia synthesis rate of the metal-supported material obtained by reducing $Ru/La_{0.5}Ce_{0.5}O_{1.75}$ at 800° C. was lower than that of the metal-supported material obtained by reducing $Ru/La_{0.5}Ce_{0.5}O_{1.75}$ at 650° C. and was 21 $mmolg^{-1}h^{-1}$. For comparison, in the case where $Ru/CeO_2$ was reduced at 650° C., the specific surface area was only 20 $m^2g^{-1}$ and the average diameter of the Ru particles was 2.7 nm and H/Ru was 0.17. This indicates that the Ru particles was calcinated. Meanwhile, in the case where $Ru/La_{0.5}Ce_{0.5}O_{1.75}$ was reduced at 650° C., the calcination was suppressed suitably and the high H/Ru ratio of the catalyst was kept.

<Influence of Calcinating Temperature and Reducing Process Temperature on Ammonia Synthesis Activity>

One of the important elements in the present invention is the calcinating temperature of the composite oxide that is used as the carrier.

The catalyst according to the present invention is activated by a hydrogen reduction pretreatment at high temperature. This is because, by not just reducing the transition metal such as Ru but also reducing cation (such as $Ce^{4+}$) in the composite oxide, the electron donating capability increases. Moreover, SMSI in which a part of the carrier covers Ru is achieved. In general, if the reduction pretreatment is performed at high temperature, usually, the specific surface area is increased and the metal particle diameter expands as the carrier is calcinated, and the catalyst activity decreases.

The example of $La_{0.5}Ce_{0.5}O_{1.75}$ is described. FIG. 4 is a graph of the ammonia generation rate after $La_{0.5}Ce_{0.5}O_{1.75}$ whose calcinating temperature was 600° C. was reduced at 500° C. (Example 69 described below), 650° C. (Example 70), and 800° C. (Example 71). This graph indicates that the ammonia synthesis activity decreases as the reducing process temperature increases, and the ammonia generation rate drastically decreases particularly in the case where the reduction is performed at 800° C.

The decrease of the H/Ru and the specific surface area, and the change of the Ru particle diameter at this time were examined. The results are shown in FIG. 5. It has been understood that when the reducing process temperature increased from 650° C. to 800° C., the specific surface area decreased particularly largely. In addition, it has been clarified that the Ru particle diameter increased and the calcination of Ru particles also progressed. The H/Ru also decreased. It is considered that this is because the catalyst in which the calcinating temperature of the carrier is low and the structure stability is insufficient is reduced at high temperature of more than or equal to the calcinating temperature of the carrier.

That is to say, the possible reasons why the ammonia generation rate decreases as the reducing process temperature increases are because the specific surface area decreases because the particle of the carrier increases in the calcination and the calcination of Ru progresses, and moreover because SMSI excessively occurs due to the instability of the surface of the carrier and the surface of the Ru particle is covered and thus, the number of active sites decreases.

On the other hand, $La_{0.5}Ce_{0.5}O_{1.75}$ whose calcinating temperature was 700° C. was reduced at 500° C. (Example 1), 650° C. (Example 2), and 800° C. (Example 3) and then, the activity was measured (FIG. 4), and thus, particularly drastic improvement of the activity was observed when the reducing process temperature was increased from 500° C. to 650° C. FIG. 5 indicates that the H/Ru decreased with the Ru particle diameter remaining the same, and this is because the electron donating property of the carrier was improved due to the occurrence of the SMSI phenomenon, and the electron was injected to the anti-bonding π orbital of the N≡N and the adsorption and desorption of $N_2$ in the rate-limiting step were promoted.

On the other hand, in the case of the reduction at 800° C., the ammonia generation rate decreased; however, the activity in that case was higher than that in the case where the carrier that was calcinated at 600° C. was used and reduction at 800° C. was performed. At this time, the decrease of the H/Ru and the specific surface area, and the change of the Ru particle diameter were examined.

The results indicate that, as compared to when the calcinating temperature of the carrier was 600° C., the increase in specific surface area and Ru particle diameter due to the increase in reducing process temperature is gradual and the aggregation of Ru is also suppressed. It is considered that this is because the damage caused by the reducing process is suppressed by calcinating the carrier at high temperature in advance and stabilizing the structure.

In the present composite oxide, particularly, the reducing process at high temperature to achieve the SMSI is important for activating the catalyst and it is preferable to calcinate the carrier at higher temperature than the intended reducing process temperature.

By using the metal-supported material supporting Ru according to the present invention as the catalyst, ammonia can be manufactured through the reaction between nitrogen and hydrogen. The method for synthesizing ammonia is not limited to a particular method, and for example, ammonia can be manufactured by supplying source gas including hydrogen gas and nitrogen gas in a reaction container filled with the catalyst. The reaction temperature is preferably 300 to 550° C., more preferably 300 to 500° C., and much more preferably 300 to 450° C. The reaction pressure is preferably as low as 0.1 to 20 MPa, more preferably 0.1 to 15 MPa, and much more preferably 0.1 to 10 MPa.

In the case of using the metal-supported material supporting Ru according to the present invention as the catalyst, the ammonia generation rate is, for example, 13.4 $mmolg^{-1}h^{-1}$ at 0.1 MPa or 31.3 $mmolg^{-1}h^{-1}$ at 1 MPa at 350° C. This is equal to or more than the yield achieved by the conventional Ru catalyst. In the ammonia synthetic reaction, the ammonia yield tends to increase as the pressure is higher by the thermodynamic equilibrium; thus, by using the ammonia synthesis catalyst according to the present invention, for example, the higher yield can be expected at the higher pressure condition of about 10 MPa.

In the case of using the metal-supported material supporting Co according to the present invention as the catalyst, the composite oxide to serve as the carrier preferably includes Ba from the aspect of the catalyst activity. By this combination, even if Co that is less expensive than Ru is used, the ammonia synthesis activity that is not as high as that of the metal-supported material supporting Ru according to the present invention but is sufficient can be achieved.

<Manufacturing Method for Metal Oxide and Metal-Supported Material>

Next, a manufacturing method for the composite oxide and the metal-supported material according to the present invention is described. The composite oxide according to the present invention can be manufactured by the method including:

(a) a mixing step of mixing an A precursor including the element A, an X precursor including the element X, and an M precursor including the element M to obtain the mixture; and (b) a calcinating step of calcinating this mixture. The metal-supported material according to the present invention can be manufactured from the composite oxide obtained in the steps (a) and (b) in accordance with the method including:

(c) a supporting step of supporting the compound including the transition metal on the composite oxide to prepare a before-reducing process supporting material; and (d) a reducing step of performing a reducing process on the before-reducing process supporting material.

Next, the step (a) is described. The step (a) corresponds to the manufacturing method for the composite oxide according to the present invention. The composite oxide is obtained in the step of mixing the A precursor including the element A, the X precursor including the element X, and the M precursor including the element M so as to obtain the mixture (precursor of composite oxide).

The precursor of the composite oxide can be obtained by preparation in accordance with various methods such as a precipitation method and a complex polymerization method. For example, a neutralization precipitation method can be employed; in this method, a precipitating agent such as ammonia, sodium hydroxide, or cesium hydroxide and nitrate, chloride, acetate, carbonate, or sulfate of A, X, and M are put into reaction to obtain a hydroxide.

Preferably, first, composite hydroxide that is the precursor of the composite oxide is prepared by mixing ammonia water and nitrate aqueous solution. The mixing molar ratio between the ammonia and the nitrate is preferably about 5:1 to 2:1, more preferably about 3:1. The concentration of ammonia and nitrate in the ammonia water and the nitrate aqueous solution is preferably about 4 to 32 mol/liter and 0.1 to 1 mol/liter, respectively, and more preferably about 8 to 16 mol/liter and 0.25 to 0.5 mol/liter, respectively. The mixing can be performed at room temperature.

The precursor of the composite oxide can be obtained by separately preparing the precursor including one or more kinds of the elements A, X, and M and mixing the precursors. In this manner, the compound including A, the compound including X, and the compound including M are mixed to obtain the mixture.

Next, the step (b) is described. This step is a step of calcinating the mixture obtained in the step (a). Thus, the generated mixture (composite oxide precursor) is changed into the composite oxide with the large specific surface area through calcination.

The calcination is preferably performed at low temperature of about 200 to 400° C. for about 1 to 10 hours, at intermediate temperature of about 400 to 600° C. for about 1 to 10 hours, and at high temperature of about 600 to 700° C. for about 1 to 10 hours. The calcinating temperature in the final step is the most preferably 700° C. This calcination can be performed at any oxygen concentration as long as in the atmosphere including oxygen, such as the air or mixed gas of inert gas and oxygen.

Next, the step (c) is described. In the step (c), the composite oxide obtained in the step (b) is stirred together with the solvent in which a ruthenium supply source is dissolved, so that the composite oxide is impregnated with the ruthenium supply source. Then, the solvent is removed by heating and subsequently, the ruthenium supply source is decomposed; thus, the before-reducing process supporting material in which ruthenium in the fine particulate shape is supported on the composite oxide carrier is obtained.

As the ruthenium supply source, various compounds containing Ru can be used. Preferably, an organic metal compound such as triruthenium dodecacarbonyl or ruthenium acetylacetonato can be used. Other ruthenium supply source that can have ruthenium supported by the composite oxide, for example ruthenium chloride or ruthenium nitrosyl nitrate can also be used.

In the case of using the organic metal compound such as triruthenium dodecacarbonyl as the ruthenium supply source, it is advantageous to use the organic solvent as the solvent. Examples of the organic solvent include tetrahydrofuran (THF), methanol, ethanol, hexane, and toluene. These solvents, if a general commercial product, are usable without particular pretreatment; however, it is more preferable to use such solvent after purification, dehydration, or the like. The solid content concentration of the composite oxide and the ruthenium supply source per liter of solvent is preferably about 1 to 30 g/liter and 0.1 to 3 g/liter, respectively and more preferably about 10 to 30 g/liter and 0.1 to 0.3 g/liter, respectively. The stirring can be performed at normal temperature, and the stirring time is preferably 1 to 24 hours and more preferably 6 to 12 hours. The heating for removing the solvent can be performed by various methods, and preferably performed under reduced pressure at low temperature with the use of an evaporator or the like. The decomposition of the ruthenium supply source is performed by heating in an inert atmosphere, for example, helium, argon, or nitrogen atmosphere. The decomposition can be performed in an atmosphere including hydrogen. The heating is performed at about 200 to 600° C. for about 1 to 12 hours. The heating temperature is more preferably 300 to 500° C. and the heating time is more preferably about 3 to 6 hours.

The step (d) is described below. Next, the obtained before-reducing process supporting material is reduced. The reducing process is performed for the purpose of reducing the tetravalent metal element included in the composite oxide serving as the carrier, reducing the transition metal such as Ru, and reducing for destroying the carbonate that is described below, for example. The reducing process temperature is 400° C. to 800° C., and preferably 600 to 700° C. In the case where the reducing process temperature is as high as more than 500° C., the reducing time is usually 10 minutes to 40 hours and preferably about 30 minutes to 5 hours. In the case where the reducing process temperature is low, the reducing time is 48 to 120 hours and preferably about 60 to 100 hours. The reducing process is performed in the presence of reducing gas such as hydrogen gas.

It is known that in the case where Ba with strong basicity is included, BaO reacts with carbon dioxide or the like in the air and barium carbonate ($Ba(CO_3)$) or barium hydroxide ($Ba(OH)_2$) is easily formed. Thus, when the carbonate or the hydroxide is formed, the partial negative charge of oxygen in BaO drastically decreases and the strong basicity cannot be obtained. In view of this, in order to achieve the high ammonia synthesis activity, it is necessary to destroy this carbonate or hydroxide by the appropriate process. For example, as a method of destroying the Ba carbonate to obtain BaO, the heating process (reducing process) in the flow of hydrogen gas is effective. This reaction is expressed by the following formula.

$$BaCO_3 + 4H_2 \rightarrow BaO + CH_4 + 2H_2O$$

By heating the catalyst in the hydrogen atmosphere, the hydrogen is dissociated on the surface of the supported metal species and the hydrogen species with the strong reducing power is generated. As this hydrogen species acts, the Ba carbonate is destroyed into BaO.

As a method of destroying the Ba carbonate, the catalyst is held at 550° C. or more for about one hour in the flow of hydrogen; thus, the Ba carbonate can be destroyed. The preferable condition is about 600° C. to 800° C.

Alternatively, the Ba carbonate can be destroyed by keeping the catalyst at low temperature for a long time in the flow of hydrogen. The preferred condition is about 48 hours at 500° C., about 72 hours at 450° C., and 120 hours or more at 400° C.

By using such a method, the carbonate of Ba can be destroyed. In order to exhibit the basic characteristic of Ba, it is desirable that the ratio of Ba existing as the carbonate is as low as possible. The ratio of Ba existing as the carbonate in the catalyst is preferably 10 mol % or less, more preferably 1 mol % or less, much more preferably 0.1 mol % or less, and particularly preferably 0.01 mol % or less of the entire quantity of Ba in the catalyst.

The calcinating temperature in the calcinating step is the most preferably 700 to 800° C. When the calcinating temperature in this step is too low, the calcination of the carrier and the active metal progresses excessively in the reducing process, and the particle diameter increases, so that the number of active sites decreases and the catalyst capability decreases.

On the other hand, when the calcinating temperature in this step is too high, the specific surface area of the carrier becomes small and thus, the dispersion state of the active metal deteriorates. As the particle diameter increases, the number of active sites decreases and the catalyst capability decreases.

Regarding the relation between the calcinating temperature and the reducing process temperature, it is preferable to calcinate the carrier at higher temperature than the reducing process temperature from the viewpoint of the ammonia synthesis activity as described above.

The metal-supported material according to the present invention obtained in this manner is superior in handling property and stability during the reaction to the conventional metal-supported material that has been used for the ammonia synthesis catalyst.

For example, Y. Inoue, M. Kitano, K. Kishida, H. Abe, Y. Niwa, M. Sasase, Y. Fujita, H. Ishikawa, T. Yokoyama, M. Hara, H. Hosono, ACS Catal., (2016) 7577-7584 describes Ru/Ca(NH$_2$)2 as the highly active catalyst; it has been known that the amide compound as the constituent easily reacts with the moisture and oxygen in the air. It is supposed that the manufacturing process is complicated and handling this catalyst as the industrial catalyst is very difficult.

Note that in the case where Ba or the like is included in the composite oxide and the catalyst is in the oxidized state in the manufacture, the catalyst exposed to the air absorbs CO$_2$ to become carbonate easily. Therefore, after the Ba carbonate is decomposed by the reducing process described above, it is necessary to handle the catalyst so as not to be exposed to CO$_2$ before the use, and it is preferable to preserve the catalyst in the container filled with inert gas or the like. In addition, in the case where the carrier becomes the carbonate, the carbonate is hydrogenated so as to be decomposed, and thus the carbonate is decreased and the ammonia synthesis activity is recovered.

The aforementioned oxide supporting ruthenium catalyst, such as Ru/MgO, needs to be added with the alkali metal such as Cs in order to increase the ammonia synthesis activity. As this alkali metal is changed into the hydroxide with the melting point during the reaction, the reaction tube may be corroded (J. G. van Ommen, W. J. Bolink, J. Prasad and P. Mars, J. Catal., 1975, 38, 120-127).

Furthermore, there is a report that in the Ba—Ru/activated carbon catalyst industrially used in some processes, as the activated carbon in the carrier is gradually methanated in the reaction, the activity decreases (B. Lin, Y. Guo, J. Lin, J. Ni, J. Lin, L. Jiang, Y. Wang, Appl. Catal., A, 541 (2017) 1-7).

The metal-supported material that fills the synthesis reactor and is used as the catalyst needs to be exchanged regularly and is expected to be used for a long time. Thus, the metal-supported material needs to be handled easily and highly stable. The metal-supported material according to the present invention is advantageous in this point.

EXAMPLES

Next, the present invention is described in more detail with reference to Examples. Needless to say, the present invention is not limited to these Examples.

<Measurement of Ammonia Synthesis Activity>

The ammonia synthesis activity of the metal-supported material was measured using a fixed bed flow reactor system. The metal-supported material that has been subjected to the pretreatment by the method according to Examples and Comparative examples was cooled down to 300° C. while Ar was fed thereto. While the temperature of the metal supporting layer was maintained at 300° C., Ar was supplied and the pressure was increased to 1.0 MPa or 3.0 MPa with the back pressure regulating valve at the outlet of the reaction tube. The injection of Ar was stopped and while the pressure was maintained, H$_2$ and N2 were fed at 90 mL min$^{-1}$ and 30 mL min$^{-1}$ (space velocity 72 L h$^{-1}$ g$^{-1}$ )), respectively so that the atmosphere became the reaction atmosphere. In accordance with the level of the NH$_3$ synthesis activity, 200 mL of sulfuric acid aqueous solution for 1 to 100 mM (1, 5, 10, 25, 100 mM) was added to a three-necked flask with a conductivity meter connected thereto, and mixed gas including NH$_3$, nitrogen (purity, 99.995%, manufactured by FUKUOKA OXYGEN CO., LTD.), and hydrogen (purity, 99.995%, manufactured by FUKUOKA OXYGEN CO., LTD.) flowing out of the outlet of the reaction tube was bubbled in the sulfuric acid aqueous solution. In the case where the impurities such as moisture and oxygen are removed, a gas purifier (gas purifying filter, MC50-904F, manufactured by SAES) so that the purity became 99.99999999 or more. In this process, by measuring the change in conductivity that occurs by the reaction between NH$_3$ and the sulfuric acid, the quantity of generated ammonia in the outlet gas was measured. Next, the temperature of the metal supporting layer was increased to 350° C. or 400° C. After the temperature of the metal supporting layer became stable at 350° C. or 400° C., the metal supporting layer was left for 10 minutes and the quantity of generated ammonia was quantitatively determined by the similar method.

<Powder X-Ray Diffraction>

With the use of SmartLab X-ray diffractometer (Rigaku), the powder X-ray diffraction pattern of the metal-supported material (catalyst) was measured.

<Measurement of Specific Surface Area>

The specific surface area of the metal-supported material was obtained by the BET method on the basis of the quantity of nitrogen absorption at 77 K using BEL-sorp mini (Nippon BEL). Before the measurement, the vacuum heating was performed for 2 hours at 300° C. as the pretreatment.

<Measurement of Infrared Absorption Spectrum>

The infrared absorption spectrum was measured using an infrared spectrometer of fast Fourier transform (FT/IR-6600, JASCO Corporation). Into a glass cell filled with $H_2$ at 80 kPa, the catalyst molded with a disc shape with a diameter of 10 mm was put and heated at 500° C. while $H_2$ was circulated therein. After the temperature was decreased to room temperature, the cell was vacuumed and the infrared absorption spectrum was measured and the result was used as the background. After that, $^{14}N_2$ and $^{15}N_2$ were introduced each by 8 kPa and adsorbed on the catalyst, and the infrared absorption spectrum was measured and the differential spectrum from the background was obtained.

<Observation With Transmission Electron Microscope>

A high-angle annular dark field scanning TEM (HAADF-STEM) image and a high-resolution scanning TEM (HR-STEM) image were obtained using a JEM-ARM200F atomic resolution microscope (JEOL Ltd.). The sample for the observation was manufactured in a manner that the metal-supported material was reduced with hydrogen at 500° C. or 650° C. and the obtained material was pulverized under the atmosphere and diffused in an ethanol aqueous solution, and the obtained solution was dropped in a copper grid and dried.

<Measurement of Ru Dispersion Degree>

The Ru dispersion degree of the metal-supported material was obtained by the $H_2$ pulse chemical adsorption method. The temperature of the metal-supported material was increased up to 500 to 800° C. while $H_2$ was fed at 60 mL min$^{-1}$, and the reducing process was performed for one hour. After the $H_2$ flow was stopped, Ar was fed for 0.5 hours at 30 mL min$^{-1}$. Then, the temperature was decreased to −74° C. and a predetermined quantity of $H_2$ was supplied in a pulsed manner, and the decrease of hydrogen because of the adsorption of the metal-supported material was measured.

<Measurement of Catalyst Reduction Quantity>

The reduction quantity of catalyst was obtained from the $O_2$ pulse absorption quantity. The temperature of the catalyst was increased up to 500 to 800° C. while $H_2$ was fed at 60 mL min$^{-1}$, and the heating was performed at 500° C. for one hour. After the $H_2$ flow was stopped, Ar was fed for 0.5 hours at 30 mL min$^{-1}$. After that, a predetermined quantity of $O_2$ was supplied in a pulsed manner at room temperature, 450° C., and 800° C., and the absorption quantity of $O_2$ because of oxidation of the catalyst, that is, the quantity of $O_2$ consumed when Ru in the metal state is oxidized into $RuO_2$ and the quantity of $O_2$ required when $Ce^{3+}$ is oxidized into $Ce^{4+}$ were measured. Here, it is assumed that Ru in the metal state is oxidized into $RuO_2$ and the value obtained by subtracting the quantity of $O_2$ consumed when Ru is oxidized is regarded as the quantity of $O_2$ absorbed by the composite oxide in the carrier. By converting this $O_2$ absorption quantity, the reduction degree of $Ce^{4+}$ (that is, the ratio of $Ce^{3+}$) was obtained.

Regarding the element that can change in valence between the trivalent state and the tetravalent state other than Ce, for example Pr or Tb, the reducing degree of $Pr^{4+}$ or $Tb^{4+}$ can be obtained by the similar method.

<Partial Negative Charge of Oxygen>

The partial negative charge of oxygen included in the composite oxide (carrier) was obtained by calculation. First, the composition ratio of the elements (Mg, Ba, Zr, La, Ce, Pr) other than oxygen included in the carrier is determined so that the total of the compositions of these elements became 1. For example, in the case of $Ru/La_{0.5}Ce_{0.5}O_x$, the composition ratio of the elements is Ba=0.1, La=0.45, Ce=0.45. Oxygen is treated as O=1.675 (Ba is bivalent, La is trivalent, and Ce is between the trivalent state, which is the fully reduced state, and the tetravalent state, which is the fully oxidized state). This value is ni (i=Mg, Ba, Zr, La, Ce, Pr, O).

Next, the electronegativity xi of each element (Mg, Ba, Zr, La, Ce, Pr, C, O) is determined. The value of the electronegativity is based on the value in Table 6 and Table 7 on page 122 of "Inorganic chemistry (vol. 1)" Sanderson, Hirokawa Publishing Co., Tokyo, (1967) (this electronegativity is referred to as "Sanderson electronegativity").

Next, the geometric average of the electronegativity is obtained. This is calculated by the formula $(\Pi(\chi i\hat{\ }ni))\hat{\ }(1/(\Sigma ni))$.

Subsequently, the change in electronegativity of oxygen in the carrier is obtained. This is calculated based on the difference between the geometric average of the electronegativity of the composite oxide and the electronegativity (5.21) of oxygen. Note that the geometric average of the electronegativity changes in accordance with the composition change of the oxide as the valence of the atom varies. Therefore, regarding the metal oxide including the valence variable element such as Pr or Ce, the calculation method was changed depending on whether the ratio of the element of each valence was quantitatively determined or not. Specifically, in the case where the ratio of the element of each valence was quantitatively determined, the electronegativity was calculated in accordance with the ratio. On the other hand, in the case where the ratio of the element of each valence of the valence variable element was not quantitatively determined, the electronegativity was calculated independently in the case where the element is fully oxidized or fully reduced. Furthermore, in the case where Ba with strong basicity is included, Ba may react with carbon dioxide in the air to become $BaCO_3$; in view of this, the electronegativity was set so that the partial negative charge of oxygen was the smallest.

Finally, the partial negative charge "$-\delta_o$" of the oxygen in the carrier was obtained. This is the value obtained by dividing the change of the electronegativity of oxygen by "−4.75". This value "−4.75" indicates the change of the electronegativity in the case where one oxygen atom acquires one electron, and the value is based on Table 6 and Table 7 in the above literature "Inorganic chemistry (vol. 1)" by Sanderson. The numeral range applies when the ratio of the element of each valence of the valence variable element is not quantitatively determined, and the smaller numeral indicates the case where the element is not reduced at all and the larger numeral indicates the case where the element is reduced fully. "$-\delta_o$" corresponds to the partial negative charge of oxygen in the carrier. This value and the $NH_3$ synthesis activity of the catalyst are in correlation.

Example 1

<Ru/Ce$_{0.5}$La$_{0.5}$O$_x$_500° C. Reduction>
<Preparation of Composite Oxide>

The Ce$_{0.5}$La$_{0.5}$O$_x$ composite oxide was synthesized as follows by a reverse homogenous precipitation method. La(NO$_3$)$_3$·6H$_2$O (Wako Pure Chemical Corporation) was dissolved in purified water (Takasugi Pharmaceutical Co., Ltd.) to obtain La(NO$_3$)$_3$ aqueous solution. Ce(NO$_3$)$_3$·6H$_2$O (KANTO CHEMICAL CO., INC.) was dissolved in purified water to obtain Ce(NO$_3$)$_3$ aqueous solution. The La(NO$_3$)$_3$ aqueous solution and the Ce(NO$_3$)$_3$ aqueous solution were mixed to prepare 250 mL of carrier precursor solution containing a total of 0.0625 mol of La and Ce. To a 1000-mL beaker, 250 mL of 28%-NH$_3$ aqueous solution (Wako Pure Chemical Corporation) was added. While the solution was stirred with a magnetic stirrer at 320 rpm, the carrier precursor solution was added at once and continuously stirred for one hour. After that, the mixture was left at rest for 30 minutes and the supernatant was removed by 350 mL, and 350 mL of ion exchange water was added thereto and the mixture was stirred for 30 minutes. A series of operations was performed four times, and the precipitate was filtered and dried at 80° C. for 15 hours in an oven. The precipitate after the drying was pulverized in a mortar and the obtained powder was heated in the air atmosphere for five hours at 700° C. using an electric furnace, and thus, Ce$_{0.5}$La$_{0.5}$O$_{1.75}$ was obtained.
<Supporting Ru>

Ru was supported by Ce$_{0.5}$La$_{0.5}$O$_x$ by an impregnation method. Tetrahydrofuran (THF) (Wako Pure Chemical Corporation) solution in which Ru$_3$(CO)$_{12}$ (FURUYA METAL Co., Ltd.) corresponding to the Ru precursor was dissolved was prepared in a 200-mL recovery flask, and 5 g of the carrier was added thereto and the mixture was stirred for 18 hours or more. The amount of Ru$_3$(CO)$_{12}$ and the carrier used was adjusted as appropriate so that the quantity of Ru in the catalyst after heating in the argon atmosphere became 5 wt %. The suspension after the stirring was dried to be hardened under the reduced pressure at 35° C. at 0.3 atm using a rotary evaporator, and after that, the obtained substance was dried at 80° C. for 18 hours using an oven. The obtained powder was heated at 500° C. for five hours using a tubular electric furnace in the flow of argon at 25 mL min$^{-1}$ and thus, the carbonyl ligand in the precursor was removed. By this operation, Ru/Ce$_{0.5}$La$_{0.5}$O$_x$ metal-supported material was obtained.
<Hydrogen Reduction Pretreatment>

Ru/Ce$_{0.5}$La$_{0.5}$O$_{1.75}$ obtained in the above process was subjected to the hydrogen reduction pretreatment (also referred to as "pretreatment" simply) by the method below, so that a part of Ce was changed into the trivalent state. After the powder of the metal-supported material was pressed at 20 MPa for five minutes to manufacture the disc, this disc was pulverized in the mortar and classified with a sieve, and the pellet was manufactured. The size of the pellet was adjusted so that the diameter became 250 to 500 A catalyst reaction tube made of Inconel (registered trademark) with a diameter of 7 mm was filled with 100 mg of pellet and the catalyst layer was fixed with quartz wool from the front and rear. This reaction tube was set in the fixed bed flow reactor system for measuring the ammonia synthesis activity and H$_2$ was fed at 60 mL min$^{-1}$ in the reaction tube filled with the pellet. Then, the reaction tube was heated at 500° C. for one hour and Ru/Ce$_{0.5}$La$_{0.5}$O$_x$_500° C. reduction was obtained.

Example 2

<Ru/Ce$_{0.5}$La$_{0.5}$O$_x$_650° C. Reduction>

Ru/Ce$_{0.5}$La$_{0.5}$O$_x$_650° C. reduction was obtained by performing the same operation as that in Example 1 except that the keeping temperature in the pretreatment in Example 1 was set to 650° C.

Example 3

<Ru/Ce$_{0.5}$La$_{0.5}$O$_x$_800° C. Reduction>

Ru/Ce$_{0.5}$La$_{0.5}$O$_x$_800° C. was obtained by performing the same operation as in Example 1 except that the keeping temperature in the pretreatment in Example 1 was set to 800° C.

Example 4

<Ru/Ce$_{0.5}$Zr$_{0.5}$O$_x$_700° C. Reduction>
<Composite Oxide>

Ce$_{0.5}$Zr$_{0.5}$O$_x$ was synthesized as below by the reverse homogeneous precipitation method. ZrO(NO$_3$)$_2$·2H$_2$O (Wako Pure Chemical Corporation) was dissolved in the purified water to obtain ZrO(NO$_3$)$_2$ aqueous solution. Ce(NO$_3$)$_3$·6H$_2$O (KANTO CHEMICAL CO., INC.) was dissolved in the purified water to obtain Ce(NO$_3$)$_3$ aqueous solution. The La(NO$_3$)$_3$ aqueous solution and the Ce(NO$_3$)$_3$ aqueous solution were mixed to prepare 300 mL of carrier precursor solution containing a total of 0.15 mol of Zr and Ce. To a 1000-mL beaker, 300 mL of 28%-NH$_3$ water (Wako Pure Chemical Corporation) was added. While the solution was stirred with a magnetic stirrer at 320 rpm, the carrier precursor solution was dropped using a pump at 2 mL per minute and continuously stirred for 18 hours. After that, the mixture was left at rest for one hour and filtered. To the slurry left on the filter paper, 800 mL of ion exchange water was added and the mixture was stirred for two hours and left at rest for one hour. This process was repeated three times, and the slurry was dried for 15 hours at 80° C. using an oven. After that, the dried powder was heated in the air atmosphere for five hours at 700° C.; thus, Ce$_{0.5}$Zr$_{0.5}$O$_2$ was obtained.
<Supporting Ru>

Regarding the supporting of Ru, the Ru/Ce$_{0.5}$Zr$_{0.5}$O$_2$ metal-supported material was obtained by the operation similar to that in Example 1.
<Hydrogen Reduction Pretreatment>

Ru/Ce$_{0.5}$Zr$_{0.5}$O$_{1.75}$_700° C. reduction was obtained by the same operation as that in Example 1 except that the keeping temperature in Example 1 was set to 700° C.

Example 5

<Ru/Pr$_{0.5}$La$_{0.5}$O$_x$_600° C. Reduction>
<Composite Oxide>

Pr$_{0.5}$La$_{0.5}$O$_{1.675}$ was synthesized as below in accordance with the reverse homogenous precipitation method. La(NO$_3$)$_3$·6H$_2$O (Wako Pure Chemical Corporation) was dissolved in purified water to obtain La(NO$_3$)$_3$ aqueous solution. Pr(NO$_3$)$_3$·6H$_2$O (KANTO CHEMICAL CO., INC.) was dissolved in purified water to obtain Pr(NO$_3$)$_3$ aqueous solution. The La(NO$_3$)$_3$ aqueous solution and the Pr(NO$_3$)$_3$ aqueous solution were mixed to prepare 250 mL of carrier precursor solution containing a total of 0.0625 mol of La and Pr. To a 1000-mL beaker, 250 mL of 28%-NH$_3$ aqueous solution (Wako Pure Chemical Corporation) was added. While the solution was stirred with a magnetic stirrer at 320 rpm, the carrier precursor solution was added at once and continuously stirred for 11 hours. After that, the mixture was left at rest for 30 minutes and the supernatant was removed by 350 mL, and 350 mL of ion exchange water was added thereto and the mixture was stirred for 30 minutes six times. Then, the precipitate was filtered and dried at 80° C. for 15 hours in an oven. The precipitate after the drying was pulverized in a mortar and the obtained powder was heated in the air atmosphere for five hours at 700° C. using an electric furnace, and thus, $Pr_{0.5}La_{0.5}O_{1.675}$ was obtained.

<Supporting Ru>

Regarding the supporting of Ru, the $Ru/Pr_{0.5}La_{0.5}O_x$ metal-supported material was obtained by the method similar to that in Example 1.

<Hydrogen Reduction Pretreatment>

$Ru/Pr_{0.5}La_{0.5}O_x$_800 ° C. reduction was obtained by the same operation as that in Example 1 except that the keeping temperature in the pretreatment in Example 1 was set to 600° C.

Example 6

<$Ru/Ba_{0.1}La_{0.45}Ce_{0.45}O_x$_650° C. Reduction>

<Preparation of Composite Oxide>

$Ba_{0.1}La_{0.45}Ce_{0.45}O_{1.675}$ was synthesized as below in accordance with the reverse homogeneous precipitation method. $La(NO_3)_3·6H_2O$ (Wako Pure Chemical Corporation) was dissolved in purified water to obtain $La(NO_3)_3$ aqueous solution. $Ce(NO_3)_3·6H_2O$ (KANTO CHEMICAL CO., INC.) was dissolved in purified water to obtain $Ce(NO_3)_3$ aqueous solution. $Ba(NO_3)_2·6H_2O$ (Wako Pure Chemical Corporation) was dissolved in purified water to obtain $Ba(NO_3)_2$ aqueous solution. The $La(NO_3)_3$ aqueous solution, the $Ce(NO_3)_3$ aqueous solution, and the $Ba(NO_3)_2$ aqueous solution were mixed to prepare 250 mL of carrier precursor solution containing a total of 0.0625 mol of La, Ce, and Ba. To a 1000-mL beaker, 250 mL of 28%-$NH_3$ aqueous solution (Wako Pure Chemical Corporation) was added. While the solution was stirred with a magnetic stirrer at 320 rpm, the carrier precursor solution was added at once and continuously stirred for one hour. After that, the mixture was left at rest for 12 hours and the precipitate (1) was separated by suction filtration. The separated filtrate was collected in a 2-L beaker. To the separated precipitate (1), 350 mL of ion exchange water was added and the mixture was stirred for 30 minutes, so that the precipitate was cleaned. Then, the precipitate (1) was separated by suction filtration. This cleaning operation was performed three times. All the ion exchange water used in the cleaning was collected and the filtrate and the cleaning liquid were added to the 2-L beaker and mixed therein. The obtained mixed solution was left for 12 hours so that a white precipitate (2) was generated, and the generated precipitate (2) was collected by suction filtration. The precipitate (1) and the precipitate (2) were mixed and dried at 80° C. for 15 hours using an oven. The precipitate after the drying was pulverized in a mortar, and the obtained powder was heated at 700° C. for 5 hours in the air atmosphere using an electric furnace, so that $Ba_{0.1}La_{0.45}Ce_{0.45}O_{1.675}$ was obtained.

<Supporting Ru>

Regarding the supporting of Ru, the $Ru/Ba_{0.1}La_{0.45}Ce_{0.45}O_x$ metal-supported material was obtained by the method similar to that in Example 1.

<Hydrogen Reduction Pretreatment>

$Ru/Ba_{0.1}La_{0.45}Ce_{0.45}O_x$_650° C. reduction was obtained by the operation similar to that in Example 1 except that the keeping temperature in the pretreatment in Example 1 was set to 650° C.

Example 7

<$Ru/Ba_{0.1}Pr_{0.45}Ce_{0.45}O_x$_650° C. Reduction>

<Preparation of Composite Oxide>

The aqueous solution was mixed in a manner similar to Example 6 except that $Pr(NO_3)_3·6H_2O$ (Wako Pure Chemical Corporation) was dissolved in the purified water and this solution was used as $Pr(NO_3)_3$ aqueous solution instead of using the $La(NO_3)_3$ aqueous solution in Example 6. Then, 250 mL of the carrier precursor solution including a total of 0.0625 mol of Pr, Ce, and Ba was prepared and through the similar operation, $Ba_{0.1}Pr_{0.45}Ce_{0.45}O_{1.9}$ was obtained.

<Supporting Ru>

Regarding the supporting of Ru, the $Ru/Ba_{0.1}Pr_{0.45}Ce_{0.45}O_{1.9}$ metal-supported material was obtained by the operation similar to that in Example 1.

<Hydrogen Reduction Pretreatment>

$Ru/Ba_{0.1}Pr_{0.45}Ce_{0.45}O_x$_650° C. reduction was obtained by the operation similar to that in Example 1 except that the keeping temperature in the pretreatment in Example 1 was set to 650° C.

Example 8

<$Ru/Ba_{0.3}Pr_{0.35}Ce_{0.35}O_x$_650° C. Reduction>

<Preparation of Composite Oxide>

$Ba_{0.3}Pr_{0.35}Ce_{0.35}O_{1.7}$ was obtained by the operation similar to that in Example 6 except that 250 mL of the carrier precursor solution including a total of 0.0625 mol of Pr, Ce, and Ba was prepared.

<Supporting Ru>

Regarding the supporting of Ru, the $Ru/Ba_{0.3}Pr_{0.35}Ce_{0.35}O_{1.7}$ metal-supported material was obtained by the operation similar to that in Example 1.

<Hydrogen Reduction Pretreatment>

$Ru/Ba_{0.3}Pr_{0.35}Ce_{0.35}O_x$_650° C. reduction was obtained by the operation similar to that in Example 1 except that the keeping temperature in the pretreatment in Example 1 was set to 650° C.

Example 9

<$Ru/La_{0.5}Pr_{0.5}O_x$_650° C. Reduction>

<Preparation of Composite Oxide>

The aqueous solution was mixed in a manner similar to Example 1 except that $Pr(NO_3)_3·6H_2O$ (Wako Pure Chemical Corporation) was dissolved in the purified water and this solution was used as $Pr(NO_3)_3$ aqueous solution instead of using the $Ce(NO_3)_3$ aqueous solution in Example 1. Then, 250 mL of the carrier precursor solution including a total of 0.0625 mol of La and Pr was prepared and through the similar operation, $La_{0.5}Pr_{0.5}O_{1.75}$ was obtained.

<Supporting Ru>

Regarding the supporting of Ru, the $Ru/La_{0.5}Pr_{0.5}O_{1.75}$ metal-supported material was obtained by the operation similar to that in Example 1.

<Hydrogen Reduction Pretreatment>

$Ru/La_{0.5}Pr_{0.5}O_{1.75}$ 650° C. reduction was obtained by the operation similar to that in Example 1 except that the keeping temperature in the pretreatment in Example 1 was set to 650° C.

Example 10

<Co/Ba$_{0.3}$Ce$_{0.35}$Pr$_{0.35}$O$_{x}$_650° C. Reduction>
<Preparation of Composite Oxide>

The aqueous solution was mixed in a manner similar to Example 6 except that Pr(NO$_3$)$_3$·6H$_2$O (Wako Pure Chemical Corporation) was dissolved in the purified water and this solution was used as Pr(NO$_3$)$_3$ aqueous solution instead of using the La(NO$_3$)$_3$ aqueous solution in Example 6. Then, 250 mL of the carrier precursor solution including a total of 0.0625 mol of Pr, Ce, and Ba was prepared and through the similar operation, Ba$_{0.3}$Ce$_{0.35}$Pr$_{0.35}$O$_{1.7}$ was obtained.

<Supporting Co>

Co was supported by the evaporation drying method. Co(NO$_3$)$_2$·6H$_2$O (Wako Pure Chemical Corporation) was used as the Co precursor, and dissolved in purified water, thereby preparing 250 mL of aqueous solution. To this solution, Ba$_{0.3}$Ce$_{0.35}$Pr$_{0.35}$O$_{x}$ was added and the mixture was stirred for 12 hours. Then, the aqueous solution was stirred while heat was applied thereto using a hot stirrer, and thus moisture was removed. Note that the quantity of Co(NO$_3$)$_2$·6H$_2$O and the carrier used was adjusted as appropriate so that the quantity of Co in the catalyst after the heating in the air atmosphere became 10 wt %. The dried powder was collected and dried for 12 hours in a drier at 70° C. After that, in the flow of the air at 300 mL min$^{-1}$, the powder was held at 500° C. for five hours, so that nitrate was removed and Co/Ba$_{0.3}$Ce$_{0.35}$Pr$_{0.35}$O$_{1.7}$ was obtained.

<Hydrogen Reduction Pretreatment>

Co/Ba$_{0.3}$Ce$_{0.35}$Pr$_{0.35}$O$_{x}$_650° C. reduction was obtained by the operation similar to that in Example 1 except that the keeping temperature in the pretreatment in Example 1 was set to 650° C.

Example 11

<Co/Ba$_{0.3}$Ce$_{0.35}$Pr$_{0.35}$O$_{x}$_650° C. Reduction>

Co/Ba$_{0.3}$Ce$_{0.35}$Pr$_{0.35}$O$_{x}$_650° C. reduction was obtained by the operation similar to that in Example 10 except that the quantity of the Co precursor in Example 10 was doubled.

Example 12

<Co/Ba$_{0.3}$Ce$_{0.35}$Pr$_{0.35}$O$_{x}$_500° C. Reduction>
<Hydrogen Reduction Pretreatment>

Co/Ba$_{0.3}$Ce$_{0.35}$Pr$_{0.35}$O$_{x}$_500° C. reduction was obtained by the operation similar to that in Example 10 except that the keeping temperature in the pretreatment in Example 10 was set to 500° C.

Example 13

<Co/Ba$_{0.3}$Ce$_{0.35}$Pr$_{0.35}$O$_{x}$_600° C. Reduction>
<Hydrogen Reduction Pretreatment>

Co/Ba$_{0.3}$Ce$_{0.35}$Pr$_{0.35}$O$_{x}$_600° C. reduction was obtained by the operation similar to that in Example 10 except that the keeping temperature in the pretreatment in Example 10 was set to 600° C.

Example 14

<Co/Ba$_{0.3}$Ce$_{0.35}$Pr$_{0.35}$O$_{x}$_700° C. Reduction>
<Hydrogen Reduction Pretreatment>

Co/Ba$_{0.3}$Ce$_{0.35}$Pr$_{0.35}$O$_{x}$_700° C. reduction was obtained by the operation similar to that in Example 10 except that the keeping temperature in the pretreatment in Example 10 was set to 700° C.

Example 15

<Co/Ba$_{0.3}$Ce$_{0.35}$Pr$_{0.35}$O$_{x}$_750° C. Reduction>
<Hydrogen Reduction Pretreatment>

Co/Ba$_{0.3}$Ce$_{0.35}$Pr$_{0.35}$O$_{x}$_750° C. reduction was obtained by the operation similar to that in Example 10 except that the keeping temperature in the pretreatment in Example 10 was set to 750° C.

Example 17

<Co/Ba$_{0.3}$Ce$_{0.35}$Pr$_{0.35}$O$_{x}$_700° C. Reduction>
<Preparation of Composite Oxide and hydrogen reduction pretreatment>

Co/Ba$_{0.3}$Ce$_{0.35}$Pr$_{0.35}$O$_{x}$_700° C. reduction was obtained by the operation similar to that in Example 10 except that the quantity of the Co precursor in Example 10 was doubled and the keeping temperature in the pretreatment in Example 10 was set to 700° C.

Example 18

<Co/Ba$_{0.3}$Ce$_{0.35}$Pr$_{0.35}$O$_{x}$_650° C. Reduction>
<Hydrogen Reduction Pretreatment>

Co/Ba$_{0.3}$Ce$_{0.35}$Pr$_{0.35}$O$_{x}$_650° C. reduction was obtained by the operation similar to that in Example 10 except that the quantity of the Co precursor in Example 10 was tripled and the keeping temperature in the pretreatment in Example 10 was set to 650° C.

Example 19

<Co/Ba$_{0.3}$La$_{0.35}$Pr$_{0.35}$O$_{x}$_650° C. Reduction>
<Hydrogen Reduction Pretreatment>

Co/Ba$_{0.3}$Ce$_{0.35}$Pr$_{0.35}$O$_{x}$_650° C. reduction was obtained by the operation similar to that in Example 10 except that La(NO$_3$)$_3$·6H$_2$O (Wako Pure Chemical Corporation) was dissolved in the purified water, this solution was used as La(NO$_3$)$_3$ aqueous solution, the quantity of the Co precursor was doubled, and the keeping temperature in the pretreatment was set to 650° C. instead of using the Ce(NO$_3$)$_3$ aqueous solution in Example 10.

Example 20

<Ru/Ba$_{0.1}$La$_{0.45}$Ce$_{0.45}$O$_{x}$_500° C. Reduction>
<Preparation of Composite Oxide>

La(NO$_3$)$_3$·6H$_2$O (Wako Pure Chemical Corporation) was dissolved in purified water to obtain La(NO$_3$)$_3$ aqueous solution. Ce(NO$_3$)$_3$·6H$_2$O (KANTO CHEMICAL CO., INC.) was dissolved in purified water to obtain Ce(NO$_3$)$_3$ aqueous solution. The La(NO$_3$)$_3$ aqueous solution and the Ce(NO$_3$)$_3$ aqueous solution were mixed to prepare 250 mL of carrier precursor solution containing a total of 0.0625 mol of La and Ce. To a 1000-mL beaker, 250 mL of 28%-NH$_3$ aqueous solution (Wako Pure Chemical Corporation) was added. While the solution was stirred with a magnetic stirrer at 320 rpm, the carrier precursor solution was added at once and continuously stirred for one hour. After that, the mixture was left at rest for 30 minutes and the supernatant was removed by 350 mL, and 350 mL of ion exchange water was added thereto and the mixture was stirred for 30 minutes four times. Then, the precipitate was filtered. Ba(OH)$_2$ (Wako Pure Chemical Corporation) was dissolved in purified water to obtain Ba(OH)$_2$ aqueous solution. To this Ba(OH)$_2$ aqueous solution, the precipitate was added and the mixture was stirred for 5 minutes with a magnetic stirrer.

The suspension after the stirring was dried to be hardened under the reduced pressure at 35° C. at 0.3 atm using a rotary evaporator, and after that, the obtained substance was dried at 80° C. for 15 hours using an oven. The precipitate after the drying was pulverized in a mortar, and the obtained powder was heated at 700° C. for 5 hours in the air atmosphere using an electric furnace, so that $Ba_{0.1}La_{0.45}Ce_{0.45}O_{1.675}$ was obtained.

<Supporting Ru>

Regarding the supporting of Ru, the $Ru/Ba_{0.1}La_{0.45}Ce_{0.45}O_{1.675}$ metal-supported material was obtained by the operation similar to that in Example 6.

Hydrogen Reduction Pretreatment>

$Ru/Ba_{0.1}La_{0.45}Ce_{0.45}O_x$_500° C. reduction was obtained by the operation similar to that in Example 6 except that the keeping temperature in the pretreatment in Example 6 was set to 500° C.

Example 21

<$Ru/Ba_{0.1}La_{0.45}Ce_{0.45}O_x$_600° C. Reduction>

<Hydrogen Reduction Pretreatment>

$Ru/Ba_{0.1}La_{0.45}Ce_{0.45}O_x$_600° C. reduction was obtained by the operation similar to that in Example 20 except that the keeping temperature in the pretreatment in Example 20 was set to 600° C.

Example 22

<$Ru/Ba_{0.1}La_{0.45}Ce_{0.45}O_x$_650° C. Reduction>

<Hydrogen Reduction Pretreatment>

$Ru/Ba_{0.1}La_{0.45}Ce_{0.45}O_x$_650° C. reduction was obtained by the operation similar to that in Example 20 except that the keeping temperature in the pretreatment in Example 20 was set to 650° C.

Example 23

<$Ru/Ba_{0.1}La_{0.45}Ce_{0.45}O_x$_700° C. Reduction>

<Hydrogen Reduction Pretreatment>

$Ru/Ba_{0.1}La_{0.45}Ce_{0.45}O_x$_700° C. reduction was obtained by the operation similar to that in Example 20 except that the keeping temperature in the pretreatment in Example 20 was set to 700° C.

Example 24

<$Ru/Ba_{0.1}La_{0.45}Ce_{0.45}O_x$_750° C. Reduction>

<Hydrogen Reduction Pretreatment>

$Ru/Ba_{0.1}La_{0.45}Ce_{0.45}O_x$_750° C. reduction was obtained by the operation similar to that in Example 20 except that the keeping temperature in the pretreatment in Example 20 was set to 750° C.

Comparative Example 1

<$Ru/Ce_{0.9}La_{0.1}O_x$_450° C. Reduction Prepared by Conventional Method>

As a comparative example, the catalyst was prepared by the method according to Non-Patent Literature 2. Specifically, first, $RuCl_3/3H_2O$, $Ce(NO_3)_3/6H_2O$, and $La(NO_3)_3/6H_2O$ were dissolved in the aqueous solution, so that a total of 300 mL of mixed aqueous solution was prepared. Here, hydrogen peroxide water was added thereto and mixed so that the molar ratio between $H_2O_2$ and $Ce^{3+}$ became 1:3. While this mixed aqueous solution was maintained at 60° C., the solution was stirred for 30 minutes. Then, KOH aqueous solution was gradually added thereto so that the precipitate was separated out. After that, the mixture was stirred for another 60 minutes. Subsequently, the mixed solution including the precipitate was cooled to room temperature, and the precipitate was separated by a centrifugal separation method. The separated precipitate was cleaned with ion exchange water and then, dried at 120° C. for 24 hours. $Ru/Ce_{0.9}La_{0.1}O_x$_450° C. reduction prepared by the conventional method was obtained by the operation similar to that in Example 1 except that $H_2$ at 45 mL min⁻¹ and $N_2$ at 15 mL min⁻¹ were fed at the same time to the reaction tube and the keeping temperature was set to 450° C. in the pretreatment.

Comparative Example 2

<$Ru/Ce_{0.9}La_{0.1}O_x$_500 ° C. reduction prepared by conventional method>

$Ru/Ce_{0.9}La_{0.1}O_x$_500 ° C. reduction prepared by the conventional method was obtained by the operation similar to that in Comparative example 1 except that the keeping temperature in the pretreatment in Comparative example 1 was set to 500° C.

The ammonia synthesis activity of the metal-supported material obtained in each of Examples and Comparative examples was examined. The results are shown in Tables 2 and 3. In addition, the results of measuring the physical properties of the composite oxides are shown in Table 4. In the case where the column of the gas purifier was used/unused is "O", the reaction gas was processed in advance with a gas purifying filter (MC50-904F) manufactured by SAES to reduce the impurities such as $H_2O$ and $O_2$ to be less than 100 ppt, and then the gas was supplied.

TABLE 2

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 1 | Ru/Ce0.5La0.5Ox | 700 | 500 | 1.37 | 22 | – | 0.53 | Ru supporting quantity: 5 wt %, activity at 350° C. |
| Example 2 | Ru/Ce0.5La0.5Ox | 700 | 650 | 1.94 | 31.3 | – | 0.53 | Ru supporting quantity: 5 wt %, activity at 350° C. |
| Example 3 | Ru/Ce0.5La0.5Ox | 700 | 800 | 1.28 | 20.6 | – | 0.54 | Ru supporting quantity: 5 wt %, activity at 350° C. |

TABLE 2-continued

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 4 | Ru/Ce0.5Zr0.5Ox | 700 | 700 | 1.78 | 28.6 | – | 0.52-0.56 | Ru supporting quantity: 5 wt %, activity at 350° C. |
| Example 5 | Ru/Pr0.5La0.5Ox | 700 | 600 | 1.42 | 22.8 | + | 0.52-0.55 | Ru supporting quantity: 5 wt %, activity at 350° C. |
| Example 6 | Ru/Ba0.1La0.45Ce0.45Ox | 700 | 650 | 2.72 | 43.7 | – | 0.50-0.57 | Ru supporting quantity: 5 wt %, activity at 350° C. |
| Example 7 | Ru/Ba0.1Pr0.45Ce0.45Ox | 700 | 650 | 2.78 | 44.7 | – | 0.47-0.56 | Ru supporting quantity: 5 wt %, activity at 350° C. |
| Example 8 | Ru/Ba0.3Pr0.35Ce0.35Ox | 700 | 650 | 2.5 | 39.3 | – | 0.45-0.59 | Ru supporting quantity: 5 wt %, activity at 350° C. |
| Example 9 | Ru/La0.5Pr0.5Ox | 700 | 650 | 1.67 | 26.8 | – | 0.52-0.55 | Ru supporting quantity: 5 wt %, activity at 350° C. |
| Example 10 | Co/Ba0.3Ce0.35Pr0.35Ox | 700 | 650 | 0.52 @ 400 | 8.31 @ 400 | – | 0.45-0.59 | Co supporting quantity: 10 wt %, activity at 400° C. |
| Example 11 | Co/Ba0.3Ce0.35Pr0.35Ox | 700 | 650 | 0.85 @ 400 | 13.6 @ 400 | – | 0.45-0.59 | Co supporting quantity: 20 wt %, activity at 400° C. |
| Example 12 | Co/Ba0.3Ce0.35Pr0.35Ox | 700 | 500 | 0.07 @ 400 | 1.14 @ 400 | – | 0.45-0.59 | Co supporting quantity: 10 wt %, activity at 400° C. |
| Example 13 | Co/Ba0.3Ce0.35Pr0.35Ox | 700 | 600 | 0.35 @ 400 | 5.58 @ 400 | – | 0.45-0.59 | Co supporting quantity: 10 wt %, activity at 400° C. |
| Example 14 | Co/Ba0.3Ce0.35Pr0.35Ox | 700 | 700 | 0.76 @ 400 | 12.2 @ 400 | – | 0.45-0.59 | Co supporting quantity: 10 wt %, activity at 400° C. |

TABLE 3

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 15 | Co/Ba0.3Ce0.35Pr0.35Ox | 700 | 750 | 0.84 @ 400 | 13.4 @ 400 | – | 0.45-0.59 | Co supporting quantity: 10 wt %, activity at 400° C. |
| Example 17 | Co/Ba0.3Ce0.35Pr0.35Ox | 700 | 700 | 0.89 @ 400 | 14.3 @ 400 | – | 0.45-0.59 | Co supporting quantity: 20 wt %, activity at 400° C. |
| Example 18 | Co/Ba0.3Ce0.35Pr0.35Ox | 700 | 650 | 0.68 @ 400 | 11.0 @ 400 | – | 0.45-0.59 | Co supporting quantity: 30 wt %, activity at 400° C. |
| Example 19 | Co/Ba0.3La0.35Pr0.35Ox | 700 | 650 | 0.64 @ 400 | 10.4 @ 400 | – | 0.47-0.59 | Co supporting quantity: 20 wt %, activity at 400° C. |
| Example 20 | Ru/Ba0.1La0.45Ce0.45Ox | 700 | 500 | 1.16 | 18.6 | + | 0.54 | Ru supporting quantity: 5 wt %, activity at 350° C. |
| Example 21 | Ru/Ba0.1La0.45Ce0.45Ox | 700 | 600 | 2.63 | 42.21 | + | 0.50-0.57 | Ru supporting quantity: 5 wt %, activity at 350° C. |
| Example 22 | Ru/Ba0.1La0.45Ce0.45Ox | 700 | 650 | 3.13 | 50.28 | + | 0.50-0.57 | Ru supporting quantity: 5 wt %, activity at 350° C. |
| Example 23 | Ru/Ba0.1La0.45Ce0.45Ox | 700 | 700 | 3.25 | 52.3 | + | 0.55 | Ru supporting quantity: 5 wt %, activity at 350° C. |
| Example 24 | Ru/Ba0.1La0.45Ce0.45Ox | 700 | 750 | 2.88 | 46.26 | + | 0.50-0.57 | Ru supporting quantity: 5 wt %, activity at 350° C. |

TABLE 3-continued

| | Metal-supported material | Calcinating temperature °C. | Reducing process temperature °C. | Ammonia yield % | Ammonia generation rate mmol g-1 h-1 | Gas purifier used/ unused | Partial negative charge of oxygen | Note |
|---|---|---|---|---|---|---|---|---|
| Example 25 | $Ru/Ba_{0.1}La_{0.45}Ce_{0.45}O_x$ | 700 | 800 | 1.88 | 30.17 | + | 0.55 | Ru supporting quantity: 5 wt %, activity at 350° C. |
| Example 26 | $Ru/Ba_{0.05}La_{0.475}Ce_{0.475}O_x$ | 700 | 700 | 3.13 | 50.28 | + | 0.51-0.56 | Ru supporting quantity: 5 wt %, activity at 350° C. |
| Example 27 | $Ru/Ba_{0.15}La_{0.42.5}Ce_{0.425}O_x$ | 700 | 700 | 2 | 32.18 | + | 0.49-0.57 | Ru supporting quantity: 5 wt %, activity at 350° C. |
| Comparative example 1 | $Ru/Ce_{0.9}La_{0.1}O1,9275$ | | 450 | 0.379 | 6.1 | + | 0.50 | Prepared by method according to Non-Patent Literature 2 |
| Comparative example 2 | $Ru/Ce_{0.9}La_{0.1}O1,9185$ | | 500 | 0.518 | 8.3 | + | 0.50 | Prepared by method according to Non-Patent Literature 2 |

TABLE 4

| | Metal-supported material | Specific surface area $m^2\,g^{-1}$ | Ru dispersion degree ($D_{ads}$) | Ru average particle diameter (d) nm | Ru dispersion degree ($D_{TEM}$) | $D_{ads}/D_{TEM}$ | TOF $S^{-1}$ | Reducing degree of $Ce^{4+}$ (ratio of $Ce^{3+}$) % |
|---|---|---|---|---|---|---|---|---|
| Example 1 | $Ru/Ce_{0.5}La_{0.5}O_x$ | 47 | 0.46 | 1.8 | 0.62 | 0.74 | 0.027 | 23 |
| Example 2 | $Ru/Ce_{0.5}La_{0.5}O_x$ | 42 | 0.35 | 1.7 | 0.65 | 0.54 | 0.051 | 43 |
| Example 3 | $Ru/Ce_{0.5}La_{0.5}O_x$ | 21 | 0.11 | 2.7 | 0.41 | 0.27 | 0.108 | 63 |
| Example 4 | $Ru/Ce_{0.5}Zr_{0.5}O_x$ | | | | | | | |
| Example 5 | $Ru/Pr_{0.5}La_{0.5}O_x$ | | | | | | | |
| Example 6 | $Ru/Ba_{0.1}La_{0.45}Ce_{0.45}O_x$ | | | | | | | |
| Example 7 | $Ru/Ba_{0.1}Pr_{0.45}Ce_{0.45}O_x$ | 25 | 0.14 | | | | | |
| Example 8 | $Ru/Ba_{0.3}Pr_{0.35}Ce_{0.35}O_x$ | | | | | | | |
| Example 9 | $Ru/La_{0.5}Pr_{0.5}O_x$ | 30 | 0.19 | | | | | |
| Example 10 | $Co/Ba_{0.3}Ce_{0.35}Pr_{0.35}O_x$ | | | | | | | |
| Example 11 | $Co/Ba_{0.3}Ce_{0.35}Pr_{0.35}O_x$ | | | | | | | |
| Example 12 | $Co/Ba_{0.3}Ce_{0.35}Pr_{0.35}O_x$ | | | | | | | |
| Example 13 | $Co/Ba_{0.3}Ce_{0.35}Pr_{0.35}O_x$ | | | | | | | |
| Example 14 | $Co/Ba_{0.3}Ce_{0.35}Pr_{0.35}O_x$ | | | | | | | |
| Example 15 | $Co/Ba_{0.3}Ce_{0.35}Pr_{0.35}O_x$ | | | | | | | |
| Example 17 | $Co/Ba_{0.3}Ce_{0.35}Pr_{0.35}O_x$ | | | | | | | |
| Example 18 | $Co/Ba_{0.3}Ce_{0.35}Pr_{0.35}O_x$ | | | | | | | |
| Example 19 | $Co/Ba_{0.3}Ce_{0.35}Pr_{0.35}O_x$ | | | | | | | |
| Example 20 | $Ru/Ba_{0.1}La_{0.45}Ce_{0.45}O_x$ | 25 | | | | | | 24 |
| Example 21 | $Ru/Ba_{0.1}La_{0.45}Ce_{0.45}O_x$ | | | | | | | |
| Example 22 | $Ru/Ba_{0.1}La_{0.45}Ce_{0.45}O_x$ | | | | | | | |
| Example 23 | $Ru/Ba_{0.1}La_{0.45}Ce_{0.45}O_x$ | 21 | 0.08 | | | | 0.386 | 47 |
| Example 24 | $Ru/Ba_{0.1}La_{0.45}Ce_{0.45}O_x$ | 16 | | | | | | |
| Example 25 | $Ru/Ba_{0.1}La_{0.45}Ce_{0.45}O_x$ | 11 | | | | | | 65 |
| Example 26 | $Ru/Ba_{0.05}La_{0.475}Ce_{0.475}O_x$ | | | | | | | |
| Example 27 | $Ru/Ba_{0.15}La_{0.42.5}Ce_{0.425}O_x$ | | | | | | | |
| Comparative example 1 | $Ru/Ce_{0.5}La_{0.5}O_x$ | | | | | | | 5 |
| Comparative example 2 | $Ru/Ce_{0.5}La_{0.5}O_x$ | | | | | | | 7 |

The results indicate that, when Examples and Comparative examples were compared, Examples was superior in the ammonia synthesis activity (ammonia yield and ammonia generation rate) to Comparative examples where the calcination at high temperature was not performed and the ratio of the trivalent element was smaller.

Note that in the catalysts in Comparative example 1 and Comparative example 2 prepared by the method according to Non-Patent Literature 2, the ratio of trivalent Ce was 5% and 7%, respectively in the measurement of the reduction quantity of the catalyst. Note that the ratio of trivalent Ce in the composite oxide was obtained by the X-ray electron spectrometry in Non-Patent Literature 2; however, the X-ray electron spectrometry merely enables the analysis of just the surface of about several layers of atoms that the X-ray can enter in principle. In general, the reduction of the catalyst advances from the vicinity of the surface of the catalyst particle because of the problem of the contact with the reducing agent (for example, hydrogen gas used in the present invention). Therefore, it is considered that the values according to Non-Patent Literature 2 are based on the evaluation of only the ratio of trivalent Ce on the surface and in the case of viewing the entire catalyst, the ratio of the trivalent Ce is evaluated excessively.

Example 25

<Ru/Ba$_{0.1}$La$_{0.45}$Ce$_{0.45}$O$_x$_800° C. Reduction>

Ru/Ba$_{0.1}$La$_{0.45}$Ce$_{0.45}$O$_x$_800° C. reduction was obtained by the operation similar to that in Example 20 except the keeping temperature in the pretreatment in Example 20 was set to 800° C.

Example 26

<Ru/Ba$_{0.05}$La$_{0.475}$Ce$_{0.475}$O$_x$_700° C. Reduction>

Ru/Ba$_{0.1}$La$_{0.45}$Ce$_{0.45}$O$_x$_700 ° C. reduction was obtained by the operation similar to that in Example 20 except the quantity of the Ba precursor in Example 20 was halved.

Example 27

<Ru/Ba$_{0.15}$La$_{0.42.5}$Ce$_{0.425}$O$_x$_700° C. Reduction>

Ru/Ba$_{0.1}$La$_{0.45}$Ce$_{0.45}$O$_x$_700 ° C. reduction was obtained by the operation similar to that in Example 20 except the quantity of the Ba precursor was 1.5 times that in Example 20.

Example 28

<10 mol %-Ba/Ru/La$_{0.5}$Ce$_{0.5}$O$_x$_700° C. Reduction>
<Preparation of Catalyst>

After Ru/Ce$_{0.5}$La$_{0.5}$O$_x$ was prepared by the method according to Example 1, Ba was supported by the evaporation drying method using Ba(NO$_3$)$_2$·6H$_2$O as the raw material so that the quantity became 10 mol % of Ru. The 10 mol %-Ba/Ru/La$_{0.5}$Ce$_{0.5}$O$_x$_700° C. reduction was obtained by the same operation as that in Example 1 except that the keeping temperature in the pretreatment was set to 700° C.
<Hydrogen Reduction Pretreatment>

The 10 mol %-Ba/Ru/La$_{0.5}$Ce$_{0.5}$O$_x$_700° C. reduction was obtained by the same operation as that in Example 1 except that the keeping temperature in the pretreatment in Example 1 was set to 700° C.

Example 29

<10 mol %-Ba/Ru/La$_{0.5}$Ce$_{0.5}$O$_x$_500° C. Reduction>

The 10 mol %-Ba/Ru/La$_{0.5}$Ce$_{0.5}$O$_x$_500° C. reduction was obtained by the operation similar to that in Example 28 except that Ba(OH)$_2$ was used instead of Ba(NO$_3$)$_2$·6H$_2$O as the raw material and the keeping temperature in the pretreatment was set to 500° C. in Example 28.

Example 30

<10 mol %-Ba/Ru/La$_{0.5}$Ce$_{0.5}$O$_x$_650° C. Reduction>

The 10 mol %-Ba/Ru/La$_{0.5}$Ce$_{0.5}$O$_x$_650° C. reduction was obtained by the operation similar to that in Example 29 except that the keeping temperature in the pretreatment in Example 29 was set to 650° C.

Example 31

<10 mol %-Ba/Ru/La$_{0.5}$Ce$_{0.5}$O$_x$_700° C. Reduction>

The 10 mol %-Ba/Ru/La$_{0.5}$Ce$_{0.5}$O$_x$_700° C. reduction was obtained by the operation similar to that in Example 29 except that the keeping temperature in the pretreatment in Example 29 was set to 700° C.

Example 32

<10 mol %-Ba/Ru/La$_{0.5}$Ce$_{0.5}$O$_x$_800° C. Reduction>

The 10 mol %-Ba/Ru/La$_{0.5}$Ce$_{0.5}$O$_x$_800° C. reduction was obtained by the operation similar to that in Example 29 except that the keeping temperature in the pretreatment in Example 29 was set to 800° C.

Example 33

<5 mol %-Ba/Ru/La$_{0.5}$Ce$_{0.5}$O$_x$_450° C. Reduction>

The 5 mol %-Ba/Ru/La$_{0.5}$Ce$_{0.5}$O$_x$_450° C. reduction was obtained by the operation similar to that in Example 29 except that the quantity of the Ba precursor was halved and the keeping temperature in the pretreatment was set to 450° C. in Example 29.

Example 34

<5 mol %-Ba/Ru/La$_{0.5}$Ce$_{0.5}$O$_x$_650° C. Reduction>

The 5 mol %-Ba/Ru/La$_{0.5}$Ce$_{0.5}$O$_x$_650° C. reduction was obtained by the operation similar to that in Example 33 except that the keeping temperature in the pretreatment in Example 33 was set to 650° C.

Example 35

<5 mol %-Ba/Ru/La$_{0.5}$Ce$_{0.5}$O$_x$_700° C. Reduction>

The 5 mol %-Ba/Ru/La$_{0.5}$Ce$_{0.5}$O$_x$_700° C. reduction was obtained by the operation similar to that in Example 33 except that the keeping temperature in the pretreatment in Example 33 was set to 700° C.

Example 36

<5 mol %-Ba/Ru/La$_{0.5}$Ce$_{0.5}$O$_x$_800° C. Reduction>

The 5 mol %-Ba/Ru/La$_{0.5}$Ce$_{0.5}$O$_x$_800° C. reduction was obtained by the operation similar to that in Example 33 except that the keeping temperature in the pretreatment in Example 33 was set to 800° C.

Example 37

<1 mol %-Ba/Ru/La$_{0.5}$Ce$_{0.5}$O$_x$_700° C. Reduction>

The 1 mol %-Ba/Ru/La$_{0.5}$Ce$_{0.5}$O$_x$_700° C. reduction was obtained by the operation similar to that in Example 29 except that the quantity of the Ba precursor was 1/10 of that in Example 29 and the keeping temperature in the pretreatment in Example 29 was set to 700° C.

Example 39

<Ru/Ba$_{0.1}$La$_{0.9}$O$_x$_700° C. Reduction>

Ru/Ba$_{0.1}$La$_{0.9}$O$_x$_700° C. reduction was obtained by the operation similar to that in Example 1 except that Ba(NO$_3$)$_2$·6H$_2$O was used instead of Ce(NO$_3$)$_3$·6H$_2$O as the raw material and the keeping temperature in the pretreatment was set to 700° C. in Example 1.

Example 40

<Ru/Ba$_{0.1}$La$_{0.9}$O$_x$_5 00 ° C. Reduction>

Ru/Ba$_{0.1}$La$_{0.9}$O$_x$_500° C. reduction was obtained by the operation similar to that in Example 39 except the keeping temperature in the pretreatment in Example 29 was set to 500° C.

Example 41

<Ru/Ba$_{0.1}$La$_{0.9}$O$_x$_800 ° C. Reduction>

Ru/Ba$_{0.1}$La$_{0.9}$O$_x$_800° C. reduction was obtained by the operation similar to that in Example 39 except the keeping temperature in the pretreatment in Example 29 was set to 800° C.

Example 42

<Ru/Ba$_{0.1}$La$_{0.9}$O$_x$_900 ° C. Reduction>

Ru/Ba$_{0.1}$La$_{0.9}$O$_x$_900° C. reduction was obtained by the operation similar to that in Example 39 except the keeping temperature in the pretreatment in Example 29 was set to 900° C.

Example 43

<Ru/Ba$_{0.1}$Ce$_{0.9}$O$_x$_500 ° C. Reduction>

Ru/Ba$_{0.1}$Ce$_{0.9}$O$_x$_500° C. reduction was obtained by the operation similar to that in Example 39 except that Ce(NO$_3$)$_3$·6H$_2$O was used instead of La(NO$_3$)$_3$·6H$_2$O as the raw material and the keeping temperature in the pretreatment in Example 39 was set to 500° C.

Example 44

<Ru/Ba$_{0.1}$Ce$_{0.9}$O$_x$_700 ° C. Reduction>

Ru/Ba$_{0.1}$Ce$_{0.9}$O$_x$_700° C. reduction was obtained by the operation similar to that in Example 43 except that the keeping temperature in the pretreatment in Example 43 was set to 700° C.

The ammonia synthesis activity, the physical properties, and the like of the metal-supported materials obtained in Examples were measured, and the results are shown in the table below.

TABLE 5

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 28 | 10 mol % Ba/Ru/La0.5Ce0.5Ox | 700 | 700 | 2.6 | 41.83 | + | 0.50-0.57 | Ba precursor is Ba nitrate, and Ba nitrate is added successively |
| Example 29 | 10 mol % Ba/Ru/La0.5Ce0.5Ox | 700 | 500 | 0.91 | 14.63 | + | 0.50-0.57 | Ru supporting quantity is 4.5 wt %, and yield, etc., are per 50 mg of Ru |
| Example 30 | 10 mol % Ba/Ru/La0.5Ce0.5Ox | 700 | 650 | 2.22 | 35.75 | + | 0.50-0.57 | Ba precursor is BaOH, and BaOH is added successively |
| Example 31 | 10 mol % Ba/Ru/La0.5Ce0.5Ox | 700 | 700 | 2.78 | 44.75 | + | 0.50-0.57 | Ru supporting quantity is 4.5 wt %, and yield, etc., are per 50 mg of Ru |
| Example 32 | 10 mol % Ba/Ru/La0.5Ce0.5Ox | 700 | 800 | 2.53 | 40.41 | + | 0.50-0.57 | Ba precursor is BaOH, and BaOH is added successively |
| Example 33 | 5 mol % Ba/Ru/La0.5Ce0.5Ox | 700 | 450 | 0.79 | 12.67 | + | 0.49-0.56 | Ru supporting quantity is 4.5 wt %, and yield, etc., are per 50 mg of Ru |
| Example 34 | 5 mol % Ba/Ru/La0.5Ce0.5Ox | 700 | 650 | 2.14 | 34.29 | + | 0.49-0.56 | Ba precursor is BaOH, and BaOH is added successively |
| Example 35 | 5 mol % Ba/Ru/La0.5Ce0.5Ox | 700 | 700 | 3.01 | 48.54 | + | 0.49-0.56 | Ru supporting quantity is 4.5 wt %, and yield, etc., are per 50 mg of Ru |
| Example 36 | 5 mol % Ba/Ru/La0.5Ce0.5Ox | 700 | 800 | 2.64 | 42.31 | + | 0.49-0.56 | Ba precursor is BaOH, and BaOH is added successively |
| Example 37 | 1 mol % Ba/Ru/La0.5Ce0.5Ox | 700 | 650 | 1.50 | 24.16 | + | 0.52-0.56 | Ru supporting quantity is 4.5 wt %, and yield, etc., are per 50 mg of Ru |
| Example 39 | Ru/Ba0.1La0.9Ox | 700 | 700 | 2.5 | 40.22 | + | 0.53-0.57 | Precursor is BaOH |
| Example 40 | Ru/Ba0.1La0.9Ox | 700 | 500 | 0.91 | 14.63 | + | 0.53-0.57 | Precursor is BaOH |

TABLE 5-continued

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 41 | Ru/Ba0.1La0.9Ox | 700 | 800 | 3.26 | 52.29 | + | 0.53-0.57 | Precursor is BaOH |
| Example 42 | Ru/Ba0.1La0.9Ox | 700 | 900 | 2.5 | 40.22 | + | 0.53-0.57 | Precursor is BaOH |
| Example 43 | Ru/Ba0.1Ce0.9Ox | 700 | 500 | 1.12 | 18.02 | + | 0.53-0.57 | Precursor is BaOH |
| Example 44 | Ru/Ba0.1Ce0.9Ox | 700 | 700 | 2.13 | 34.19 | + | 0.53-0.57 | Precursor is BaOH |

Example 45

<Co/Ba$_{0.1}$La$_{0.45}$Ce$_{0.45}$O$_x$_700° C. Reduction (Co Supporting Quantity: 20 wt %)>

Co/Ba$_{0.1}$La$_{0.45}$Ce$_{0.45}$O$_x$_700° C. reduction (Co supporting quantity: 20 wt %) was obtained by the operation similar to that in Example 20 except that Co(NO$_3$)$_2$·6H$_2$O was used instead of Ru in Example 20.

Example 46

<Co/Ba$_{0.1}$La$_{0.45}$Ce$_{0.45}$O$_x$_700° C. Reduction (Co Supporting Quantity: 20 wt %)>

Co/Ba$_{0.1}$La$_{0.45}$Ce$_{0.45}$O$_x$_700° C. reduction (Co supporting quantity: 20 wt %) was obtained by the operation similar to that in Example 45 except that Co acetylacetonato(II):Co (CH$_3$COCHCOCH$_3$)$_2$·2H$_2$O (Wako Pure Chemical Corporation) was used instead of Co(NO$_3$)$_2$·6H$_2$O in Example 45.

Example 47

<Co/Ba$_{0.1}$La$_{0.45}$Ce$_{0.45}$O$_x$_700° C. Reduction (Co Supporting Quantity: 10 wt %)>

Co/Ba$_{0.1}$La$_{0.45}$Ce$_{0.45}$O$_x$_700° C. reduction (Co supporting quantity: 10 wt %) was obtained by the operation similar to that in Example 46 except that the quantity of Co in Example 46 was halved.

Example 48

<Co/Ba$_{0.1}$La$_{0.45}$Ce$_{0.45}$O$_x$_700° C. Reduction (Co Supporting Quantity: 30 wt %)>

Co/Ba$_{0.1}$La$_{0.45}$Ce$_{0.45}$O$_x$_700° C. reduction (Co supporting quantity: 30 wt %) was obtained by the operation similar to that in Example 46 except that the quantity of Co was 1.5 times that of Example 46.

Example 49

<Co/Ba$_{0.1}$La$_{0.45}$Ce$_{0.45}$O$_x$_500° C. Reduction (Co Supporting Quantity: 20 wt %)>

Co/Ba$_{0.1}$La$_{0.45}$Ce$_{0.45}$O$_x$_500° C. reduction (Co supporting quantity: 20 wt %) was obtained by the operation similar to that in Example 45 except that Co acetylacetonato(II):Co (CH$_3$COCHCOCH$_3$)$_2$·2H$_2$O (Wako Pure Chemical Corporation) was used instead of Co(NO$_3$)$_2$·6H$_2$O in Example 45.

Example 50

<Co/Ba$_{0.1}$La$_{0.45}$Ce$_{0.45}$O$_x$_650° C. Reduction (Co Supporting Quantity: 20 wt %)>

Co/Ba$_{0.1}$La$_{0.45}$Ce$_{0.45}$O$_x$_650° C. reduction (Co supporting quantity: 20 wt %) was obtained by the operation similar to that in Example 46 except that the keeping temperature in the pretreatment in Example 46 was set to 650° C.

Example 51

<Co/Ba$_{0.1}$La$_{0.45}$Ce$_{0.45}$O$_x$_750° C. Reduction (Co Supporting Quantity: 20 wt %)>

Co/Ba$_{0.1}$La$_{0.45}$Ce$_{0.45}$O$_x$_750° C. reduction (Co supporting quantity: 20 wt %) was obtained by the operation similar to that in Example 46 except that the keeping temperature in the pretreatment in Example 46 was set to 750° C.

Example 52

<Co/Ba$_{0.1}$Ce$_{0.45}$Pr$_{0.45}$O$_x$_700° C. Reduction (Co Supporting Quantity: 20 wt %)>

Co/Ba$_{0.1}$Ce$_{0.45}$Pr$_{0.45}$O$_x$_700° C. reduction (Co supporting quantity: 20 wt %) was obtained by the operation similar to that in Example 10 except that Co(NO$_3$)$_2$·6H$_2$O was used instead of Ru and the keeping temperature in the pretreatment was set to 700° C. in Example 10.

Example 53

<Ru/Ce$_{0.85}$La$_{0.15}$O$_x$_500° C. Reduction>

Ru/Ce$_{0.85}$La$_{0.15}$O$_x$_500° C. reduction was obtained by the operation similar to that in Example 1 except that the ratio between the raw materials Ce and La in Example 1 was changed.

Example 54

<Ru/Ce$_{0.85}$La$_{0.15}$O$_x$_600° C. Reduction>

Ru/Ce$_{0.85}$La$_{0.15}$O$_x$_600° C. reduction was obtained by the operation similar to that in Example 53 except that the keeping temperature in the pretreatment in Example 54 was set to 600° C.

Example 55

<Ru/Ce$_{0.85}$La$_{0.15}$O$_x$_650° C. Reduction>

Ru/Ce$_{0.85}$La$_{0.15}$O$_x$_650° C. reduction was obtained by the operation similar to that in Example 53 except that the keeping temperature in the pretreatment in Example 54 was set to 650° C.

Example 56

<Ru/Ce$_{0.85}$La$_{0.15}$O$_x$_700° C. Reduction>

Ru/Ce$_{0.85}$La$_{0.15}$O$_x$_700° C. reduction was obtained by the operation similar to that in Example 53 except that the keeping temperature in the pretreatment in Example 54 was set to 700° C.

Example 57

<Ru/Ce$_{0.67}$La$_{0.33}$O$_x$_500° C. Reduction>

Ru/Ce$_{0.67}$La$_{0.33}$O$_x$_500° C. reduction was obtained by the operation similar to that in Example 53 except that the ratio between the raw materials Ce and La in Example 53 was changed.

Example 58

<Ru/Ce$_{0.67}$La$_{0.33}$O$_x$_600° C. Reduction>

Ru/Ce$_{0.67}$La$_{0.33}$O$_x$_600° C. reduction was obtained by the operation similar to that in Example 57 except that the keeping temperature in the pretreatment in Example 57 was set to 600° C.

Example 59

<Ru/Ce$_{0.67}$La$_{0.33}$O$_x$_650° C. Reduction>

Ru/Ce$_{0.67}$La$_{0.33}$O$_x$_650° C. reduction was obtained by the operation similar to that in Example 57 except that the keeping temperature in the pretreatment in Example 57 was set to 650° C.

Example 60

<Ru/Ce$_{0.67}$La$_{0.33}$O$_x$_700° C. Reduction>

Ru/Ce$_{0.67}$La$_{0.33}$O$_x$_700° C. reduction was obtained by the operation similar to that in Example 57 except that the keeping temperature in the pretreatment in Example 57 was set to 700° C.

Example 61

<Ru/Ce$_{0.33}$La$_{0.67}$O$_x$_500° C. Reduction>

Ru/Ce$_{0.33}$La$_{0.67}$O$_x$_500° C. reduction was obtained by the operation similar to that in Example 53 except that the ratio between the raw materials Ce and La in Example 53 was changed.

Example 62

<Ru/Ce$_{0.33}$La$_{0.67}$O$_x$_600° C. Reduction>

Ru/Ce$_{0.33}$La$_{0.67}$O$_x$_600° C. reduction was obtained by the operation similar to that in Example 61 except that the keeping temperature in the pretreatment in Example 61 was set to 600° C.

Example 63

<Ru/Ce$_{0.33}$La$_{0.67}$O$_x$_650° C. Reduction>

Ru/Ce$_{0.33}$La$_{0.67}$O$_x$_650° C. reduction was obtained by the operation similar to that in Example 61 except that the keeping temperature in the pretreatment in Example 61 was set to 650° C.

Example 64

<Ru/Ce$_{0.33}$La$_{0.67}$O$_x$_700° C. Reduction>

Ru/Ce$_{0.33}$La$_{0.67}$O$_x$_700° C. reduction was obtained by the operation similar to that in Example 61 except that the keeping temperature in the pretreatment in Example 61 was set to 700° C.

Example 65

<Ru/Ce$_{0.15}$La$_{0.85}$O$_x$_500° C. Reduction>

Ru/Ce$_{0.15}$La$_{0.85}$O$_x$_500° C. reduction was obtained by the operation similar to that in Example 53 except that the ratio between the raw materials Ce and La in Example 53 was changed.

Example 66

<Ru/Ce$_{0.15}$La$_{0.85}$O$_x$_600° C. Reduction>

Ru/Ce$_{0.15}$La$_{0.85}$O$_x$_600° C. reduction was obtained by the operation similar to that in Example 65 except that the keeping temperature in the pretreatment in Example 65 was set to 600° C.

Example 67

<Ru/Ce$_{0.15}$La$_{0.85}$O$_x$_650° C. Reduction>

Ru/Ce$_{0.15}$La$_{0.85}$O$_x$_650° C. reduction was obtained by the operation similar to that in Example 65 except that the keeping temperature in the pretreatment in Example 65 was set to 650° C.

Example 68

<Ru/Ce$_{0.5}$La$_{0.5}$O$_x$_700° C. Reduction>

Ru/Ce$_{0.15}$La$_{0.85}$O$_x$_700° C. reduction was obtained by the operation similar to that in Example 65 except that the keeping temperature in the pretreatment in Example 65 was set to 700° C.

Example 69

<Ru/Ce$_{0.5}$La$_{0.5}$O$_x$_500° C. Reduction>

Ru/Ce$_{0.5}$La$_{0.5}$O$_x$_500° C. reduction was obtained by the operation similar to that in Example 53 except that the ratio between the raw materials Ce and La was changed and the heating (calcinating) temperature in the step of preparing the composite oxide was set to 600° C. in Example 53.

Example 70

<Ru/Ce$_{0.5}$La$_{0.5}$O$_x$_650° C. Reduction>

Ru/Ce$_{0.5}$La$_{0.5}$O$_x$_650° C. reduction was obtained by the operation similar to that in Example 69 except that the keeping temperature in the pretreatment in Example 69 was set to 650° C.

Example 71

<Ru/Ce$_{0.5}$La$_{0.5}$O$_x$_800° C. Reduction>

Ru/Ce$_{0.5}$La$_{0.5}$O$_x$_800° C. reduction was obtained by the operation similar to that in Example 69 except that the keeping temperature in the pretreatment in Example 69 was set to 800° C.

The ammonia synthesis activity, the physical properties, and the like of the metal-supported materials obtained in Examples and Comparative examples were measured, and the results are shown in the tables below.

TABLE 6

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 45 | Co/Ba0.1La0.45Ce0.45Ox | 700 | 700 | 0.75 @ 400 | 12.0 @ 400 | + | 0.50-0.57 | Precursor is BaOH, Co precursor is Co nitrate, and Co supporting quantity is 20 wt % |
| Example 46 | Co/Ba0.1La0.45Ce0.45Ox | 700 | 700 | 1.39 @ 400 | 22.3 @ 400 | + | 0.50-0.57 | Precursor is BaOH, Co precursor is Co acetylacetonato(II), and Co supporting quantity is 20 wt % |
| Example 47 | Co/Ba0.1La0.45Ce0.45Ox | 700 | 700 | 1.24 @ 400 | 19.9 @ 400 | + | 0.50-0.57 | Precursor is BaOH, Co precursor is Co acetylacetonato(II), and Co supporting quantity is 10 wt % |
| Example 48 | Co/Ba0.1La0.45Ce0.45Ox | 700 | 700 | 1.23 @ 400 | 19.7 @ 400 | + | 0.50-0.57 | Precursor is BaOH, Co precursor is Co acetylacetonato(II), and Co supporting quantity is 30 wt % |
| Example 49 | Co/Ba0.1La0.45Ce0.45Ox | 700 | 500 | 0.64 @ 400 | 10.4 @ 400 | + | 0.50-0.57 | Precursor is BaOH, Co precursor is Co acetylacetonato(II), and Co supporting quantity is 20 wt % |
| Example 50 | Co/Ba0.1La0.45Ce0.45Ox | 700 | 650 | 1.24 @ 400 | 19.9 @ 400 | + | 0.50-0.57 | Precursor is BaOH, Co precursor is Co acetylacetonato(II), and Co supporting quantity is 20 wt % |
| Example 51 | Co/Ba0.1La0.45Ce0.45Ox | 700 | 750 | 1.16 @ 400 | 18.7 @ 400 | + | 0.50-0.57 | Precursor is BaOH, Co precursor is Co acetylacetonato(II), and Co supporting quantity is 20 wt % |
| Example 52 | Co/Ba0.1Ce0.45Pr0.45Ox | 700 | 700 | 1.40 @ 400 | 22.5 @ 400 | + | 0.47-0.56 | Precursor is BaOH, Co precursor is Co acetylacetonato(II), and Co supporting quantity is 20 wt % |

TABLE 7

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 53 | Ru/Ce0.85La0.15Ox | 700 | 500 | 0.7 | 11.3 | − | 0.50-0.55 | Ru supporting quantity: 5 wt % |
| Example 54 | Ru/Ce0.85La0.15Ox | 700 | 600 | 1.48 | 23.6 | − | 0.50-0.55 | Ru supporting quantity: 5 wt % |
| Example 55 | Ru/Ce0.85La0.15Ox | 700 | 650 | 1.58 | 25.4 | − | 0.50-0.55 | Ru supporting quantity: 5 wt % |
| Example 56 | Ru/Ce0.85La0.15Ox | 700 | 700 | 1.40 | 22.4 | − | 0.50-0.55 | Ru supporting quantity: 5 wt % |
| Example 57 | Ru/Ce0.67La0.33Ox | 700 | 500 | 1.30 | 20.9 | − | 0.52 | Ru supporting quantity: 5 wt % |
| Example 58 | Ru/Ce0.67La0.33Ox | 700 | 600 | 1.74 | 28.1 | − | 0.51-0.56 | Ru supporting quantity: 5 wt % |
| Example 59 | Ru/Ce0.67La0.33Ox | 700 | 650 | 1.93 | 31.1 | − | 0.53 | Ru supporting quantity: 5 wt % |
| Example 60 | Ru/Ce0.67La0.33Ox | 700 | 700 | 1.67 | 26.9 | − | 0.51-0.56 | Ru supporting quantity: 5 wt % |
| Example 61 | Ru/Ce0.33La0.67Ox | 700 | 500 | 1.52 | 24.4 | − | 0.54 | Ru supporting quantity: 5 wt % |
| Example 62 | Ru/Ce0.33La0.67Ox | 700 | 600 | 1.78 | 28.6 | − | 0.53-0.56 | Ru supporting quantity: 5 wt % |

TABLE 7-continued

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 63 | Ru/Ce0.33La0.67Ox | 700 | 650 | 2.02 | 32.4 | – | 0.54 | Ru supporting quantity: 5 wt % |
| Example 64 | Ru/Ce0.33La0.67Ox | 700 | 700 | 1.67 | 26.8 | – | 0.53-0.56 | Ru supporting quantity: 5 wt % |
| Example 65 | Ru/Ce0.15La0.85Ox | 700 | 500 | 1.31 | 21.0 | – | 0.55-0.56 | Ru supporting quantity: 5 wt % |
| Example 66 | Ru/Ce0.15La0.85Ox | 700 | 600 | 1.67 | 26.7 | – | 0.55-0.56 | Ru supporting quantity: 5 wt % |
| Example 67 | Ru/Ce0.15La0.85Ox | 700 | 650 | 1.82 | 29.3 | – | 0.55-0.56 | Ru supporting quantity: 5 wt % |
| Example 68 | Ru/Ce0.15La0.85Ox | 700 | 700 | 1.72 | 2.45 | – | 0.55-0.56 | Ru supporting quantity: 5 wt % |
| Example 69 | Ru/Ce0.5La0.5Ox | 600 | 500 | 1.55 | 24.8 | + | 0.52-0.56 | Ru supporting quantity: 5 wt % |
| Example 70 | Ru/Ce0.5La0.5Ox | 600 | 650 | 1.63 | 26.0 | + | 0.52-0.56 | Ru supporting quantity: 5 wt % |
| Example 71 | Ru/Ce0.5La0.5Ox | 600 | 800 | 1.06 | 17.1 | + | 0.52-0.56 | Ru supporting quantity: 5 wt % |

TABLE 8

| | Metal-supported material | Specific surface area m$^2$ g$^{-1}$ | Ru dispersion degree (D$_{ads}$) | Ru average particle diameter (d) nm | Ru dispersion degree (D$_{TEM}$) | D$_{ads}$/D$_{TEM}$ | TOF S$^{-1}$ | Reducing degree of Ce$^{4+}$ (ratio of Ce$^{3+}$) % |
|---|---|---|---|---|---|---|---|---|
| Example 45 | Co/Ba0.1La0.45Ce0.45Ox | | | | | | | |
| Example 46 | Co/Ba0.1La0.45Ce0.45Ox | 19.3 | | | | | | |
| Example 47 | Co/Ba0.1La0.45Ce0.45Ox | | | | | | | |
| Example 48 | Co/Ba0.1La0.45Ce0.45Ox | | | | | | | |
| Example 49 | Co/Ba0.1La0.45Ce0.45Ox | | | | | | | |
| Example 50 | Co/Ba0.1La0.45Ce0.45Ox | | | | | | | |
| Example 51 | Co/Ba0.1La0.45Ce0.45Ox | | | | | | | |
| Example 52 | Co/Ba0.1Ce0.45Pr0.45Ox | 15.3 | | | | | | |
| Example 53 | Ru/Ce0.85La0.15Ox | | | | | | | |
| Example 54 | Ru/Ce0.85La0.15Ox | | | | | | | |
| Example 55 | Ru/Ce0.85La0.15Ox | | | | | | | |
| Example 56 | Ru/Ce0.85La0.15Ox | | | | | | | |
| Example 57 | Ru/Ce0.67La0.33Ox | | 0.45 | | | | 0.026 | 27 |
| Example 58 | Ru/Ce0.67La0.33Ox | | | | | | | |
| Example 59 | Ru/Ce0.67La0.33Ox | | 0.35 | | | | 0.05 | 43 |
| Example 60 | Ru/Ce0.67La0.33Ox | | | | | | | |
| Example 61 | Ru/Ce0.33La0.67Ox | | 0.30 | | | | 0.046 | 23 |
| Example 62 | Ru/Ce0.33La0.67Ox | | | | | | | |
| Example 63 | Ru/Ce0.33La0.67Ox | | 0.37 | | | | 0.049 | 47 |
| Example 64 | Ru/Ce0.33La0.67Ox | | | | | | | |
| Example 65 | Ru/Ce0.15La0.85Ox | | | | | | | |
| Example 66 | Ru/Ce0.15La0.85Ox | | | | | | | |
| Example 67 | Ru/Ce0.15La0.85Ox | | | | | | | |
| Example 68 | Ru/Ce0.15La0.85Ox | | | | | | | |
| Example 69 | Ru/Ce0.5La0.5Ox | | 0.40 | | | | 0.035 | |
| Example 70 | Ru/Ce0.5La0.5Ox | | 0.24 | | | | 0.061 | |
| Example 71 | Ru/Ce0.5La0.5Ox | | 0.04 | | | | 0.240 | |

Comparative Example 4

<Ru/La$_2$O$_3$_500° C. Reduction>

La$_2$O$_3$ was synthesized as below by the reverse homogeneous precipitation method. La(NO$_3$)$_3$·6H$_2$O (Wako Pure Chemical Corporation) was dissolved in purified water (Takasugi Pharmaceutical Co., Ltd.) to obtain La(NO$_3$)$_3$ aqueous solution. The carrier precursor solution including a total of 0.0625 mol of La was prepared for 250 mL. To a 1000-mL beaker, 250 mL of 28%-NH$_3$ aqueous solution (Wako Pure Chemical Corporation) was added, and while the solution was stirred with a magnetic stirrer at 320 rpm, the carrier precursor solution was added thereto at once and the mixture was continuously stirred for one hour. After that, the mixture was left at rest for 30 minutes and the supernatant was removed by 350 mL, and 350 mL of ion exchange water was added thereto and the mixture was stirred for 30 minutes. A series of operations was performed four times, and the precipitate was filtered and dried at 80° C. for 15 hours in an oven. The precipitate after the drying was pulverized in a mortar and the obtained powder was heated in the air atmosphere for five hours at 700° C. using an electric furnace, and thus, La$_2$O$_3$ was obtained. Ru was supported by the operation similar to that in Example 1, and the reducing process was performed by the operation similar to that in Example 1, so that Ru/La$_2$O$_3$_500° C. reduction was obtained.

Comparative Example 5

<Ru/CeO$_x$_500° C. Reduction>

The CeO$_2$ composite oxide was synthesized as below in accordance with the reverse homogeneous precipitation method. Ce(NO$_3$)$_3$·6H$_2$O (KANTO CHEMICAL CO., INC.) was dissolved in purified water (Takasugi Pharmaceutical Co., Ltd.) to obtain Ce(NO$_3$)$_3$ aqueous solution. The Ce(NO$_3$)$_3$ aqueous solution was mixed and 250 mL of the carrier precursor solution including a total of 0.0625 mol of Ce was prepared. To a 1000-mL beaker, 250 mL of 28%-NH$_3$ aqueous solution (Wako Pure Chemical Corporation) was added, and while the solution was stirred with a magnetic stirrer at 320 rpm, the carrier precursor solution was added thereto at once and the mixture was continuously stirred for one hour. After that, the mixture was left at rest for 30 minutes and the supernatant was removed by 350 mL, and 350 mL of ion exchange water was added thereto and the mixture was stirred for 30 minutes. A series of operations was performed four times, and the precipitate was filtered and dried at 80° C. for 15 hours in an oven. The precipitate after the drying was pulverized in a mortar and the obtained powder was heated in the air atmosphere for five hours at 700° C. using an electric furnace, and thus, CeO$_2$ was obtained. Ru was supported by the operation similar to that in Example 1, and the reducing process was performed by the operation similar to that in Example 1, so that Ru/CeO$_x$_500° C. reduction was obtained.

Comparative Example 6

<Ru/CeO$_2$_650° C. Reduction>

Ru/CeO$_2$_650° C. reduction was obtained by the operation similar to that in Comparative example 5 except that the keeping temperature in the pretreatment in Comparative example 5 was set to 650° C.

Example 75

<Ru/La$_{0.5}$Pr$_{0.5}$O$_x$_450° C. Reduction>

Ru/La$_{0.5}$Pr$_{0.5}$O$_x$_450° C. reduction was obtained by the operation similar to that in Example 5 except that the keeping temperature in the pretreatment in Example 5 was set to 450° C.

Example 76

<Ru/La$_{0.5}$Pr$_{0.5}$O$_{1.75}$_500° C. Reduction>

Ru/La$_{0.5}$Pr$_{0.5}$O$_x$_500° C. reduction was obtained by the operation similar to that in Example 5 except that the keeping temperature in the pretreatment in Example 5 was set to 500° C.

Example 78

<Ru/La$_{0.5}$Pr$_{0.5}$O$_x$_700° C. Reduction>

Ru/La$_{0.5}$Pr$_{0.5}$O$_x$_700° C. reduction was obtained by the operation similar to that in Example 5 except that the keeping temperature in the pretreatment in Example 5 was set to 700° C.

Comparative Example 8

<Ru/MgO_700° C. Reduction>

Ru/MgO_700° C. reduction was obtained by performing the reducing process through the operation similar to that in Example 1 except that MgO with high purity (500A, Ube Industries, Ltd.) was calcinated at 700° C. for five hours in the air, Ru was supported by the operation similar to that in Example 1, and the keeping temperature was set to 700° C.

Example 80

<8.4 wt %-Ba/4.5 wt %-Ru/MgO_500° C. Reduction>
<Preparation of Catalyst>

After Ru/MgO was obtained by the method according to Comparative example 8, Ba was supported by the evaporation drying method using Ba(OH)$_2$·8H$_2$O as the raw material for the Ru/MgO metal-supported material, so that the amount of substance became 1.37 times that of Ru.
<Hydrogen Reduction Pretreatment>

The 8.4 wt %-Ba/4.5 wt %-Ru/MgO_500° C. reduction was obtained by the operation similar to that in Example 1 except that the keeping temperature in Example 1 was set to 500° C.

Example 81

<8.4 wt %-Ba/4.5 wt %-Ru/MgO_700° C. Reduction>

The 8.4 wt %-Ba/4.5 wt %-Ru/MgO_700° C. reduction was obtained by the operation similar to that in Example 80 except that the keeping temperature in Example 80 was set to 700° C.

Example 82

<Ru/Ce$_{0.5}$Pr$_{0.5}$O$_x$_500° C. Reduction>

Ru/Ce$_{0.5}$Pr$_{0.5}$O$_x$_500 ° C. reduction was obtained by the operation similar to that in Example 1 except that Pr(NO$_3$)$_3$·6H$_2$O was used instead of La(NO$_3$)$_3$·6H$_2$O as the raw material in Example 1.

Example 83

<Ru/Ce$_{0.5}$Pr$_{0.5}$O$_x$_600° C. Reduction>

Ru/Ce$_{0.5}$Pr$_{0.5}$O$_x$_600 ° C. reduction was obtained by the operation similar to that in Example 82 except that the keeping temperature in the pretreatment in Example 82 was set to 600° C.

Example 84

<Ru/Ce$_{0.5}$Pr$_{0.5}$O$_2$_650° C. Reduction>

Ru/Ce$_{0.5}$Pr$_{0.5}$O$_2$_650° C. reduction was obtained by the operation similar to that in Example 82 except that the keeping temperature in the pretreatment in Example 82 was set to 650° C.

Example 85

<Ru/Ce$_{0.5}$Pr$_{0.5}$O$_x$_700 ° C. Reduction>

Ru/Ce$_{0.5}$Pr$_{0.5}$O$_x$_700 ° C. reduction was obtained by the operation similar to that in Example 82 except that the keeping temperature in the pretreatment in Example 82 was set to 700° C.

Example 86

<Ru/Ce$_{0.5}$Pr$_{0.5}$O$_x$_800° C. Reduction>
Ru/Ce$_{0.5}$Pr$_{0.5}$O$_x$_800° C. reduction was obtained by the operation similar to that in Example 82 except that the keeping temperature in the pretreatment in Example 82 was set to 800° C.

Example 87

<Ru/Ce$_{0.5}$La$_{0.5}$O$_x$_500° C. Reduction>
Ru/Ce$_{0.5}$La$_{0.5}$O$_x$_500° C. reduction was obtained by the operation similar to that in Example 1 except that the heating (calcinating) temperature in the step of preparing the composite oxide was set to 800° C. in Example 1 and the gas purifier was used in a manner similar to that in Example 20.

Example 88

<Ru/Ce$_{0.5}$La$_{0.5}$O$_x$_650° C. Reduction>
Ru/Ce$_{0.5}$La$_{0.5}$O$_x$_650° C. reduction was obtained by the operation similar to that in Example 87 except that the keeping temperature in the pretreatment in Example 87 was set to 650° C.

Example 89

<Ru/Ce$_{0.5}$La$_{0.5}$O$_x$_800° C. Reduction>
Ru/Ce$_{0.5}$La$_{0.5}$O$_x$_800° C. reduction was obtained by the operation similar to that in Example 87 except that the keeping temperature in the pretreatment in Example 87 was set to 800° C.

Example 90

<Fe/Ba$_{0.1}$La$_{0.45}$Ce$_{0.45}$O$_x$_700° C. Reduction>
Fe/Ba$_{0.1}$La$_{0.45}$Ce$_{0.45}$O$_x$_700° C. reduction was obtained by the operation similar to that in Example 20 except that tris(2,4-pentanedionato)iron(III) (Fe(acac)$_3$) was used instead of Ru as the raw material and the keeping temperature in the pretreatment in Example 20 was set to 700° C.

Example 91

<Fe/Ba$_{0.1}$La$_{0.45}$Ce$_{0.45}$O$_x$_700° C. Reduction>
Fe/Ba$_{0.1}$La$_{0.45}$Ce$_{0.45}$O$_x$_700° C. reduction was obtained by the operation similar to that in Example 90 except that dodecacarbonyl iron (Fe$_3$(CO)$_{12}$) was used instead of Fe(acac)$_3$ as the raw material in Example 90.

Example 92

<Co—Fe/Ba$_{0.1}$La$_{0.45}$Ce$_{0.45}$O$_x$_700° C. Reduction>
Co—Fe/Ba$_{0.1}$La$_{0.45}$Ce$_{0.45}$O$_x$_700° C. reduction was obtained by the operation similar to that in Example 90 except that Co(NO$_3$)$_2$·6H$_2$O was used in addition to Fe(acac)$_3$ as the raw material in Example 90.

Example 93

<Co—Fe/Ba$_{0.1}$La$_{0.45}$Ce$_{0.45}$O$_x$_750° C. Reduction>
Co—Fe/Ba$_{0.1}$La$_{0.45}$Ce$_{0.45}$O$_x$_750° C. reduction was obtained by the operation similar to that in Example 92 except that the keeping temperature in the pretreatment in Example 92 was set to 750° C.

Example 94

<Ru/Ba$_{0.1}$La$_{0.3}$Ce$_{0.6}$O$_x$_700° C. Reduction>
Ru/Ba$_{0.1}$La$_{0.3}$Ce$_{0.6}$O$_x$_700° C. reduction was obtained by the operation similar to that in Example 23 except that the mixing amount of La and Ce in Example 23 was changed.

Example 95

<Ru/Ba$_{0.1}$La$_{0.6}$Ce$_{0.3}$O$_x$_700° C. Reduction>
Ru/Ba$_{0.1}$La$_{0.6}$Ce$_{0.3}$O$_x$_700° C. reduction was obtained by the operation similar to that in Example 94 except that the mixing amount of La and Ce in Example 94 was changed.

Example 96

<Ru/Ba$_{0.1}$La$_{0.8}$Ce$_{0.1}$O$_x$_700° C. Reduction>
Ru/Ba$_{0.1}$La$_{0.8}$Ce$_{0.1}$O$_x$_700° C. reduction was obtained by the operation similar to that in Example 94 except that the mixing amount of La and Ce in Example 94 was changed.

Example 97

<Ru/Ba$_{0.1}$La$_{0.45}$Ce$_{0.45}$O$_x$_500° C. 48 hours Reduction>
<Hydrogen Reduction Pretreatment>
Ru/Ba$_{0.1}$La$_{0.45}$Ce$_{0.45}$O$_x$_500° C. 48 hours reduction was obtained by the operation similar to that in Example 20 except that the keeping time in the pretreatment in Example 20 was set to 48 hours.

Example 98

<Ru/Ba$_{0.1}$La$_{0.45}$Ce$_{0.45}$O$_x$_450° C._72_hours Reduction>
<Hydrogen Reduction Pretreatment>
Ru/Ba$_{0.1}$La$_{0.45}$Ce$_{0.45}$O$_x$_450° C._72_hours reduction was obtained by the operation similar to that in Example 20 except that the keeping temperature in the pretreatment in Example 20 was set to 450° C. and the keeping time in the pretreatment in Example 20 was set to 72 hours.

Example 99

<Ru/Ce0.5La$_{0.5}$Ox_500° C._48_Hours Reduction>
<Hydrogen Reduction Pretreatment>
Ru/Ce0.5La$_{0.5}$Ox_500° C._48_hours reduction was obtained by the operation similar to that in Example 1 except that a gas generator was used and the keeping time in the pretreatment in Example 1 was set to 48 hours.

The ammonia synthesis activity, the physical properties, and the like of the metal-supported materials obtained in accordance with Examples and Comparative examples were measured. The results are shown below.

TABLE 9

| | Metal-supported material | Calcinating temperature ° C. | Reducing process temperature ° C. | Ammonia yield % | Ammonia generation rate mmol g-1 h-1 | Gas purifier used/unused | Partial negative charge of oxygen | Note |
|---|---|---|---|---|---|---|---|---|
| Comparative example 4 | Ru/La2O3 | 700 | 500 | 0.66 | 10.6 | – | 0.56 | Ru supporting quantity: 5 wt % |

TABLE 9-continued

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Comparative example 5 | Ru/CeOx | 700 | 500 | 0.80 | 12.8 | – | 0.56 | Ru supporting quantity: 5 wt % |
| Comparative example 6 | Ru/CeOx | 700 | 650 | 1.07 | 17.2 | – | 0.56 | Ru supporting quantity: 5 wt % |
| Example 75 | Ru/La0.5Pr0.5Ox | 700 | 450 | 0.43 | 6.9 | – | 0.52-0.55 | Ru supporting quantity: 5 wt % |
| Example 76 | Ru/La0.5Pr0.5Ox | 700 | 500 | 1.20 | 19.3 | – | 0.55 | Ru supporting quantity: 5 wt % |
| Example 78 | Ru/La0.5Pr0.5Ox | 700 | 700 | 1.22 | 19.7 | – | 0.52-0.55 | Ru supporting quantity: 5 wt % |
| Comparative example 8 | Ru/MgO | 700 | 500 | 0.06 | 0.9 | + | 0.52-0.55 | Ru supporting quantity: 5 wt % |
| Example 80 | 8.4 wt % Ba/ 4.5 wt % Ru/MgO | 700 | 500 | 0.52 | 8.3 | + | 0.42 | Ru supporting quantity: 5 wt % |
| Example 81 | 8.4 wt % Ba/ 4.5 wt % Ru/MgO | 700 | 700 | 1.62 | 25.9 | + | 0.42-0.43 | Ru supporting quantity: 5 wt % |
| Example 82 | Ru/Ce0.5Pr0.5Ox | 700 | 500 | 1.29 | 20.7 | + | | Ru supporting quantity: 5 wt % |
| Example 83 | Ru/Ce0.5Pr0.5Ox | 700 | 600 | 1.63 | 26.2 | + | | Ru supporting quantity: 5 wt % |
| Example 84 | Ru/Ce0.5Pr0.5Ox | 700 | 650 | 1.76 | 28.2 | + | | Ru supporting quantity: 5 wt % |
| Example 85 | Ru/Ce0.5Pr0.5Ox | 700 | 700 | 1.69 | 27.2 | + | | Ru supporting quantity: 5 wt % |
| Example 86 | Ru/Ce0.5Pr0.5Ox | 700 | 800 | 1.35 | 21.7 | + | | Ru supporting quantity: 5 wt % |
| Example 87 | Ru/Ce0.5La0.5Ox | 800 | 500 | 1.55 | 24.8 | + | | Ru supporting quantity: 5 wt % |
| Example 88 | Ru/Ce0.5La0.5Ox | 800 | 650 | 1.86 | 29.7 | + | | Ru supporting quantity: 5 wt % |
| Example 89 | Ru/Ce0.5La0.5Ox | 800 | 800 | 1.46 | 23.3 | + | | Ru supporting quantity: 5 wt % |

TABLE 10

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 90 | Fe/Ba0.1La0.45Ce0.45Ox | 700 | 700 | 0.605 @ 400 | 9.72 @ 400 | + | | Precursor is BaOH, Fe precursor is Fe(acac)₃, and Fe supporting quantity is 20 wt % |
| Example 91 | Fe/Ba0.1La0.45Ce0.45Ox | 700 | 700 | 0.173 @ 400 | 2.77 @ 400 | + | | Precursor is BaOH, Fe precursor is Fe₃(CO)₁₂, and Fe supporting quantity is 20 wt % |
| Example 92 | Co—Fe/Ba0.1La0.45Ce0.45Ox | 700 | 700 | 0.90 @ 400 | 14.4 @ 400 | + | | Precursor is BaOH, Co and Fe precursor is Fe(acac)₃, and Co and Fe supporting quantity is 10 wt % each |
| Example 93 | Co—Fe/Ba0.1La0.45Ce0.45Ox | 700 | 750 | 1.02 @ 400 | 16.4 @ 400 | + | | Precursor is BaOH, Co and Fe precursor is Fe(acac)₃, and Co and Fe supporting quantity is 10 wt % each |
| Example 94 | Ru/Ba0.1La0.3Ce0.6Ox | 700 | 700 | 2.38 | 38.2 | + | | Ru supporting quantity is 5 wt %, and precursor is BaOH |

TABLE 10-continued

| | Metal-supported material | Calcinating temperature ° C. | Reducing process temperature ° C. | Ammonia yield % | Ammonia generation rate mmol g-1 h-1 | Gas purifier used/ unused | Partial negative charge of oxygen | Note |
|---|---|---|---|---|---|---|---|---|
| Example 95 | Ru/Ba0.1La0.6Ce0.3Ox | 700 | 700 | 2.88 | 46.3 | + | | Ru supporting quantity is 5 wt %, and precursor is BaOH |
| Example 96 | Ru/Ba0.1La0.8Ce0.1Ox | 700 | 700 | 2.5 | 40.2 | + | | Ru supporting quantity is 5 wt %, and precursor is BaOH |
| Example 97 | Ru/Ba0.1La0.45Ce0.45Ox | 700 | 500 (48 h) | 3.26 | 52.3 | + | 0.50-0.57 | Ru supporting quantity: 5 wt %, activity at 350° C. |
| Example 98 | Ru/Ba0.1La0.45Ce0.45Ox | 700 | 450 (72 h) | 2.75 | 44.3 | + | 0.50-0.57 | Ru supporting quantity: 5 wt %, activity at 350° C. |
| Example 99 | Ru/Ce0.5La0.5Ox | 700 | 500 (48 h) | 2.15 | 34.5 | + | 0.52-0.56 | Ru supporting quantity: 5 wt %, activity at 350° C. |

TABLE 11

| | Metal-supported material | Specific surface area $m^2 g^{-1}$ | Ru dispersion degree ($D_{ads}$) | Ru average particle diameter (d) nm | Ru dispersion degree ($D_{TEM}$) | $D_{ads}/D_{TEM}$ | TOF $S^{-1}$ | Reducing degree of $Ce^{4+}$ (ratio of $Ce^{3+}$) % |
|---|---|---|---|---|---|---|---|---|
| Comparative example 4 | Ru/La2O3 | 18 | 0.13 | | | | 0.046 | |
| Comparative example 5 | Ru/CeOx | 24 | 0.27 | | | | 0.027 | |
| Comparative example 6 | Ru/CeOx | 20 | 0.17 | | | | 0.057 | |
| Example 75 | Ru/La0.5Pr0.5Ox | | | | | | | |
| Example 76 | Ru/La0.5Pr0.5Ox | 30 | 0.22 | | | | 0.156 | 100 |
| Example 78 | Ru/La0.5Pr0.5Ox | | | | | | | |
| Comparative example 8 | Ru/MgO | | | | | | | |
| Example 80 | 8.4 wt % Ba/ 4.5 wt % Ru/MgO | | | | | | | |
| Example 81 | 8.4 wt % Ba/ 4.5 wt % Ru/MgO | | | | | | | |
| Example 82 | Ru/Ce0.5Pr0.5Ox | | | | | | | |
| Example 83 | Ru/Ce0.5Pr0.5Ox | | | | | | | |
| Example 84 | Ru/Ce0.5Pr0.5Ox | | | | | | | |
| Example 85 | Ru/Ce0.5Pr0.5Ox | | | | | | | |
| Example 86 | Ru/Ce0.5Pr0.5Ox | | | | | | | |
| Example 87 | Ru/Ce0.5La0.5Ox | | | | | | | |
| Example 88 | Ru/Ce0.5La0.5Ox | | | | | | | |
| Example 89 | Ru/Ce0.5La0.5Ox | | | | | | | |
| Example 90 | Fe/Ba0.1La0.45Ce0.45Ox | | | | | | | |
| Example 91 | Fe/Ba0.1La0.45Ce0.45Ox | | | | | | | |
| Example 92 | Co—Fe/Ba0.1La0.45Ce0.45Ox | | | | | | | |
| Example 93 | Co—Fe/Ba0.1La0.45Ce0.45Ox | | | | | | | |
| Example 94 | Ru/Ba0.1La0.3Ce0.6Ox | | | | | | | |
| Example 95 | Ru/Ba0.1La0.6Ce0.3Ox | | | | | | | |
| Example 96 | Ru/Ba0.1La0.8Ce0.1Ox | | | | | | | |
| Example 97 | Ru/Ba0.1La0.45Ce0.45Ox | | | | | | | |
| Example 98 | Ru/Ba0.1La0.45Ce0.45Ox | | | | | | | |
| Example 99 | Ru/Ce0.5La0.5Ox | | | | | | | |

<Confirmation of Solid Solution State of Carrier>

FIG. 6 shows the XRD patterns of $Ru/Ba_{0.1}La_{0.45}Ce_{0.45}O_x$ (Example 6) and $Ru/La_{0.5}Ce_{0.5}O_x$ (Example 2). As illustrated in FIG. 6, the position of the main diffraction peak of $Ba_{0.1}La_{0.45}Ce_{0.45}O_x$ is substantially the same as that of $La_{0.5}Ce_{0.5}O_x$. Assuming that Ba forms a solid solution with La or Ce partially or entirely, the position of the main diffraction peak of $Ba_{0.1}La_{0.45}Ce_{0.45}O_x$ should shift to the lower angle side in order for Ba with a large ion diameter to exist within the lattice. Thus, this means that Ba does not form the solid solution with La or Ce.

FIG. 7 shows the results of analyzing the surface of the catalyst of Example 6 (650° C. reduced $Ru/Ba_{0.1}La_{0.45}Ce_{0.45}O_x$) with the use of an aberration corrected transmission electron microscope in accordance with the X-ray fluorescence analysis. Here, the compositions of Ba, La, and Ce on the surface of the catalyst were analyzed and its gradation is expressed with dark and bright tones. That is to say, the drawing is brighter as each element exists at higher concentration. As is clear from the drawing, La and Ce are catalyst particles with almost no gradation, and exist uniformly in the catalyst particle.

On the other hand, Ba exists with explicit gradation, and for example, exists at particularly high concentration in a region at a lower center in the analysis viewing field. The above results indicate that Ba does not form the solid solution with La and Ce.

The invention claimed is:

1. A metal-supported material in which ruthenium particles are supported on a composite oxide expressed by General Formula (2):

$$A_n X_{1-n} O_x \qquad (2)$$

where A represents an element selected from the group consisting of Ce, Pr, and Tb, that is in a trivalent state at least partially, and a ratio of moles of the element in the trivalent state to total moles of the element in both a tetravalent state and the trivalent state is 0.1 to 0.9, X represents an element selected from the group consisting of Ca, Sr, Ba, La, Ce, Pr, Nd, Sm, Eu, Gd, Tb, Dy, Ho, Er, Tm, Yb, and Lu, and that is different from A, n satisfies 0<n<1, and x represents the number of oxygen atoms necessary for the composite oxide to keep neutral electrically;

wherein the composite oxide includes a solid solution that is a tetragonal crystal or a cubic crystal, wherein a ratio of a value ($D_{ads}$) of a ruthenium dispersion degree obtained by an $H_2$ pulse chemical adsorption method to a value ($D_{TEM}$) of a ruthenium dispersion degree expected from an average particle diameter of ruthenium particles obtained from a TEM image satisfies $0<D_{ads}/D_{TEM}<1$, and wherein the metal-supported material is manufactured by:

mixing an A precursor including A and an X precursor including X to obtain a mixture;

calcinating the mixture at 600° C. or more to obtain a carrier including the composite oxide;

supporting a compound including ruthenium on the composite oxide to prepare a before-reducing process supporting material; and performing a reducing process on the before-reducing process supporting material at 400° C. or more.

2. The metal-supported material according to claim 1, wherein at least one of the elements A and X in the composite oxide is an element with strong basicity for which a value of a partial negative charge ($-\delta_o$) of oxygen in an oxide state is 0.50 or more.

3. The metal-supported material according to claim 1, wherein when a composition ratio of each element in the composite oxide is ni, where i represents all the elements in the composite oxide including A, X, and O, and a Sanderson electronegativity of each element is $\chi$i, where i represents all the elements in the composite oxide including A, X, and O, a value of a partial negative charge ($-\delta_o$) of oxygen expressed by the following Formula is 0.52 or more:

$$((\Pi(\chi_i^{ni}))^{(1/\Sigma ni)}-5.21)/-4.75.$$

4. The metal-supported material according to claim 1, wherein X is Ba and a quantity of carbonate ions included in the composite oxide is 10 mol % or less of Ba.

5. The metal-supported material according to claim 1, wherein when nitrogen is adsorbed on the supported ruthenium particles, N≡N stretching vibration υ1 of nitrogen molecules that mutually act in a major-axis direction is observed in 2300 to 2000 cm$^{-1}$ by an infrared absorption spectroscopy.

6. The metal-supported material according to claim 1, wherein when nitrogen is adsorbed on the supported ruthenium particles, weakened N≡N stretching vibration υ2 of the nitrogen molecules that mutually act in the major-axis direction for the transition metal is observed in 1900 to 1500 cm$^{-1}$ by an infrared absorption spectroscopy.

7. The metal-supported material according to claim 1, wherein an average particle diameter of the ruthenium particles supported on the composite oxide is 100 nm or less.

8. An ammonia synthesis catalyst comprising the metal-supported material according to claim 1.

9. A manufacturing method for ammonia comprising bringing hydrogen, nitrogen, and a catalyst in contact with each other, wherein the catalyst is the ammonia synthesis catalyst according to claim 8.

* * * * *